US009380312B2

(12) United States Patent
Cote et al.

(10) Patent No.: US 9,380,312 B2
(45) Date of Patent: Jun. 28, 2016

(54) ENCODING BLOCKS IN VIDEO FRAMES CONTAINING TEXT USING HISTOGRAMS OF GRADIENTS

(71) Applicant: Apple Inc., Cupertino, CA (US)

(72) Inventors: Guy Cote, San Jose, CA (US); Xiaojin Shi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 14/331,091

(22) Filed: Jul. 14, 2014

(65) Prior Publication Data

US 2016/0014421 A1   Jan. 14, 2016

(51) Int. Cl.

| | |
|---|---|
| G06K 9/00 | (2006.01) |
| G06K 9/36 | (2006.01) |
| H04N 19/196 | (2014.01) |
| G06K 9/46 | (2006.01) |
| G06T 1/20 | (2006.01) |
| H04N 19/124 | (2014.01) |
| H04N 19/139 | (2014.01) |
| H04N 19/176 | (2014.01) |

(52) U.S. Cl.
CPC ............ *H04N 19/196* (2014.11); *G06K 9/4642* (2013.01); *G06T 1/20* (2013.01); *H04N 19/124* (2014.11); *H04N 19/139* (2014.11); *H04N 19/176* (2014.11)

(58) Field of Classification Search
CPC . H04N 19/196; H04N 19/124; H04N 19/139; H04N 19/176; G06K 9/4642; G06T 1/20
USPC .................................. 382/168, 170, 232, 303
See application file for complete search history.

(56) References Cited

U.S. PATENT DOCUMENTS

| | | | |
|---|---|---|---|
| 7,519,201 B2 | 4/2009 | Yang et al. | |
| 7,672,022 B1 * | 3/2010 | Fan ........................ | G06T 7/0083 |
| | | | 348/207.99 |
| 7,995,649 B2 * | 8/2011 | Zuo ........................ | H04N 19/176 |
| | | | 375/240.01 |

(Continued)

OTHER PUBLICATIONS

Dalal, N. and Triggs, B., "Histograms of Oriented Gradients for Human Detection," Proceedings of IEEE Computer Society Conference on Computer Vision and Pattern Recognition, pp. 886-893, 2005, San Diego, CA, USA.

(Continued)

*Primary Examiner* — Kanjibhai Patel
(74) *Attorney, Agent, or Firm* — Robert C. Kowert; Meyertons, Hood, Kivlin, Kowert & Goetzel, P.C.

(57) ABSTRACT

A block input component of a video encoding pipeline may, for a block of pixels in a video frame, compute gradients in multiple directions, and may accumulate counts of the computed gradients in one or more histograms. The block input component may analyze the histogram(s) to compute block-level statistics and determine whether a dominant gradient direction exists in the block, indicating the likelihood that it represents an image containing text. If text is likely, various encoding parameter values may be selected to improve the quality of encoding for the block (e.g., by lowering a quantization parameter value). The computed statistics or selected encoding parameter values may be passed to other stages of the pipeline, and used to bias or control selection of a prediction mode, an encoding mode, or a motion vector. Frame-level or slice-level parameter values may be generated from gradient histograms of multiple blocks.

20 Claims, 28 Drawing Sheets

(56) References Cited

U.S. PATENT DOCUMENTS

| | | | |
|---|---|---|---|
| 8,064,517 | B1 | 11/2011 | Viscito et al. |
| 8,437,547 | B2 | 5/2013 | Meiers |
| 8,763,908 | B1 * | 7/2014 | Feldman .............. G06K 7/1443 235/462.09 |
| 2007/0165025 | A1 * | 7/2007 | Shen ...................... G06T 17/20 345/423 |
| 2013/0058535 | A1 | 3/2013 | Othmezouri et al. |
| 2014/0112526 | A1 | 4/2014 | Kim et al. |

OTHER PUBLICATIONS

David G. Lowe, "Distinctive image features from scale-invariant keypoints," International Journal of Computer Vision, 60, 2 (2004), pp. 91-110.

V. Chandrasekhar, G. Takacs, D. Chen, S. Tsai, R. Grzeszczuk, B. Girod, "CHoG: Compressed histogram of gradients a low bit-rate feature descriptor," CVPR, pp. 2504-2511, 2009 IEEE Conference on Computer Vision and Pattern Recognition.

U.S. Appl. No. 14/322,720, filed Jul. 2, 2014, Jim C. Chou.
U.S. Appl. No. 14/037,316, filed Sep. 25, 2013, Craig M. Okruhlica.
U.S. Appl. No. 14/039,820, filed Sep. 27, 2013, Guy Cote.
U.S. Appl. No. 14/039,764, filed Sep. 27, 2013, Timothy John Millet.
U.S. Appl. No. 14/037,313, filed Sep. 25, 2013, Joseph J. Cheng.
U.S. Appl. No. 14/039,729, filed Sep. 27, 2013, James E. Orr.
U.S. Appl. No. 14/037,310, filed Sep. 25, 2013, Guy Cote.
U.S. Appl. No. 14/039,880, filed Sep. 27, 2013, Weichun Ku.
U.S. Appl. No. 14/039,900, filed Sep. 27, 2013, Guy Cote.

* cited by examiner

ENCODING BLOCKS IN VIDEO FRAMES CONTAINING TEXT USING HISTOGRAMS OF GRADIENTS

BACKGROUND

1. Technical Field

This disclosure relates generally to video or image processing, and more specifically to methods and apparatus for processing digital video frames in block processing pipelines.

2. Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 110 as shown in FIG. 1 represents an apparatus, or alternatively a software program, in which digital video input (input frames 120) is encoded or converted into another format (output frames 130), for example a compressed video format such as H.264/Advanced Video Coding (AVC) format (also referred to as MPEG 4 Part 10), or H.265 High Efficiency Video Encoding (HEVC) format, according to a video encoding method. An apparatus or software program such as a video encoder 110 may include multiple functional components or units, as well as external interfaces to, for example, video input sources and external memory.

In some video processing methods, to perform the processing, each input video frame 120 is divided into rows and columns of blocks of pixels (e.g., 16×16 pixel blocks), for example as illustrated in FIG. 2 which shows an example 192×192 pixel frame 120 divided into 144 16×16 pixel blocks (illustrated in FIG. 2 as blocks 220). Each block of an input video frame 120 is processed separately, and when done the processed blocks are combined to form the output video frame 130. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 110 may include or implement a block processing pipeline 140. A block processing pipeline 140 may include two or more stages, with each stage implementing one or more of the steps or operations of the block processing method. FIG. 1 shows an example video encoder 110 that implements an example block processing pipeline 140 that includes at least stages 142A through 142C. A block is input to a stage 142A of the pipeline 140, processed according to the operation(s) implemented by the stage 142A, and results are output to the next stage 142B (or as final output by the last stage 142). The next stage 142B processes the block, while a next block is input to the previous stage 142A for processing. Thus, blocks move down the pipeline from stage to stage, with each stage processing one block at a time and multiple stages concurrently processing different blocks. Conventionally, the blocks are input to and processed by the block processing pipeline 140 in scan order as shown in FIG. 2. For example, in FIG. 1, the first block of the first row of the frame shown in FIG. 2 (block 0) is at stage 142C, the second block (block 1) is at stage 142B, and the third block (block 2) is at stage 142A. The next block to be input to the block processing pipeline 140 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union-Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation. The H.264 recommendation includes a definition for context-adaptive binary arithmetic coding (CABAC) entropy encoding.

Generally, context-adaptive coding components must read from and write to a context lookup table, which is typically implemented in external memory. The context lookup table is sometimes implemented as a dual-port memory (including a read port and a separate write port) to increase performance, but this approach can be prohibitively expensive.

SUMMARY OF EMBODIMENTS

Embodiments of block processing methods and apparatus are described in which a block processing pipeline includes multiple pipeline components. A block input component of a block processing pipeline (e.g., a video encoding pipeline) may, for a block of pixels in a video frame, compute gradients in two or more directions, and may compute one or more histograms representing statistics derived from the gradient values for the block of pixels (e.g., by accumulating counts of the directions or magnitudes of horizontal and vertical gradients in one or more histograms). For example, computing the histograms for the block of pixels may first include computing unsigned values representing the magnitudes of the gradients for the block of pixels in two or more directions, and then deriving statistics from those unsigned gradient values for the block of pixels in those directions.

In another example, computing histograms representing statistics derived from gradient values for a block of pixels may include computing horizontal gradient values and vertical gradient values for the block of pixels, and computing one histogram of the horizontal gradient values and a separate histogram of the vertical gradient values. In this example, the height of each bin of the histogram of the horizontal gradient values and each bin of the histogram of the vertical gradient values may represent a count of the computed gradient values having a magnitude in a respective range of gradient magnitude values. In some embodiments, an angle representing a gradient direction at each of multiple points within a block of pixels may be computed based on horizontal gradient values and vertical gradient values computed at that point. In such embodiments, computing histograms representing statistics derived from the gradient values for the block of pixels may include computing a histogram of the angles representing the gradient directions at each of the multiple points within the block of pixels, where the height of each bin of the histogram represents a count of the computed angles that fall within in a respective range of angles.

In some embodiments, the block input component may (e.g., through software executing on a CPU in the block input component) analyze the histogram(s) to compute block-level statistics and/or to determine the presence or absence of a dominant gradient direction in the block of pixels, dependent on the computed histograms. If a dominant gradient direction exists in the block of pixels, this may indicate (or be used to determine) the presence of text in the block of pixels (or the likelihood that the block of pixels represents a portion of a video frame that contains text). In some embodiments, the block input component may be configured to determine (or select) one or more parameter values for encoding the block of pixels, dependent on the likelihood that the block of pixels represents a portion of the video frame that contains text. For example, if text is detected (e.g., if it is determined that a given block of pixels is likely to represent a portion of a video frame that contains text), various encoding parameter values may be selected, computed, or modified in such a way as to improve the quality of encoding for the given block of pixels. For example, the block input component (or another component of the video encoding pipeline) may be configured to compute a quantization parameter value for encoding the block of pixels that is lower than a quantization parameter value used for encoding blocks of pixels that do not represent portions of a video frame that contains text (including blocks of pixels within the same video frame).

In various embodiments, the computed gradient values, histogram information, computed block-level statistics, quantization parameter values and/or other encoding parameter values that are computed based on the gradient values or histogram information described herein may be passed to other stages of a video encoding pipeline (e.g., an intra-estimation stage, a mode decision stage, or a motion estimation stage), where they may be used to bias or control the selection of a prediction mode, an encoding mode, or a motion vector. For example, such information may be passed from a hardware pipeline component or software pipeline component in one stage of the video encoding pipeline to a hardware or software pipeline component in another stage of the video encoding pipeline (e.g., a stage that succeeds the stage in which the information was generated) in order to affect the encoding of the block of pixels from which the information was generated. In another example, such information may be passed from a hardware or software pipeline component in one stage of the video encoding pipeline to a software or hardware pipeline component in a stage that precedes the stage in which the information was generated in order to affect the encoding of a block of pixels that was received subsequent to receiving the block of pixels from which the information was generated.

In some embodiments, slice-level or frame-level parameter values may be generated from the gradient histograms of multiple blocks (e.g., by accumulating the histogram information and/or block-level statistics derived therefrom), and one or more slice-level or frame-level parameter values may be computed for use in encoding the video frame or a subsequent video frame, dependent on the accumulated histogram information and/or slice/frame-level statistics. In some embodiments, a block input component of a video encoding pipeline may be configured to determine the likelihood that a given block of pixels represents a portion of a video frame that contains text using a decision function that was previously determined by a classifier component based on training data (e.g., blocks of pixels for which the presence or absence of text is known).

Figure 1:
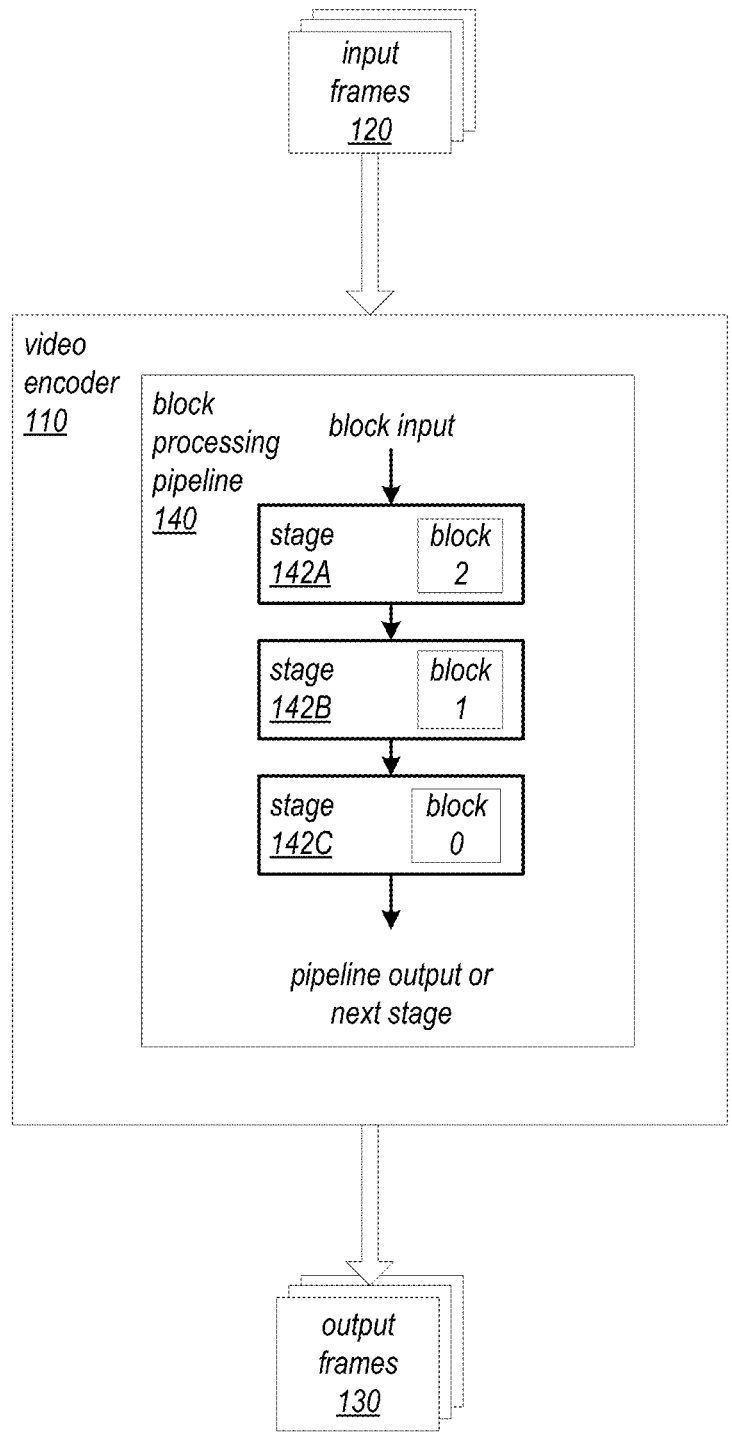
FIG. 1 illustrates an example video encoder including a conventional block processing pipeline that processes blocks from input frames in scan order.
Figure 2:
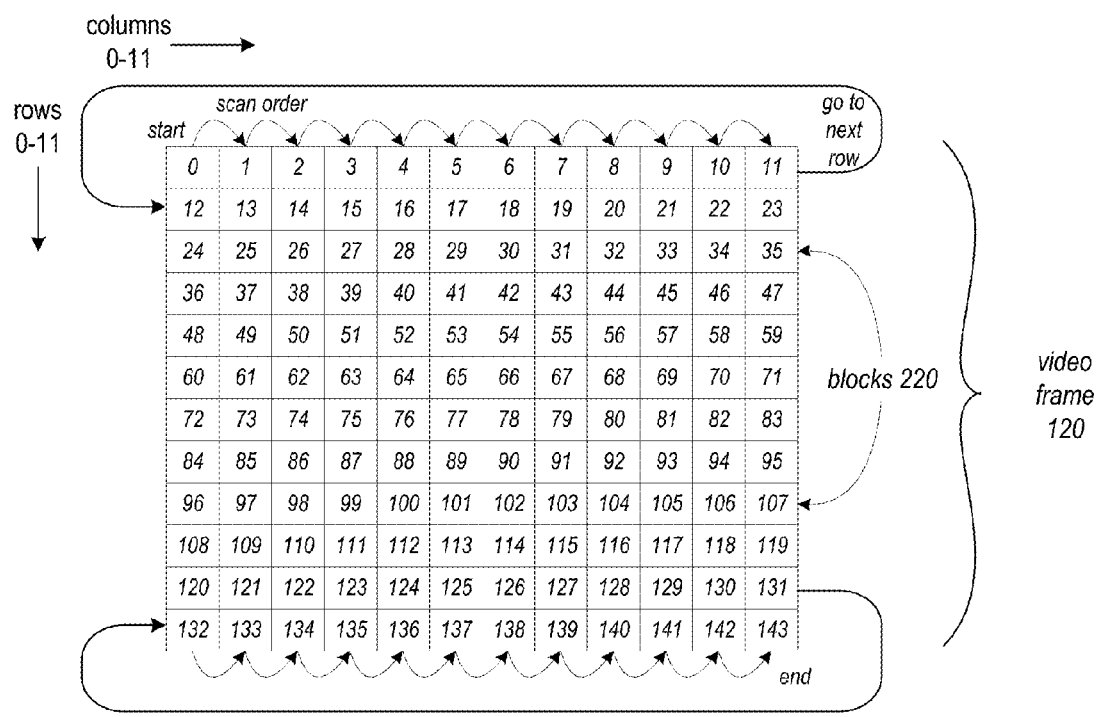
FIG. 2 illustrates conventional scan order processing of blocks from a video frame.

While embodiments of systems, apparatus, and methods described herein are susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the present disclosure as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

DETAILED DESCRIPTION

In the following description, numerous specific details are set forth to provide a thorough understanding of the disclosed systems, apparatus, and methods. However, one having ordinary skill in the art should recognize that the disclosed techniques might be practiced without these specific details. In some instances, well-known circuits, structures, and techniques have not been shown in detail to avoid obscuring this disclosure.

Figure 16:
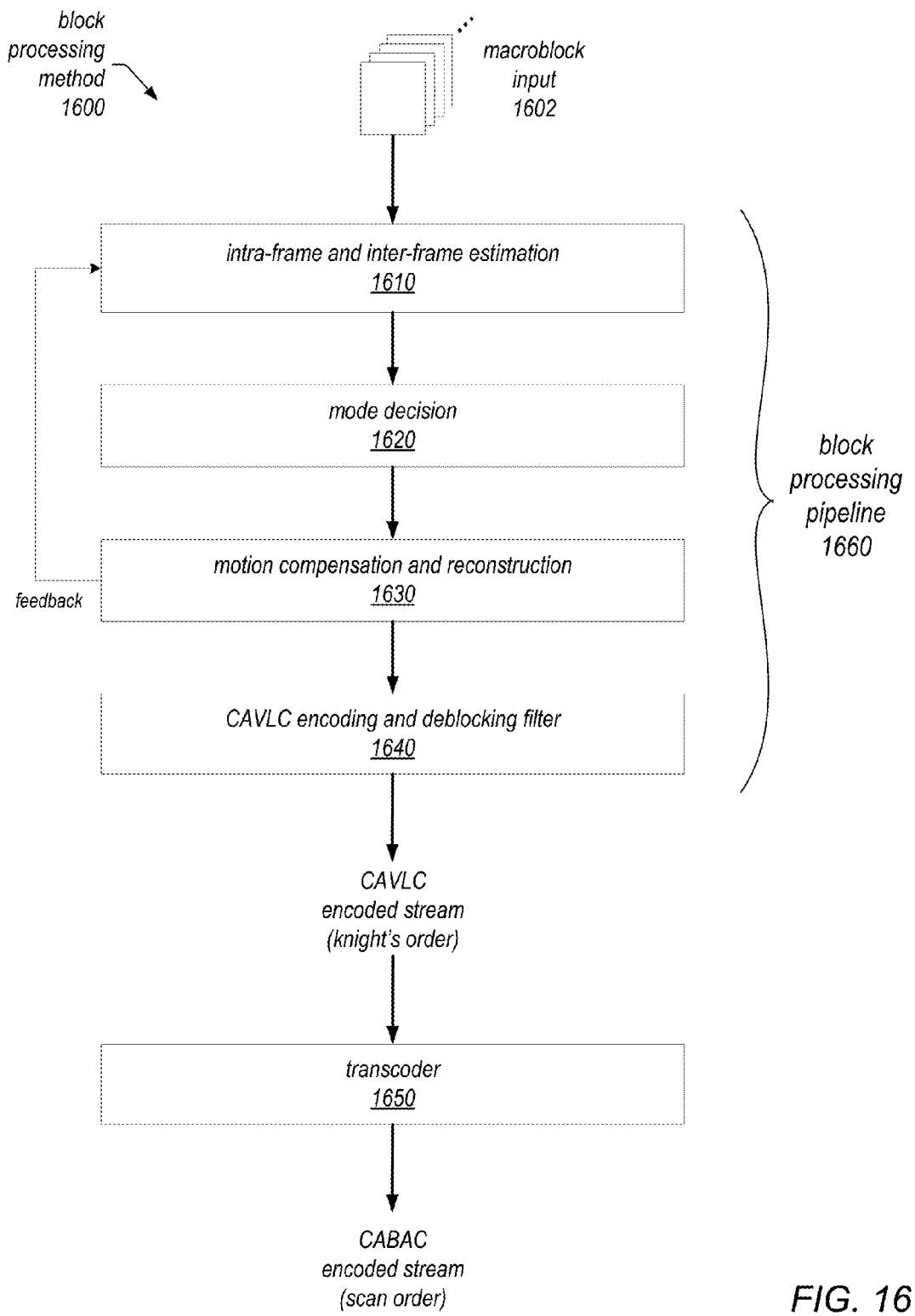
FIG. 16 is a high-level block diagram of general operations in an example block processing method that may be implemented by a block processing pipeline that implements one or more of the block processing methods and apparatus described herein, according to at least some embodiments.
Figure 26:
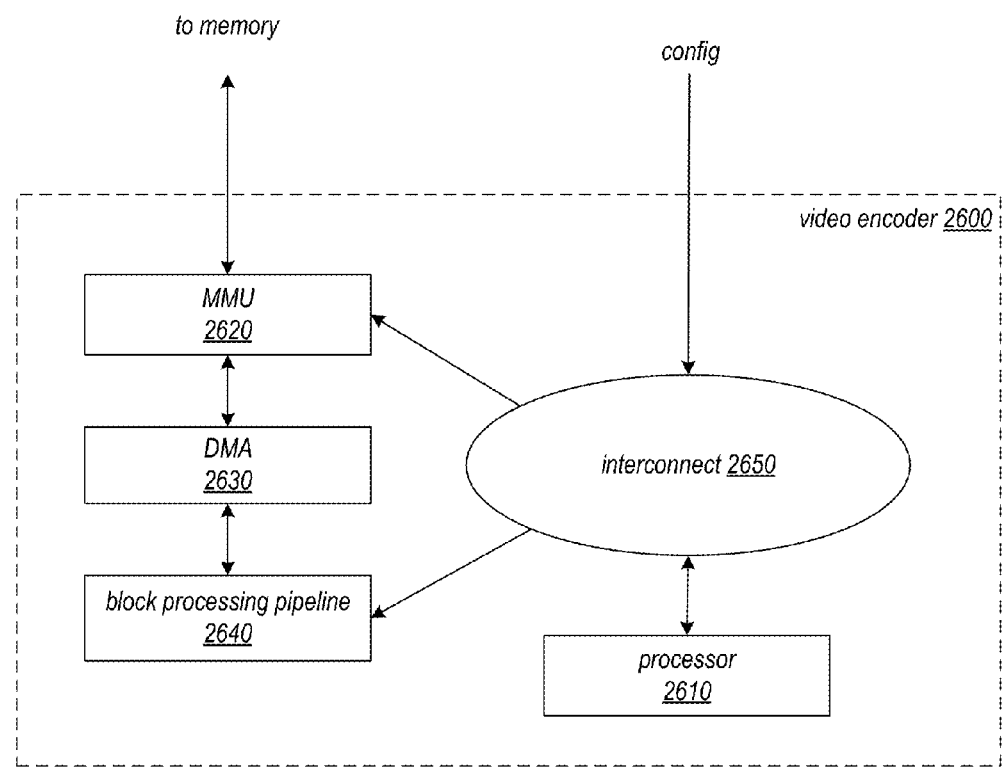
FIG. 26 is a block diagram illustrating an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 16 illustrates an example block processing pipeline of an example H.264 video encoder, and FIG. 26 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. The HEVC standard is published by ITU-T in a document titled "ITU-T Recommendation H.265: High Efficiency Video Encoding". Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications (e.g., using JPEG encoding, HEVC Still Image coding, or other suitable encoding standards or formats). Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) or Coding Units (CUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Parallel Hardware and Software Block Processing Pipelines

Embodiments of block processing methods and apparatus are described in which a block processing pipeline includes a software pipeline and a hardware pipeline that run in parallel. However, the software pipeline runs one block ahead of the hardware pipeline. The stages of the pipeline may each include a hardware pipeline component (e.g., a circuit) that performs one or more operations on a current block at the stage. At least one stage of the pipeline may also include a software pipeline component that determines a configuration for the hardware component at the stage of the pipeline for processing a next block while the hardware component is processing the current block. The software pipeline component may include at least a processor. In at least some embodiments, the software pipeline component at a stage may determine the configuration for processing the next block at the stage according to information related to the next block obtained from an upstream stage of the pipeline. In at least some embodiments, the software pipeline component may also obtain and use information related to a block that was previously processed at the stage in determining the configuration for processing the next block. In at least some embodiments, the software pipeline may also "look ahead" (upstream) one or more blocks to obtain information from upcoming blocks that may be used in determining the configurations for processing the next blocks at the stages. The software pipeline components may generate statistics on one or more blocks that are used in determining the configurations.

The block information obtained by a software pipeline component at a stage and used to determine a configuration for processing a next block at the stage may, for example, include various statistics related to the block and/or to one or more other blocks. The following provides some examples of block statistics that may be used in some embodiments, and is not intended to be limiting:

Sum of pixels (s).
Sum of pixels squared (s2).
Block variance (may be estimated from s and s2, e.g. var=s2−(s)^2).
Horizontal and vertical gradients (Gx and Gy).
Gradient histograms for Gx and Gy.

The operations performed by the hardware pipeline components at the various stages may vary, and thus the configuration for the hardware pipeline components at the stages may vary. Thus, the software pipeline components at the stages may determine and set particular configuration parameters according to the respective hardware pipeline components at the stages. However, a general example of configuration parameters that may be determined and set at a stage by the software pipeline component based on an analysis of the information is given below, and is not intended to be limiting.

One or more stages of a pipeline may perform operations to determine a best mode for processing pixels in a given block. At a particular stage, the hardware pipeline component may receive information from one or more upstream stages (and possibly feedback from one or more downstream stages) and use this information to select a particular one of multiple modes. The software pipeline component at the stage may receive, generate, and analyze statistics related to the block (e.g., block variance) and set one or more configuration parameters according to the analysis to, for example, cause the hardware pipeline component to try multiple modes if the block variance is high, or to bias the hardware component towards a particular mode or modes if the block variance is low.

In at least some embodiments, a block processing pipeline that implements parallel software and hardware pipelines may input blocks to and process blocks in the pipelines according to knight's order, as described in the section titled Knight's order processing. However, other block input and processing orders may be used in some embodiments. In at least some embodiments, at least one stage of a block processing pipeline that implements parallel software and hardware pipelines may implement one or more local buffers for caching data for neighbor blocks at the stage, as described in the section titled Caching neighbor data.

Figure 3:
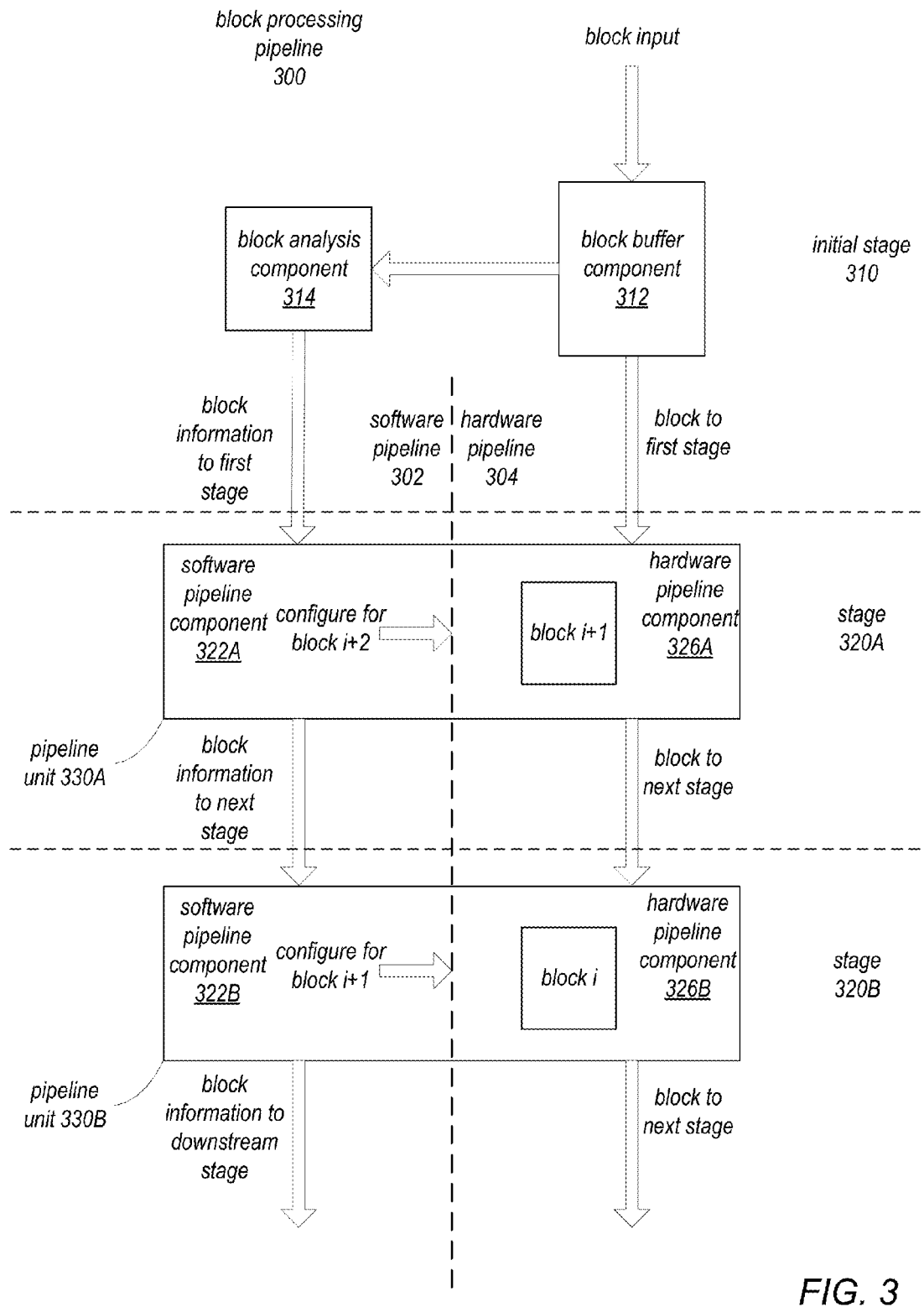
FIG. 3 is a high-level block diagram of an example block processing pipeline that implements a software pipeline and a hardware pipeline, according to at least some embodiments.

FIG. 3 is a high-level block diagram of an example block processing pipeline 300 that implements a software pipeline 302 and a hardware pipeline 304, according to at least some embodiments. The software pipeline 302 and the hardware pipeline 304 process blocks from a frame in parallel, with the software pipeline 302 one block ahead of the hardware pipeline 304. The pipeline 300 may include multiple stages 320, each stage configured to perform one or more operations on a block of pixels from a frame (e.g., a video frame). At least some of the stages (stages 320A and 320B in FIG. 3) may each include at least one pipeline unit 330 that includes a software pipeline component 322 and a hardware pipeline component 326. The hardware pipeline component 326 of each pipeline unit 330 may perform one or more particular operations of a block processing method on a block currently at the stage 320 in the hardware pipeline 304. While the hardware pipeline component 326 of a given pipeline unit 330 is working on the current block at the stage 320, the software pipeline component 322 of the pipeline unit 330 at the stage 320 may preconfigure the hardware pipeline component 326 for processing a next block. Thus, the software pipeline 302 operates one block ahead of the hardware pipeline 304.

For example, as shown in FIG. 3, at stage 320B hardware pipeline component 326B is currently processing block i while software pipeline component 326B is configuring the hardware pipeline component 326B to process block i+1, and at stage 320A hardware pipeline component 326A is currently processing block i+1 while software pipeline component 326A is configuring the hardware pipeline component 326A to process block i+2.

The software pipeline component 322 of a pipeline unit 330 at a stage 320 may determine a configuration for processing a next block at the hardware pipeline component 326 of the respective pipeline unit 330 according to information for the block. The information for the block may include at least block information received from an upstream stage. In at least some embodiments, the information may also include feedback information from one or more blocks previously processed at the stage 320. The software pipeline component 322 may preconfigure the hardware pipeline component 326 of the pipeline unit 330 at the stage 320 for processing the block according to the determined configuration, for example by setting one or more configuration values in a set of registers or other memory coupled to the hardware pipeline component 326. Once the configuration for processing the block at the hardware pipeline component 326 of the pipeline unit 330 is ready, the software pipeline component 322 may signal the hardware pipeline component 326 of the pipeline unit 330. Assuming that the hardware pipeline component 326 has completed the processing of a previous block and that the next block is available to the hardware pipeline component 326 (e.g., ready to be read from its input buffer), the hardware pipeline component 326 of the pipeline unit 330 may then begin processing the next block according to the configuration for the block that was determined and preconfigured by the software pipeline component 322 of the pipeline unit 330.

In at least some embodiments, an initial stage 310 of the pipeline may input block information to the software pipeline 302 and blocks to the hardware pipeline 304. The initial stage 310 may obtain block input, for example from an external memory via direct memory access (DMA), and buffer the blocks in a block buffer component 312. Block buffer component 312 may have the capacity to hold one, two, or more blocks. For example, in some embodiments, block buffer component 312 may be able to buffer 16 blocks. In at least some embodiments, block buffer component 312 may buffer one, two or more blocks for input to the hardware pipeline 304 before initial stage 310 begins input of blocks to the hardware pipeline 304. In at least some embodiments, once the initial stage 310 begins input of blocks to the hardware pipeline 304, the initial stage 310 may write a next block from block buffer component 312 to a buffer memory of the hardware pipeline component 326A of pipeline unit 330A at stage 320A when the pipeline unit 330A is ready to receive the next block. The initial stage 310 may continue to obtain block input for a frame, buffer the blocks to block buffer component 312, and input blocks to the hardware pipeline 304 until all the blocks in the frame are processed.

A block analysis component 314 at initial stage 310 may perform one or more analysis functions on one or more blocks that are currently buffered in block buffer component 312 including a next block to be input to the hardware pipeline 304 to generate block information for the next block. The block information may, for example, include one or more block statistics. Some non-limiting examples of block statistics that may be generated were previously provided. Once the block information is generated for the next block, the initial stage 310 may send the block information to the software pipeline component 322A of the pipeline unit 330A at stage 320A of the pipeline 300. The block analysis component 314 may continue to generate block information and input the block information to the software pipeline 304 until all the blocks in the frame are processed.

In at least some embodiments, the software pipeline component 322 of each pipeline unit 330 may include a memory for buffering block information for one, two, or more upcoming blocks. In at least some embodiments, the hardware pipeline component 326 of each pipeline unit 330 may include a memory for storing one or more blocks to be processed at the stage 320. In at least some embodiments, the memory may be a double buffer so that a previous stage can write a next block to the memory while the hardware pipeline component 326 is reading a current block from the memory.

In at least some embodiments, the software pipeline component 322 of a pipeline unit 330 may push block information for each block to the software pipeline component 322 of a pipeline unit 330 at a downstream stage 320 so that the software pipeline component 322 at the downstream stage 320 can configure the respective hardware pipeline component 326 at the stage. In at least some embodiments, the software pipeline component 322 of a pipeline unit 330 at a stage 320 does not push block information for a block to a downstream stage 320 until after completing the preconfiguration for processing the block at the stage 320. In at least some embodiments, the block information for a block may be updated according to information that is available at a stage 320 before pushing the block information to the downstream stage 320.

Once a hardware pipeline component 326 at a stage 320 has completed processing of a block, the processed block may be sent to a hardware pipeline component 326 at the next stage 320 for processing. The hardware pipeline component 326 at the next stage 320 may hold the block in its memory until the hardware pipeline component 326 has completed processing of a current block and has received a signal from the software pipeline component 322 of the pipeline unit 330 at the stage 320 that the configuration for processing the block is ready. Note that a processed block may instead be written to a memory external to the pipeline 300 by a last stage 320 of the pipeline 300.

Figure 4A:
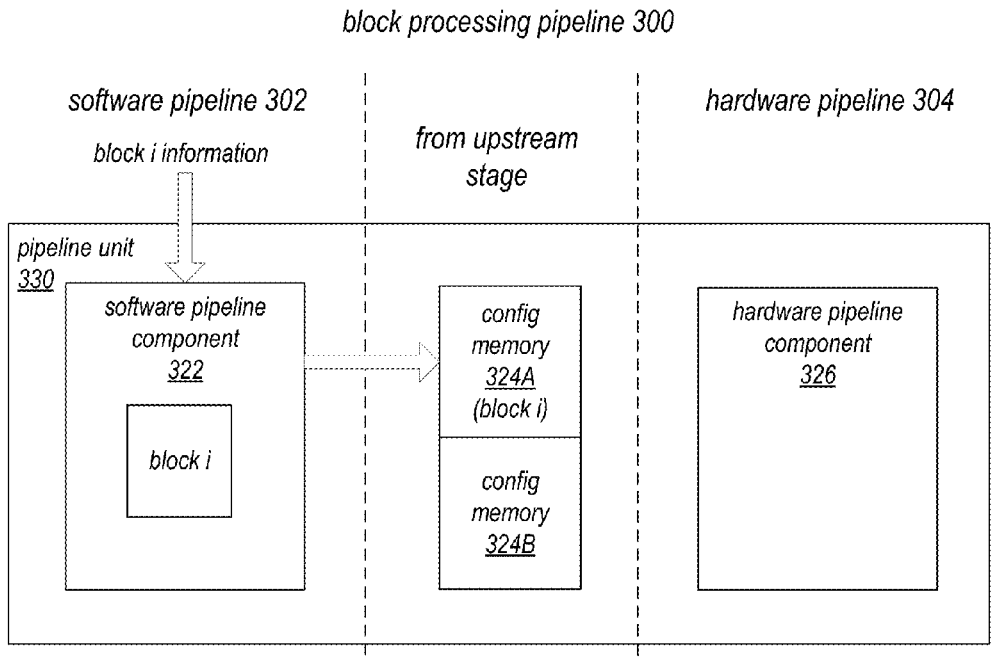
FIGS. 4A through 4C illustrate processing blocks at a stage in an example block processing pipeline that implements a software pipeline and a hardware pipeline, according to at least some embodiments.
Figure 4B:
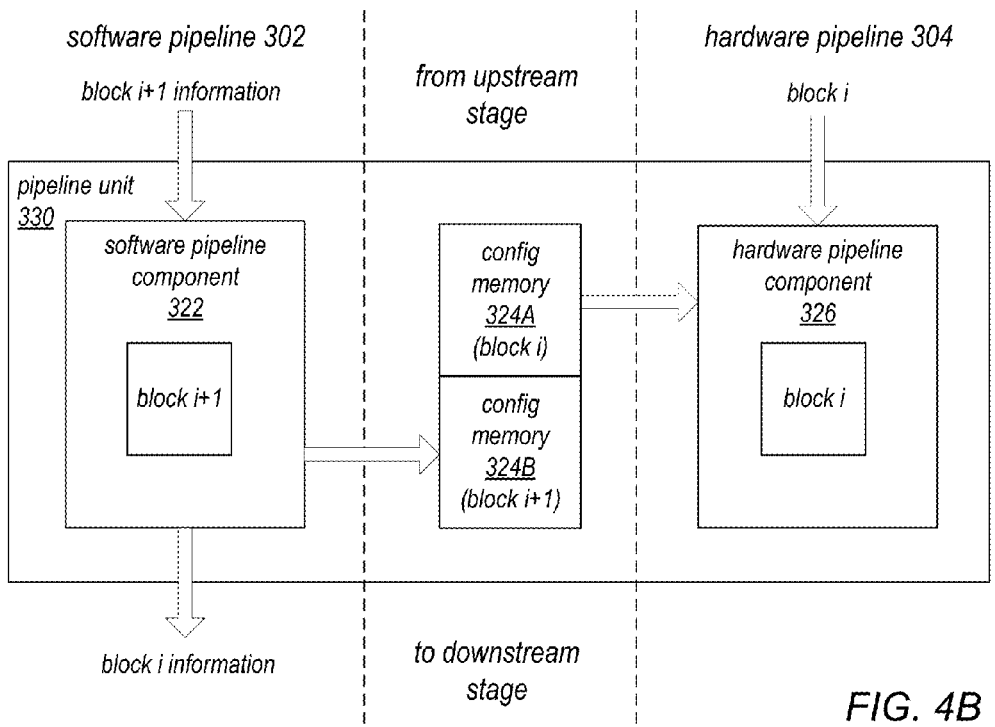
Figure 4C:
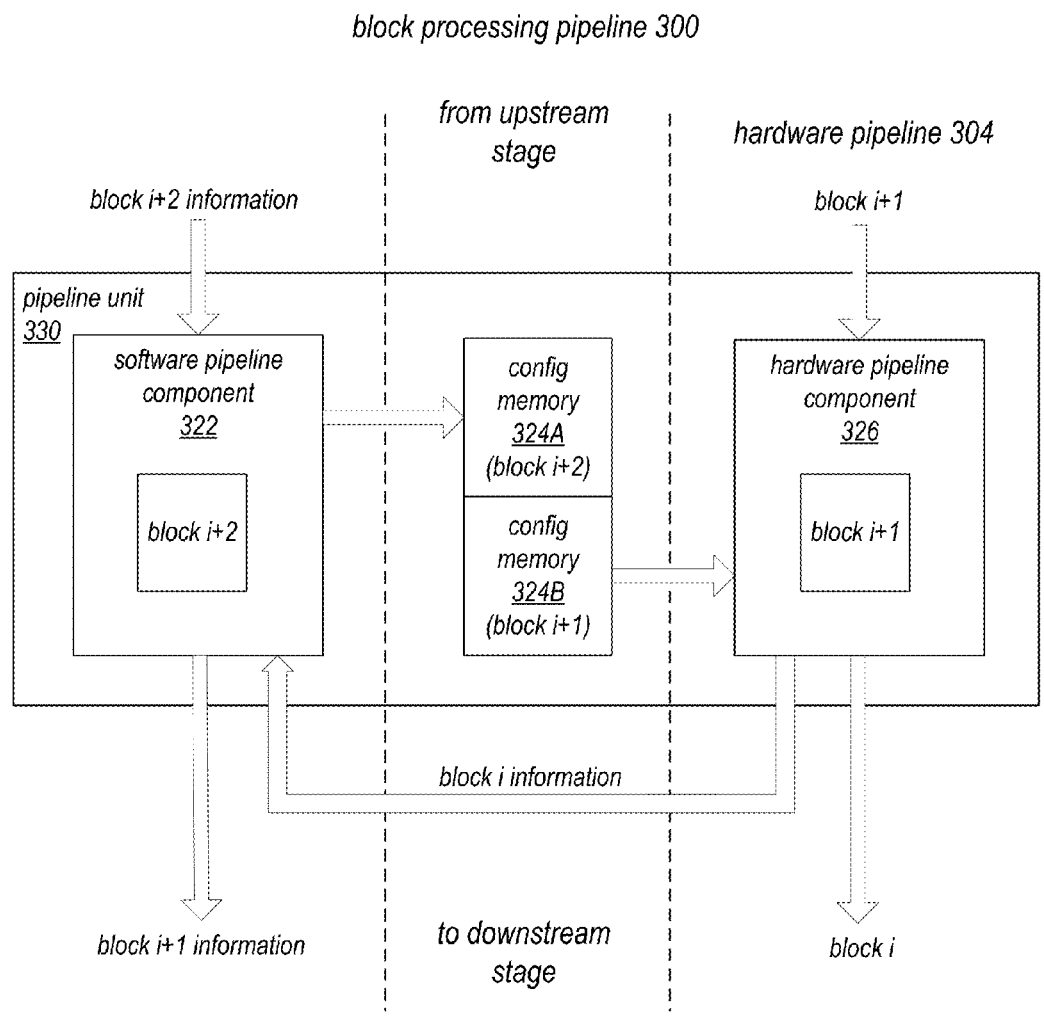

FIGS. 4A through 4C illustrate processing blocks at a pipeline unit of a stage in an example block processing pipeline that implements a software pipeline and a hardware pipeline, according to at least some embodiments. FIGS. 4A through 4C show a pipeline unit 330 that may be used at a stage in a block processing pipeline that includes a software pipeline component 322 and a hardware pipeline component 326. The hardware pipeline component 326 of the pipeline unit 330 may perform one or more particular operations of a block processing method on a block currently at the stage in the hardware pipeline 304. While the hardware pipeline component 326 is working on the current block, the software pipeline component 322 of pipeline unit 330 may preconfigure the hardware pipeline component 326 for processing a next block. Thus, the software pipeline component 322 of a pipeline unit 330 operates one block ahead of the hardware pipeline component 326 of the pipeline unit 330.

The pipeline unit 330 may also include a configuration memory (shown as config memory 324A and 324B in FIGS. 4A through 4C). The configuration memory may, for example, be a set of hardware registers. As shown in FIGS. 4A through 4C, in at least some embodiments, the configuration memory may be partitioned into two memories (config memory 324A and 324B) so that the software pipeline component 322 of pipeline unit 330 can write to one memory while the hardware pipeline component 326 is reading from the other memory. The configuration memory may, for example, be a set of registers that are partitioned into a subset of active registers to which the software pipeline component 322 writes the configuration for a next block and a subset of shadow registers from which the hardware pipeline component 326 reads the configuration for a current block. In at least some embodiments, the software pipeline component 322 may write to either of the config memories 324A and 324B, and the hardware pipeline component 326 may read from either of the config memories 324A and 324B; the two components may both toggle between the memories 324, with the software pipeline component 322 writing to one while the hardware pipeline component 326 is reading from the other. Alternatively, in some embodiments, the software pipeline component 322 may write to only one of the config memories 324 (e.g., config memory 324A), and the hardware pipeline component 326 may read from only the other config memory 324 (e.g., config memory 324B); when the hardware pipeline component 326 is ready for a new configuration and the configuration is ready, the configuration may be copied from the config memory 324A to the config memory 324B. Note that embodiments may also be implemented in which only a single configuration memory is used, or in which more than two configuration memories are used.

FIG. 4A show a pipeline unit 330 of a stage at an initial state. Software pipeline component 322 receives, from an upstream stage, block information for a first block (block i) from a frame to be processed at the stage. Hardware pipeline component 326 is not currently processing a block. Software pipeline component 322 determines a configuration for processing block i according to the received block information and writes the configuration to config memory 324A. Software pipeline component 322 signals hardware pipeline component 326 of pipeline unit 330 that the configuration for block i is ready, for example by setting a go bit or flag.

FIG. 4B show the pipeline unit 330 at the next cycle. Software pipeline component 322 pushes block information for block i to a downstream stage. Hardware pipeline component 326 receives block i and processes block i according to the configuration in config memory 324A. Software pipeline component 322 receives block information for a next block (block i+1) to be processed at the stage. Software pipeline component 322 determines a configuration for processing block i+1 according to the received block information and writes the configuration to config memory 324B. Software pipeline component 322 signals hardware pipeline component 326 that the configuration for block i+1 is ready, for example by setting a go bit or flag.

FIG. 4C shows the pipeline unit 330 at the next cycle. Software pipeline component 322 pushes block information for block i+1 to a downstream stage. Hardware pipeline component 326 receives block i+1 and processes block i+1 according to the configuration in config memory 324B. Software pipeline component 322 receives block information for a next block (block i+2) to be processed at the stage. Software pipeline component 322 determines a configuration for processing block i+2 according to the received block information and writes the configuration to config memory 324A. Software pipeline component 322 signals hardware pipeline component 326 that the configuration for block i+2 is ready, for example by setting a go bit or flag.

FIG. 4C also shows that information from a previously processed block at a stage may be obtained by the software pipeline component 322 at the stage and used in determining a configuration for a next block to be processed by the hardware pipeline component 326 at the stage. Hardware pipeline component 326 finished processing block i at a previous cycle, as shown in FIG. 4B, and is now processing block i+1 at FIG. 4C. Thus, information from the processing of block i at the stage is available, and may be fed back to the software pipeline component 322 of the pipeline unit 330 at the stage. This information from the processing of block i at the stage may be used in combination with the block information for block i+2 received from an upstream stage to determine the configuration for block i+2. Thus, feedback of information from the processing of blocks at a stage may be for a block that is two ahead of the block for which a configuration is being generated.

Figure 5:
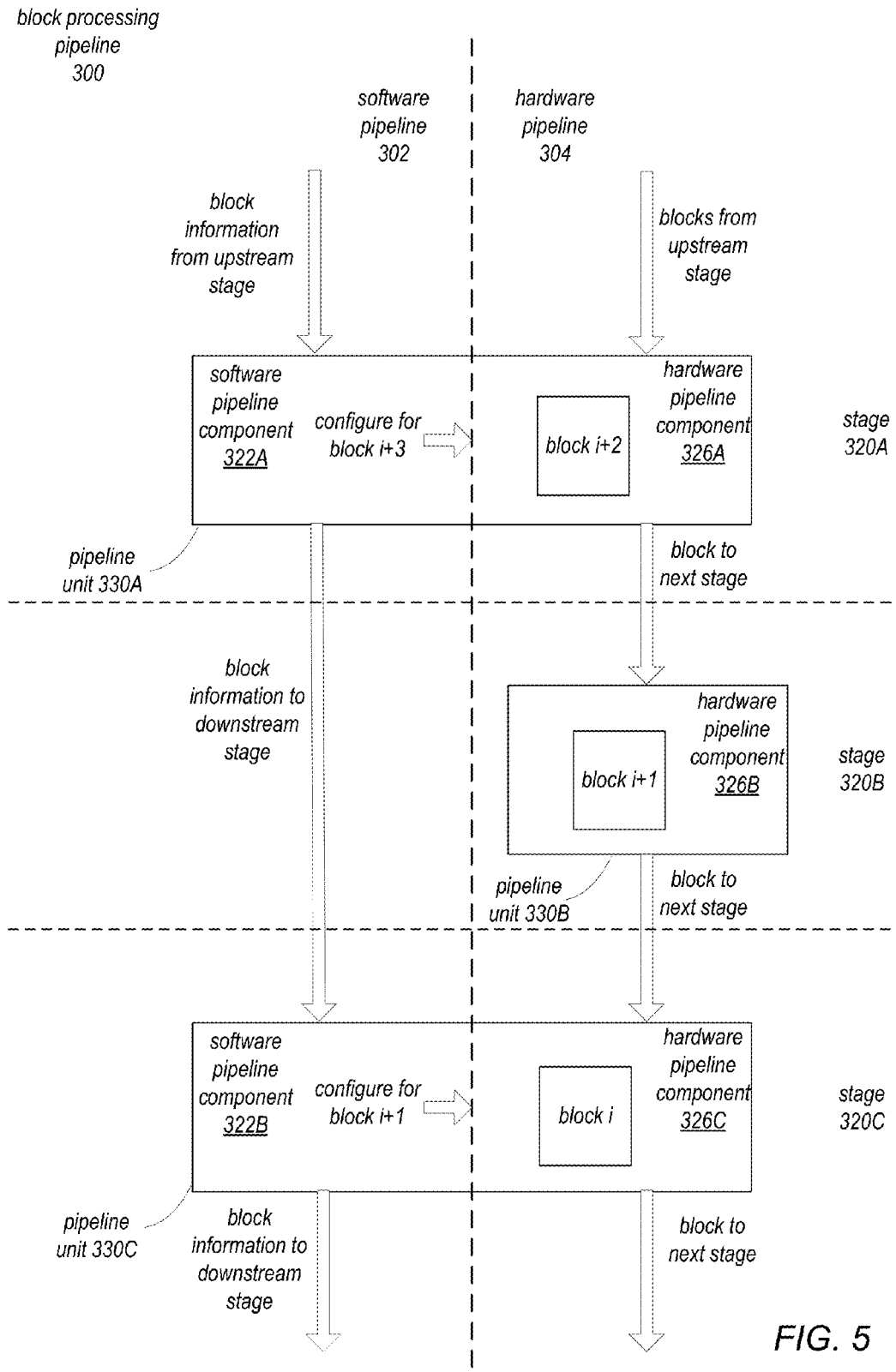
FIG. 5 illustrates an example block processing pipeline that implements a software pipeline and a hardware pipeline in which at least one stage is skipped by the software pipeline, according to at least some embodiments.

Alternatively, in some implementations, the software pipeline component 322 may wait for completion of the processing of a current block by the hardware pipeline component 326 at the stage, and use this information to determine a configuration for the next block. In this case, feedback of information from the processing of blocks at a stage may be for a block that is only one ahead of the block for which a configuration is being generated FIG. 5 illustrates an example block processing pipeline 300 that implements a software pipeline and a hardware pipeline in which at least one stage is skipped by the software pipeline, according to at least some embodiments. In some pipeline implementations, one or more pipeline units 330 of the pipeline 300 may include a hardware pipeline component 326 that does not require dynamic configuration. FIG. 5 shows three stages 320A, 320B, and 320C. Stage 320A includes pipeline unit 330A that includes both a software pipeline component 322A and a hardware pipeline component 326A, and stage 320C includes a pipeline unit 330C that includes both a software pipeline component 322B and a hardware pipeline component 326C. However, stage 320B includes a pipeline unit 330B that includes a hardware pipeline component 326B that does not require dynamic configuration, as the operation(s) the component 326 performs on a block are the same for all blocks. Thus, pipeline unit 330B does not utilize a software pipeline component 322.

As shown in FIG. 5, hardware pipeline component 326A at stage 320A is currently processing block i+2, while software pipeline component 322A at stage 320A is determining and setting the configuration for processing the next block (i+3) at stage 320A. Hardware pipeline component 326B at stage 320B is currently processing block i+1. Hardware pipeline component 326C at stage 320C is currently processing block i, while software pipeline component 322B at stage 320C is determining and setting the configuration for processing the next block (i+1) at stage 320A. In at least some embodiments, the block information for block i+2 may be pushed downstream from software pipeline component 322A to software pipeline component 322B once stage 320A completes the configuration for processing block i+2 and buffered at software pipeline component 322B until software pipeline component 322B is ready to configure hardware pipeline component 322C to process block i+2. Alternatively, stage 320B may include buffers to which block information is pushed from stage 320A and from which block information is pushed to stage 320C. As another alternative, stage 320A may buffer block information that it is done with until stage 320C is ready for the information.

Figure 6:
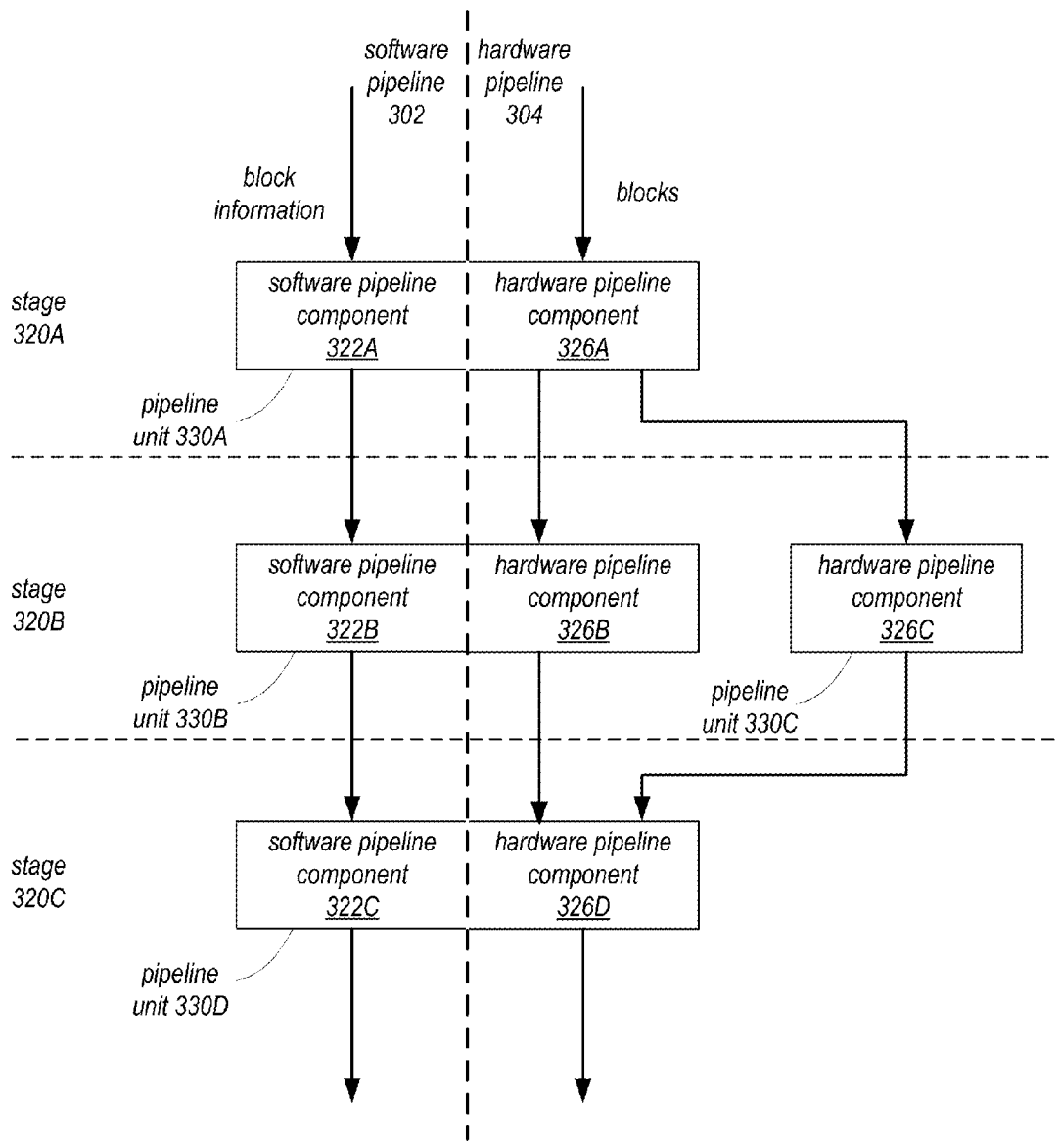
FIG. 6 illustrates an example block processing pipeline that implements a software pipeline and a hardware pipeline in which at least one stage includes multiple pipeline units, according to at least some embodiments.

FIG. 6 illustrates an example block processing pipeline 300 that implements a software pipeline and a hardware pipeline in which at least one stage includes multiple pipeline units, according to at least some embodiments. As shown in FIG. 6, stage 320A includes a single pipeline unit 330A that includes a software pipeline component 322A and a hardware pipeline component 326A, and stage 320C includes a single pipeline unit 330C that includes a software pipeline component 322C and a hardware pipeline component 326D. However, stage 320B include two pipeline units 320B and 320C. Pipeline unit 330B includes a software pipeline component 322B and a hardware pipeline component 326B. Pipeline unit 330C includes only a hardware pipeline component 326C. In hardware pipeline 304, blocks or portions of blocks from pipeline unit 330A at stage 320A pass through both hardware pipeline component 326B and hardware pipeline component 326C of stage 320B, which output processed blocks or portions of blocks to hardware pipeline component 326D of pipeline unit 330D in stage 320C. In software pipeline 302, block information is passed from software pipeline unit 322A at stage 320A to software pipeline unit 322B at stage 320B, and from software pipeline unit 322B at stage 320B to software pipeline unit 322C at stage 320C.

While not shown, in some implementations, a stage may include two or more pipeline units 330 that include both a software pipeline component 322 and a hardware pipeline component 336. In this case, an upstream stage may feed block information to the software pipeline component 322 of each pipeline unit at the stage 320. However, in at least some embodiments, only one of the software pipeline components 322 may push the block information to a software pipeline component 322 of a pipeline unit 330 at a downstream stage 320.

Figure 7:
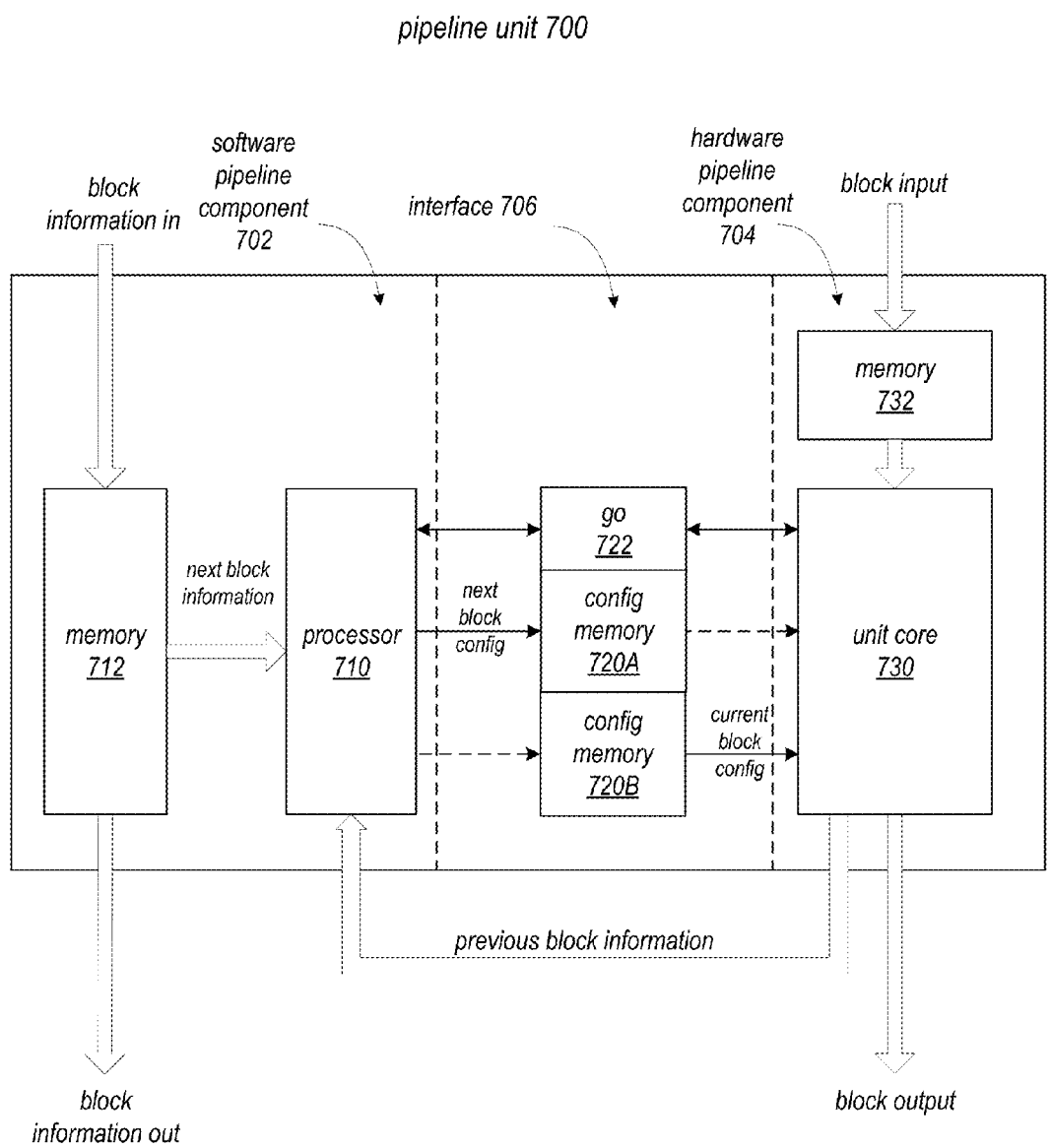
FIG. 7 illustrates components of an example pipeline unit that may be used at a stage of a block processing pipeline that implements a software pipeline and a hardware pipeline, according to at least some embodiments.

FIG. 7 illustrates components of an example pipeline unit that may be used at a stage of a block processing pipeline that implements a software pipeline and a hardware pipeline, according to at least some embodiments. As shown in FIG. 7, the hardware pipeline component 704 of a pipeline unit 700 may include at least a memory 732 and a unit core 730. Unit core 730 may be a component (e.g., a circuit) that is configured to perform a particular operation on or for a block, or a portion of a block, at a particular stage of the block processing pipeline. Memory 732 may, for example, be a double-buffered memory that allows the unit core 730 to read and process data for a block from the memory 732 while data for a next block is being written to the memory 732 from a previous pipeline unit.

As shown in FIG. 7, a pipeline unit 700, in addition to a hardware pipeline component 704 that includes memory 732 and unit core 730, may also include a software pipeline component 702 that includes at least a processor 710 and a memory 712. Processor 710 may, for example, be a mobile or M-class processor. The processors 710 may, for example, be configured to determine and set configurations for a next block to be processed at the hardware pipeline unit 704 according to block information received at the software pipeline component 702. In at least some embodiments, the processor 710 may also be configurable, for example with low-level firmware microcode, to allow flexibility in algorithms that are implemented by the block processing pipeline for various applications.

In at least some embodiments, the software pipeline component 702 may be configured to receive block information from a previous (upstream) stage of the pipeline and send block information to a subsequent (downstream) stage of the pipeline. In addition, a software pipeline component 702 at a last stage of the pipeline may be configured to send feedback data to an upstream stage (e.g. the first stage) of the pipeline. In at least some embodiments, the software pipeline component 702 may also receive information for a block that was previously processed by the hardware pipeline component 704 of the pipeline unit 700.

Software pipeline component 702 may buffer block information received from an upstream stage of the pipeline in memory 712, and push block information from memory 712 to a downstream stage of the pipeline. In at least some embodiments, memory 712 may be a double buffer memory so that an upstream stage can push block information for a next block to the software pipeline component 702 while the processor 710 is accessing block information for a previous block from the memory 712. In some embodiments, memory 712 may be able to buffer more than two sets of block information, for example in cases where the previous stage does not include a software pipeline component as shown by stage 320B in FIG. 5.

The processors 710 may read block information for a next block from memory 712 and determine a configuration for the next block according to the block information. In at least some embodiments, the processor 710 may also receive information for a block that was previously processed by the hardware pipeline component 704 of the pipeline unit 700 and use that information in determining the configuration for the next block.

As shown in FIG. 7, a pipeline unit 700 may also include an interface 706 between software pipeline component 702 and hardware pipeline component 704. In at least some embodiments, the interface 706 may be a set of registers. Note, however, that the interface 706 may be otherwise implemented. In the pipeline unit 700 as shown in FIG. 7, interface 706 includes at least config memory 720A, config memory 720B, and go 722. In at least some embodiments, the processor 710 may write to either of the config memories 720A and 720B, and the unit core 730 may read from either of the config memories 720A and 720B; the processor 710 and unit core 730 may toggle between the two memories 720, with the processor 710 writing to one while the unit core 730 is reading from the other. Alternatively, in some embodiments, the processor 710 may write to only one of the config memories 720 (e.g., config memory 720A), and the unit core 730 may read from only the other config memory 720 (e.g., config memory 720B); when the unit core 730 is ready for a new configuration and the configuration is ready, the configuration may be copied from config memory 720A to config memory 720B. Note that embodiments may also be implemented in which only a single configuration memory is used, or in which more than two configuration memories are used.

Go 722 may, for example, be implemented as one or more bits in a register or other memory, or may be otherwise implemented. In at least some embodiments, when processor 710 completes a configuration for a next block and has set the config memory 720 (e.g., config memory 720A) with the configuration, processor 710 may set go 722 to signal to the unit core 730 that the configuration for the next block is ready in the config memory 720 (e.g., config memory 720A). Unit core 730 may begin to process the next block once go 722 is set for the next block if processing of the current block is complete and the next block is ready in memory 732. Otherwise, unit core 730 may wait until completion of processing of the current block and/or the next block is ready in memory 732. Note that initially (for a first block in the pipeline) no block is being processed at the stage when the processor 710 configures the stage for the first block, and thus unit core 730 may begin to process the first block once go 722 is set for the first block and the first block is ready in memory 732. Once unit core 730 is done with the configuration in a config memory 720, the unit core 730 may clear go 722 to signal to processor 710 that the config memory 720 is available to receive the configuration for a next block.

Figure 8A:
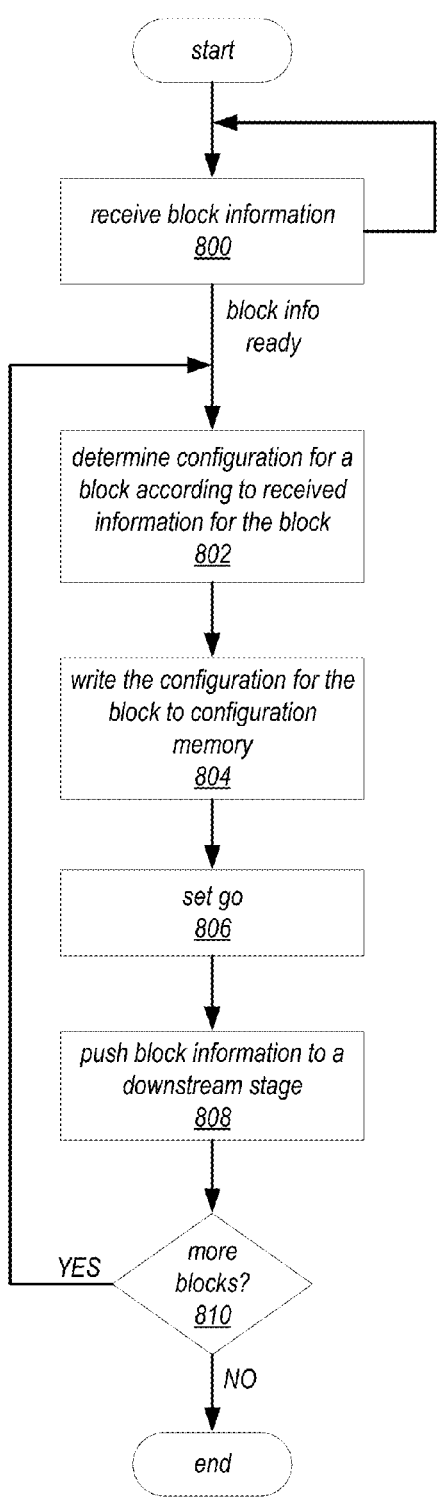
FIGS. 8A and 8B are flow diagrams illustrating methods of operation of a software pipeline and a hardware pipeline that operate in parallel in a block processing pipeline, according to at least some embodiments.
Figure 8B:
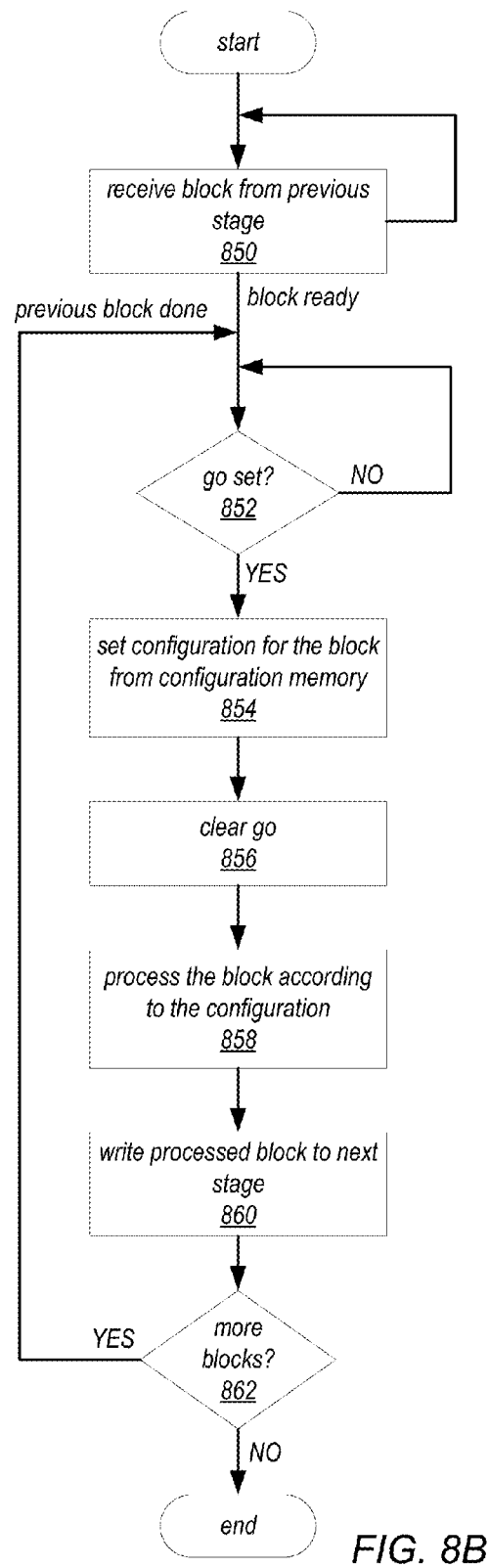

FIGS. 8A and 8B are flowcharts of methods of operation of a software pipeline and a hardware pipeline that operate in parallel in a block processing pipeline to process the blocks from a frame, according to at least some embodiments. FIG. 8A shows operations at a stage for the software pipeline, and FIG. 8B shows operations at the stage for the hardware pipeline. Note that the software pipeline runs one block ahead of the hardware pipeline.

Referring to FIG. 8A, as indicated at 800, a software pipeline component at a stage receives block information. The block information may include block information received from an upstream stage. In at least some embodiments, the software pipeline component may also receive information from a block of the frame that was previously processed at the stage. The block information for one, two, or more blocks may be buffered in a local memory of the software pipeline component. As indicated by the arrow that returns to element 800, element 800 may be iteratively performed as long as there are blocks in the frame to be processed.

As indicated at 802, once the block information for a next block is ready at the stage, the software pipeline component may determine a configuration for the block according to the received information for the block. As indicated at 804, the software pipeline component may write the configuration for the block to a configuration memory of the stage. As indicated at 806, the software pipeline component may set a go bit or otherwise signal to the hardware pipeline component at the stage that the configuration for the next block is ready in the configuration memory. As indicated at 806, the software pipeline component may then push the block information for the block to a downstream stage. At 810, if there are more blocks from the frame to be processed at the stage, the software pipeline method may return to element 802 to begin configuring the hardware pipeline component for a next block. Otherwise, processing of the frame at this stage is done, and the method completes.

Referring to FIG. 8B, a hardware pipeline component at a stage receives blocks to be processed from a previous stage. The block information may be buffered in a local memory of the hardware pipeline component. In at least some embodiments, the local memory may be a double buffer memory so that the previous stage can write a next block to the stage while the hardware pipeline component is processing a current block from the memory. As indicated by the arrow that returns to element 850, element 850 may be iteratively performed as long as there are blocks in the frame to be processed.

At 852, if the hardware pipeline component is not currently processing a block, a next block is ready in the memory, and the software pipeline component has signaled to the hardware pipeline component that a configuration for the next block is ready in the configuration memory (e.g., by setting a go bit or flag), then the hardware pipeline component may begin to process the next block. In at least some embodiments, if any of these three conditions is not met, the hardware pipeline component waits until all three are met. Note, however, that for a first block in the frame to be processed, there will not be a current block being processed at the hardware pipeline component when the first block is received for processing at the hardware pipeline component.

If all necessary conditions are met, then as indicated 854 the hardware pipeline component sets the configuration for processing the next block according to the configuration in the configuration memory. As indicated at 856, the hardware pipeline component clears the go bit or otherwise signals to the software pipeline component that the configuration memory is available. As indicated at 858, the hardware pipeline component processes the block according to the configuration for the block. As indicated at 860, the hardware pipeline component writes the processed block to the next stage. Alternatively, at a last stage, the processed block may be written to a memory, for example to an external memory via direct memory access (DMA). At 862, if there are more blocks from the frame to be processed at the stage, the hardware pipeline method may return to element 852 to begin processing a next block when all conditions are met. Otherwise, processing of the frame at this stage is done, and the method completes.

Note that elements 802 through 808 of FIG. 8A are performed by the software pipeline component at a stage for an initial block in the frame before elements 854 through 860 of FIG. 8B are performed by the hardware pipeline component at the stage. After that, elements 802 through 808 of FIG. 8A may be performed by the software pipeline component at the stage to configure the hardware pipeline component for a next block while elements 854 through 860 of FIG. 8B are performed by the hardware pipeline component to process a current block.

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 9:
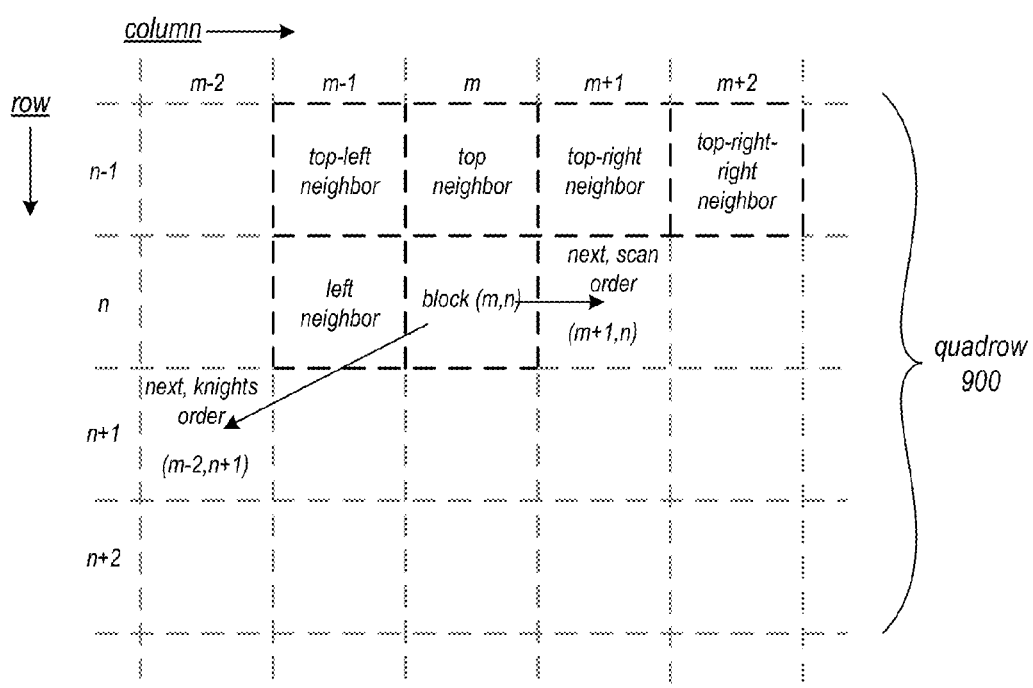
FIG. 9 illustrates neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 9 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 9, information from the left neighbor of block (m,n) may be required to perform a particular operation on the block. In the knight's order processing method, rather than inputting block (m+1, n) into the pipeline immediately after block (m,n), the next block input to the pipeline is block (m−2,n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 9 and quadrow 900, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 9. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
The next block is two columns left, one row down (−2,+1).
Otherwise, at the bottom row of a quadrow:
The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
The next block is p columns left, one row down (−p,+1).
Otherwise, at the bottom row of a row group:
The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

Figure 10A:
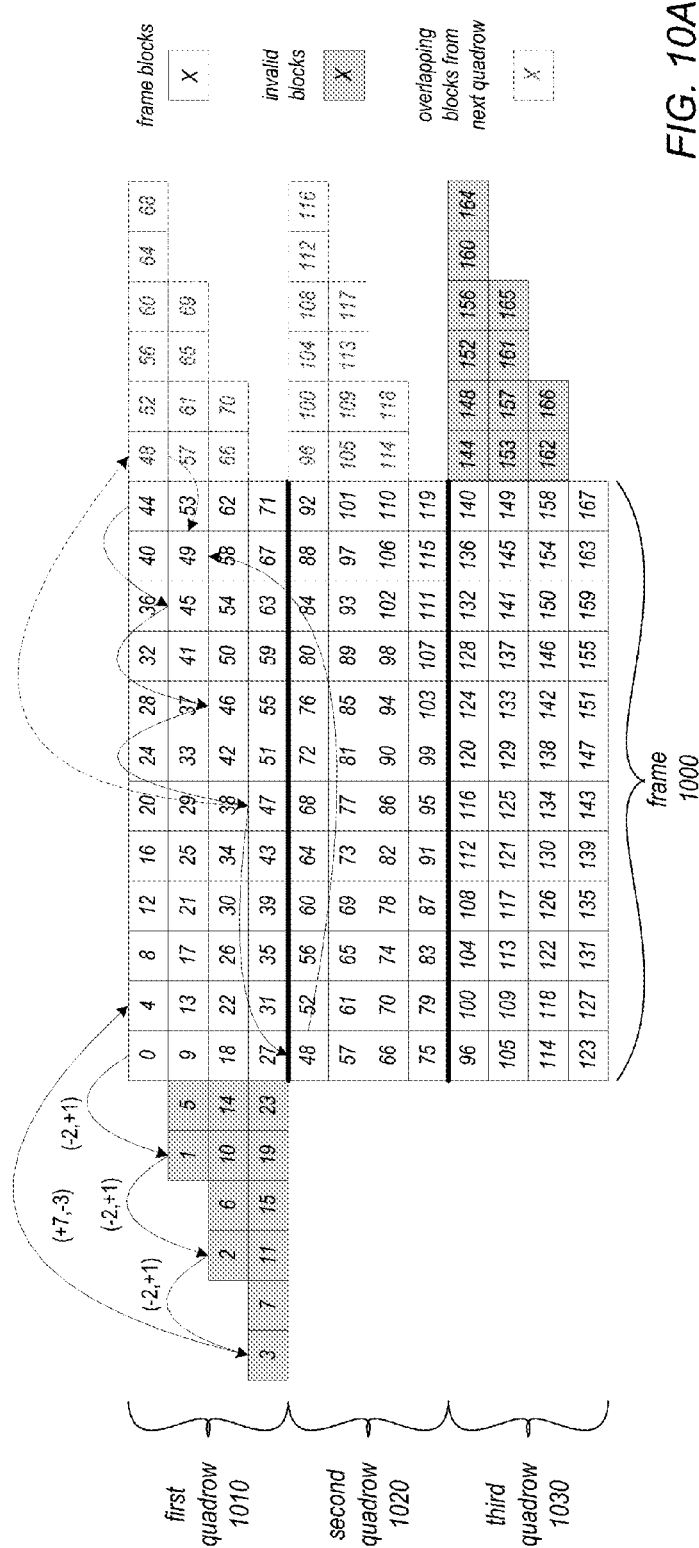
FIGS. 10A and 10B graphically illustrate the knight's order processing method including the algorithm for determining a next block, according to at least some embodiments.
Figure 10B:
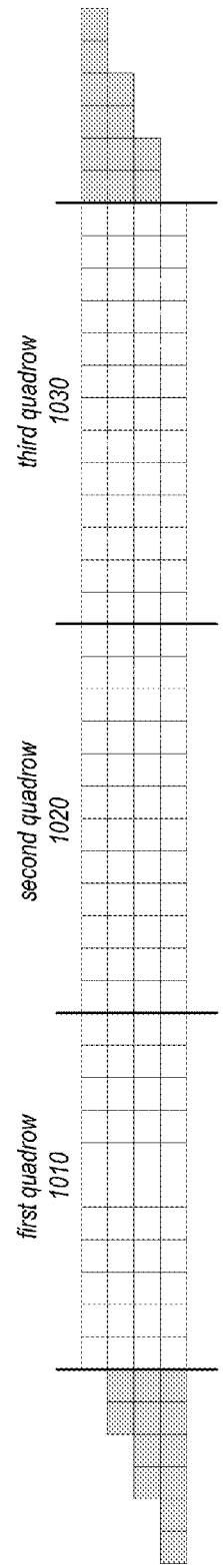

FIGS. 10A and 10B graphically illustrate the knight's order processing method, according to at least some embodiments. For simplicity, these Figures use an example 192×192 pixel frame 1000 divided into 144 16×16 pixel blocks, with 12 rows and 12 columns of blocks. However, it is to be noted that the knight's order processing method can be applied to input video frames of any dimensions. In FIG. 10A, an example frame is divided into rows and columns of blocks. The rows of blocks are partitioned into three quadrows (1010, 1020, and 1030) including four rows each. The last three rows of the first quadrow (1010) are padded on the left with invalid blocks, and the first three rows of the last (third) quadrow (1030) are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 10A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 10A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows 1010, 1020, and 1030 as if they were arranged end to end, with invalid blocks at each end, as shown in FIG. 10B. Thus, the algorithm for determining a next block remains the same across the entire frame 1000.

In some embodiments, each row of the first quadrow may be padded with extra invalid blocks, for example with two extra invalid blocks. Instead of beginning with the first block in the top row of the first quadrow as shown in FIG. 10A, input to the pipeline may begin with the first invalid block to the left of the first block in top row of the first quadrow.

Figure 11A:
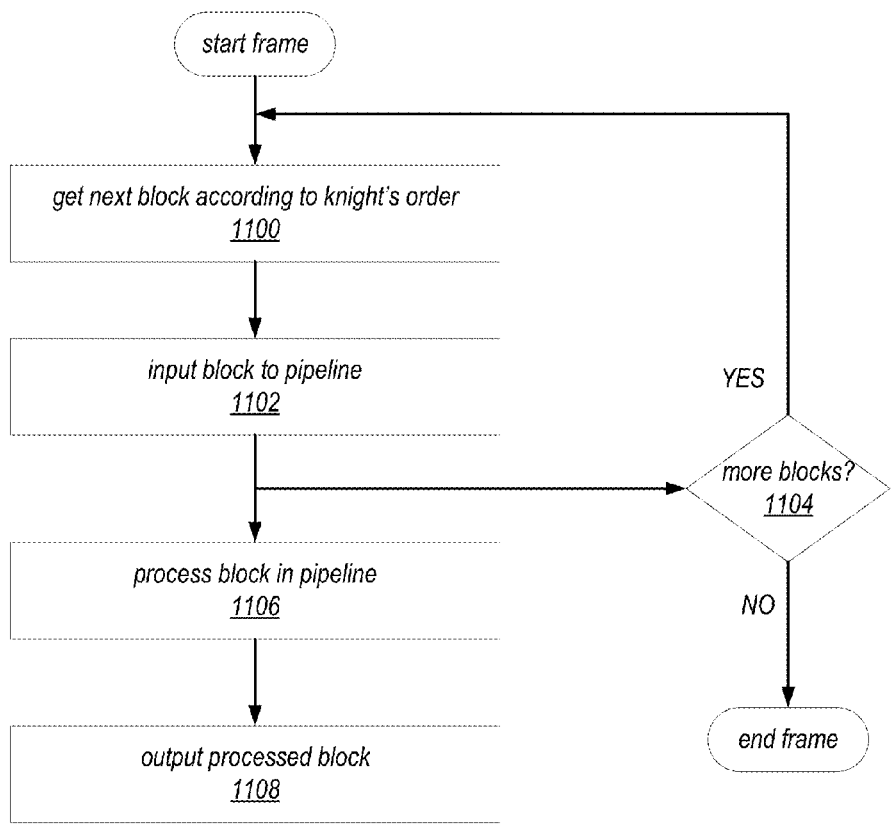
FIGS. 11A and 11B are high-level flow diagrams illustrating a knight's order processing method for a block processing pipeline, according to at least some embodiments.
Figure 11B:
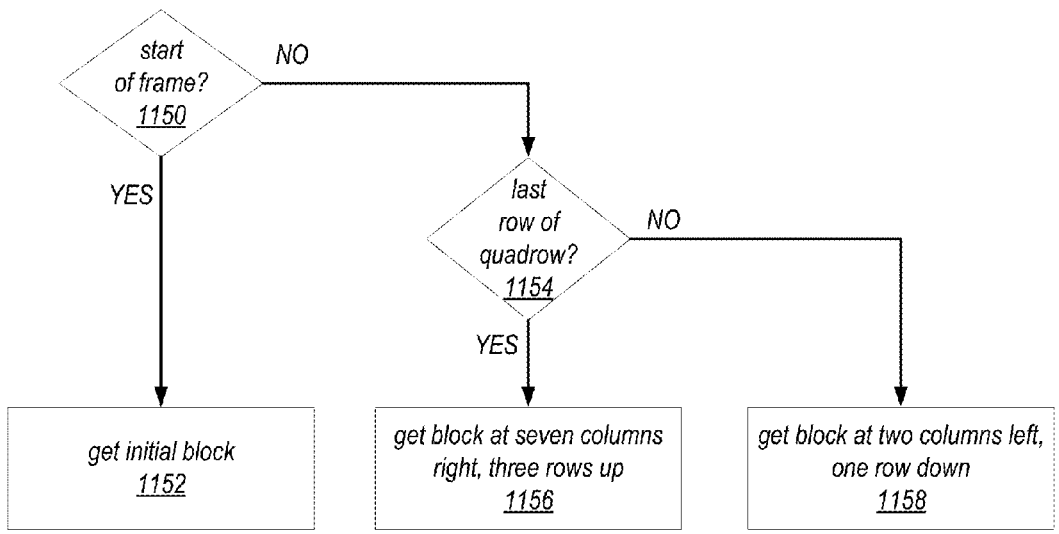

FIGS. 11A and 11B are high-level flowcharts of a knight's order processing method for a block processing pipeline, according to at least some embodiments. In FIG. 11A, as indicated at 1100, a next block is determined according to the algorithm for determining a next input block that is implemented by the knight's order processing method. As indicated at 1102, the block is input to the pipeline, for example from a memory via direct memory access (DMA). As shown by 1104, the input process of elements 1100 and 1102 continues as long as there are blocks to be processed. Each block that is input to the pipeline by elements 1100 and 1102 is processed in the pipeline, as indicated at 1106. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 1108, once a block has been processed by a last stage of the pipeline, the processed block is output, for example to a memory via direct memory access (DMA).

FIG. 11B is a flowchart of an example algorithm for determining a next input block that that may be implemented by the knight's order processing method, and expands on element 1100 of FIG. 11A. FIG. 11B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 1150, if at the start of the frame, the method gets an initial block as indicated at 1152. If this is not the start of the frame, then at 1154, if this is the last row of the quadrow, the next block is seven columns right, three rows up, as indicated at 1156. If this is not the last row of the quadrow, the next block is two columns left, one row down, as indicated at 1158.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 3. The knight's order processing method with quadrow constraints provides locality of neighbor information that may be leveraged to provide local caching of neighbor data at each stage of the pipeline in relatively small local buffers. For example, in some embodiments, the cached neighbor data may include source transform coefficients (e.g., DC transform coefficients), modified transform coefficients, previously computed quantization errors, and/or weighting coefficient values for one or more neighbor pixels. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 12:
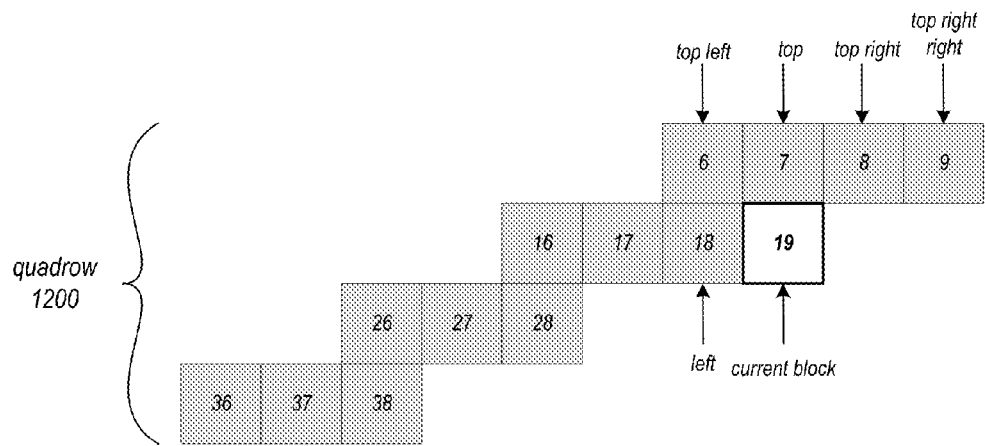
FIG. 12 illustrates a portion of a quadrow as processed in a pipeline according to the knight's order processing method that may be cached in the current quadrow buffer, according to at least some embodiments FIG. 13 graphically illustrates blocks in a current quadrow being processed according to the knight's order processing method, as well as neighbor blocks in the last row of the previous quadrow that may be cached in a previous quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 12 shows a portion of a quadrow 1200 as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 13:
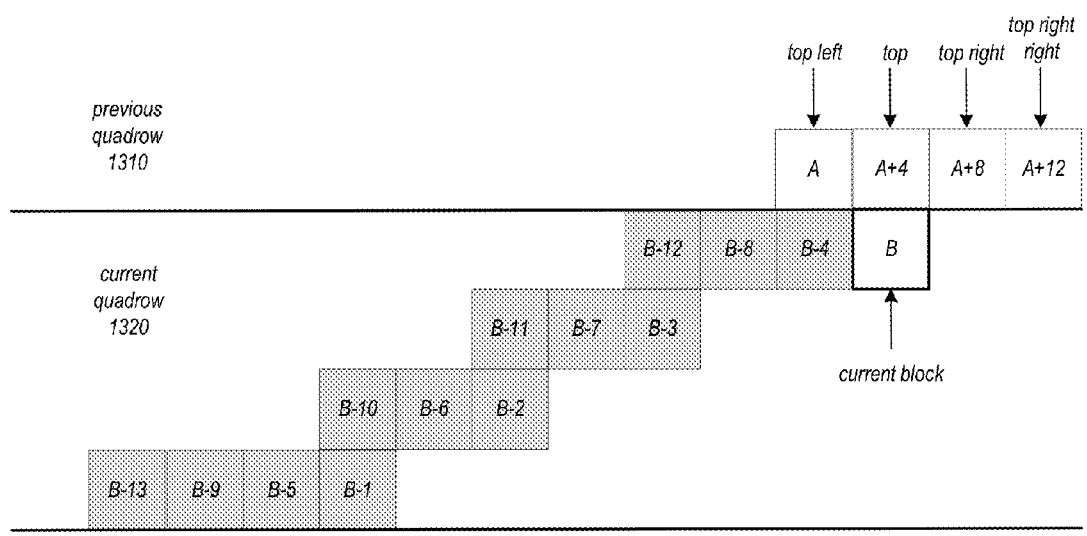

FIG. 13 graphically illustrates blocks in a current quadrow 1320 being processed according to the knight's order processing method, as well as neighbor blocks in the last row of the previous quadrow 1310, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B−1 (B minus 1) through B−13 (B minus 13) represent the thirteen blocks that were most recently processed at the stage in the current quadrow. Information from these blocks may be presently cached in the stage's current quadrow buffer, with B−1 as the most recent entry and B−13 as the oldest entry. B−4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 14:
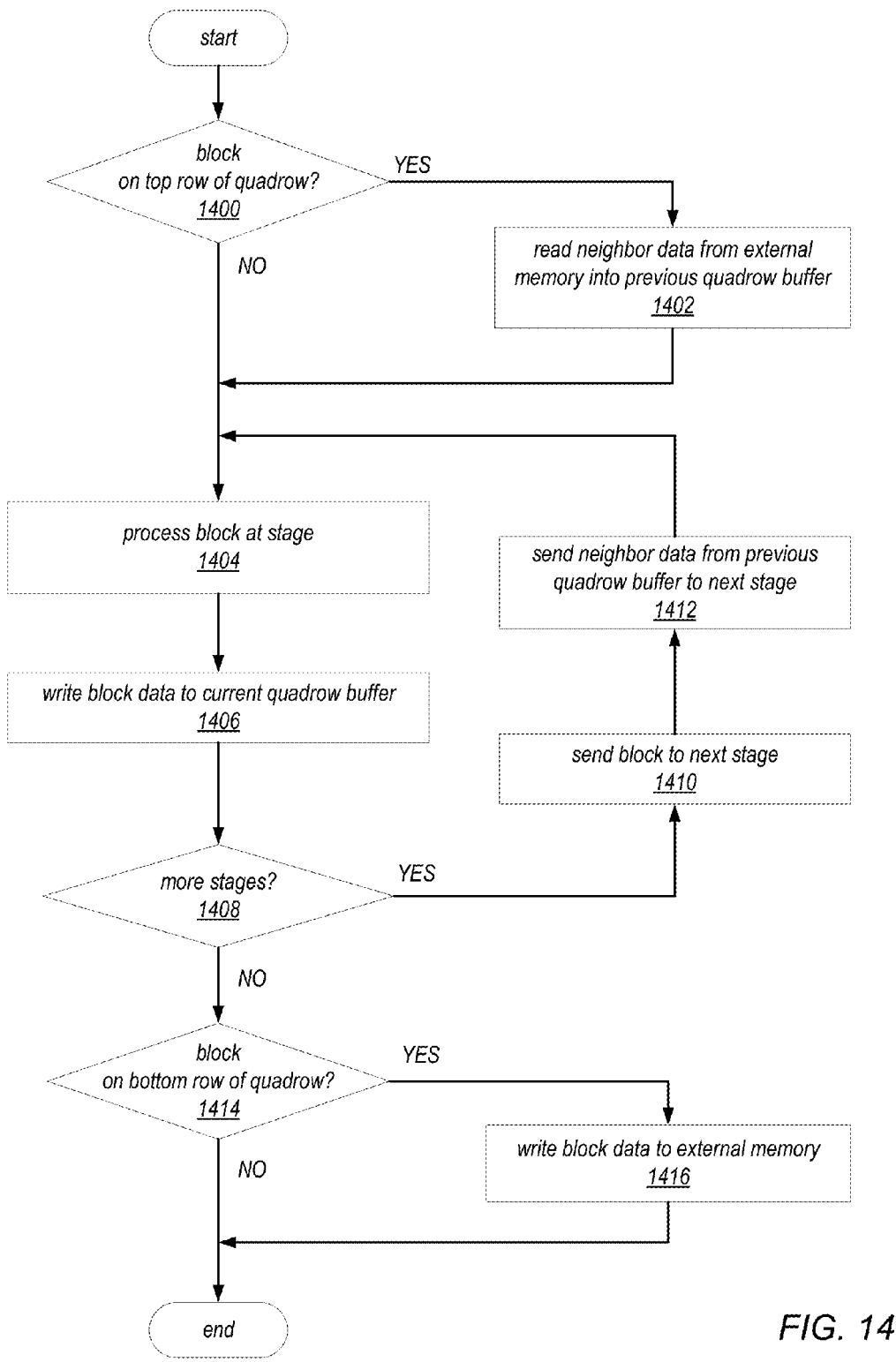
FIG. 14 is a flow diagram illustrating a method for processing blocks in a block processing pipeline in which neighbor data is cached in local buffers at the stages of the pipeline, according to at least some embodiments.

FIG. 14 is a flow diagram illustrating a method for processing blocks in a block processing pipeline in which neighbor data is cached in local buffers at the stages of the pipeline, according to at least some embodiments. For example, the method of FIG. 14 may be used at element 1106 of FIG. 11A to process blocks input to the pipeline according to the knight's order processing method as shown at elements 1100, 1102, and 1104 of FIG. 11A. In FIG. 14, a block is input to the pipeline. At 1400, at a first stage of the pipeline, if the block is on the top row of a quadrow, then neighbor data for the block may be read from external memory (for example, via DMA) into a previous quadrow buffer as indicated at 1402. In at least some embodiments, the neighbor data corresponds to the top-right-right neighbor of the current block on the bottom row of the previous quadrow. As indicated at 1404, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 1406, information about the current block may be written to the current quadrow buffer at the stage for use on subsequent blocks. The information may overwrite an oldest entry in the current quadrow buffer.

At 1408, if there are more stages, then the block may be sent to a next stage, as indicated at 1410. At 1412, neighbor information from the previous quadrow buffer may also be sent to the next stage. In at least some embodiments, this neighbor information is only sent to the next stage if the current block is on the top row of a quadrow. Elements 1404 through 1412 may be repeated until the block reaches and is processed by a last stage of the pipeline. At 1408, if there are no more stages, then processing of the block in the pipeline is done. At 1414, if the block is on the bottom row of a quadrow, then information for the block is written to an external memory (for example, via DMA) to be read as neighbor data for blocks in the top row of a next quadrow. In addition, all of the processed valid blocks are output as shown by element 1108 of FIG. 11A.

Example Pipeline Units

Figure 15A:
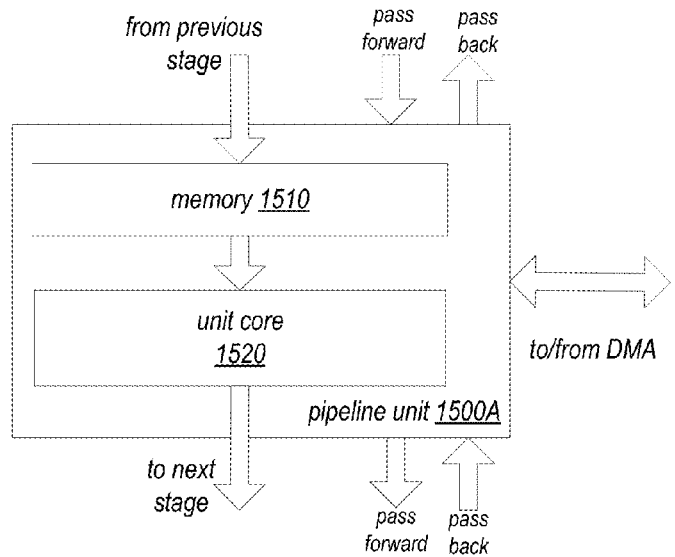
FIGS. 15A and 15B are block diagrams of example pipeline processing units that may be used at the stages of a block processing pipeline that implements one or more of the block processing methods and apparatus as described herein, according to at least some embodiments.
Figure 15B:
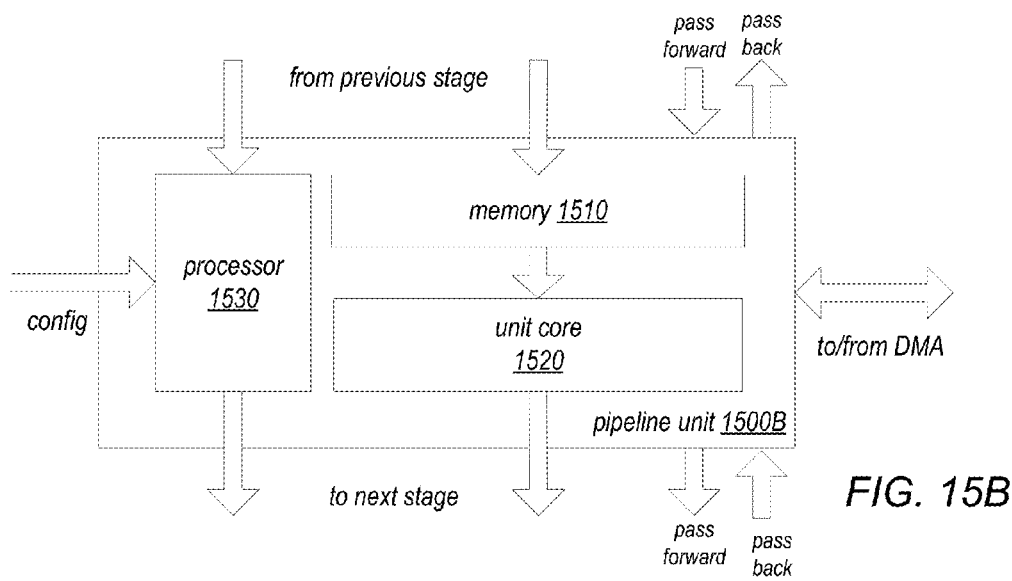
Figure 15C:
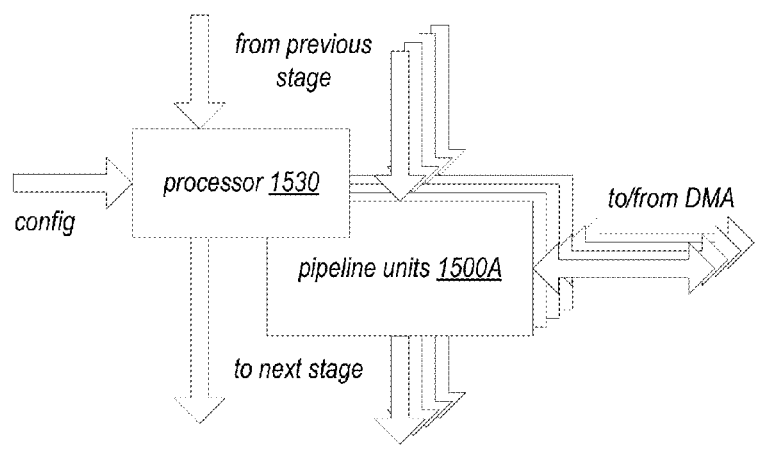
FIG. 15C illustrates that a single processor may be associated with a group of two or more pipeline units, according to at least some embodiments.

FIGS. 15A through 15C are block diagrams of example pipeline processing units that may be used at the stages of a block processing pipeline that implements one or more of the block processing methods and apparatus as described herein, according to at least some embodiments. For example, one or more of pipeline units 1500A and/or 1500B as shown in FIGS. 15A and 15B may be used at each stage of the example block processing pipeline shown in FIG. 16. Note that FIGS. 15A through 15C are not intended to be limiting; a pipeline processing unit may include more or fewer components and features than those shown in the Figures.

As shown in FIG. 15A, a pipeline unit 1500A may include at least a memory 1510 and a unit core 1520. Unit core 1520 may be a component (e.g., a circuit) that is configured to perform a particular operation on or for a block, or a portion of a block, at a particular stage of the block processing pipeline. Memory 1510 may, for example, be a double-buffered memory that allows the unit core 1520 to read and process data for a block from the memory 1510 while data for a next block is being written to the memory 1510 from a previous pipeline unit.

As shown in FIG. 15B, a pipeline unit 1500B, in addition to a memory 1510 and unit core 1520 as shown in FIG. 15A, may also include a processor 1530. Processor 1530 may, for example, be a mobile or M-class processor. The processors 1530 in pipeline units 1500B of a block processing pipeline may, for example, be used to control the block processing pipeline at block boundaries. The processors 1530 in pipeline units 1500B may be configurable, for example with low-level firmware microcode, to allow flexibility in algorithms that are implemented by the block processing pipeline for various applications. In at least some embodiments, a processor 1530 of a pipeline unit 1500B in the pipeline may be configured to receive data from a processor 1530 of a previous (upstream) pipeline unit 1500B and send data to a processor 1530 of a subsequent (downstream) pipeline unit 1500B. In addition, a processor 1530 of a pipeline unit 1500B at a last stage of the pipeline may be configured to send feedback data to a processor 1530 of a pipeline unit 1500B at a first stage of the pipeline.

As shown in FIGS. 15A and 15B, a pipeline unit 1500A or 1500B may be configured to access external memory, for example according to direct memory access (DMA). In addition, a pipeline unit 1500A or 1500B may be configured to pass information back to one or more previous (upstream) stages of the pipeline and/or to receive information passed back from one or more subsequent (downstream) stages of the pipeline. In addition, a pipeline unit 1500A or 1500B may be configured to pass information forward to one or more subsequent (downstream) stages of the pipeline and/or to receive information passed forward from one or more previous (upstream) stages of the pipeline.

As shown in FIG. 15C, two or more units 1500A as shown in FIG. 15A may be grouped together and configured to perform an operation in the pipeline. A single processor 1530 may be used to control and/or configure the pipeline units 1500A.

Example Block Processing Pipeline

FIG. 16 is a high-level block diagram of general operations in an example block processing method 1600 for H.264 encoding that may be implemented in stages by a block processing pipeline that may implement one or more of the block processing methods and apparatus as described herein, according to at least some embodiments. A block processing pipeline that implements the block processing method 1600 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080 p (1920×1080 pixels, 2.1 megapixels) encoded in YCbCr color space. However, other input video formats may be encoded into H.264 using embodiments of the pipeline in a video encoder apparatus.

Figure 27:
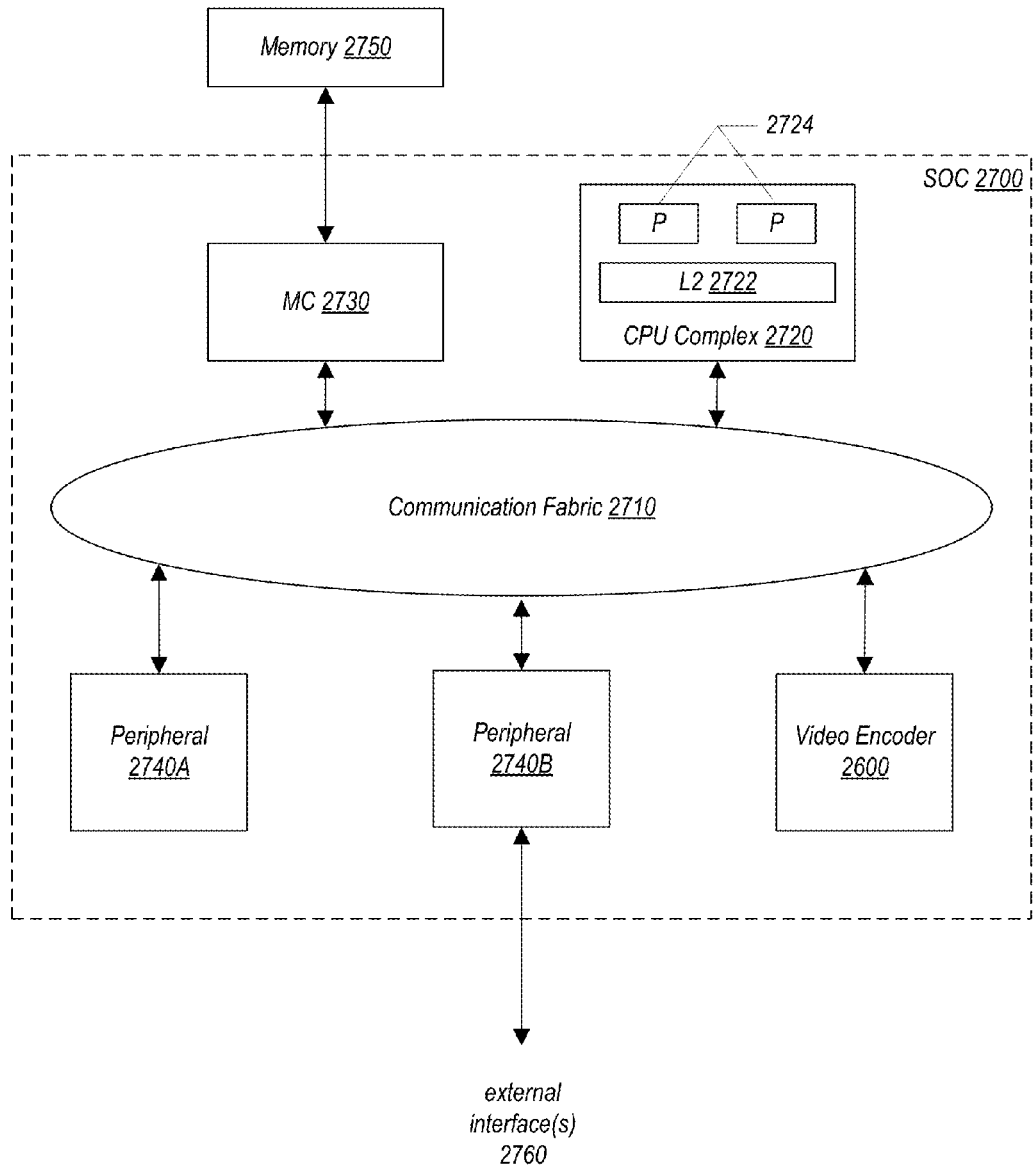
FIG. 27 is a block diagram illustrating one embodiment of a system on a chip (SOC) that includes a video encoder.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 16, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 26. An example SOC that includes a video encoder apparatus is illustrated in FIG. 27. While embodiments are generally described in relation to hardware implementations of a block processing pipeline that implements the block processing method 1600 with knight's order processing, note that the block processing method 1600 with knight's order processing may be implemented by a block processing pipeline implemented in software.

A pipeline that implements the method 1600 as shown in FIG. 16 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 1600 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 1600 as shown in FIG. 16 that may be performed in stages by a pipeline, as well as general data flow through the pipeline, are briefly described below. Each of the general operations of the method 1600 may be implemented by one or more pipeline units at one or more stages of the pipeline. Example pipeline units are illustrated in FIGS. 9A through 9C. Also note that each general operation shown in FIG. 16 may be subdivided into two or more operations that may be implemented by pipeline units at one, two, or more stages of the pipeline. However, two or more of the operations shown in FIG. 16 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 16 and described below.

Macroblock Input

In at least some embodiments, macroblock input 1602 may be performed by an initial stage of the pipeline. In at least some embodiments, macroblock input 1602 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 1610 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 1602 reads neighbor data from the bottom row of a previous quadrow from memory at quadrow boundaries and passes the neighbor data to at least one downstream stage.

Intra-frame and Inter-frame Estimation

Intra-frame and inter-frame estimation 1610 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 1610 operations may be subdivided into two or more sub-operations that may be performed at one, two, or more stages of the pipeline, with one or more components or pipeline units at each stage configured to perform a particular sub-operation.

In at least some embodiments, macroblock input 1602 reads neighbor data from the bottom row of a previous quadrow from memory at quadrow boundaries and passes the neighbor data to intra-frame and inter-frame estimation 1610, for example to an intra-frame estimation component. In addition, motion compensation and reconstruction 1630, for example a luma reconstruction component, may pass neighbor data as feedback to intra-frame and inter-frame estimation 1610, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 1620.

In at least some embodiments, motion estimation may also include a direct mode estimation component that receives co-located and spatial motion vector data and computes a direct/skip mode cost, which it provides to mode decision 1620. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 1620.

In at least some embodiments, macroblock input 1602 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 1620 may be implemented by a mode decision component at a stage of the pipeline that is downstream of the stage(s) that implement intra-frame and inter-frame estimation 1610 operations. However, in some embodiments, mode decision 1620 operations may be subdivided into two or more sub-operations that may be performed at one, two, or more stages of the pipeline, with one or more components or pipeline units at each stage configured to perform a particular sub-operation. In at least some embodiments, the mode decision 1620 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, sub-partitions, prediction direction and reference frame indices. In at least some embodiments, the mode decision 1620 component also performs all motion vector prediction. The motion vector prediction results may be used when estimating motion vector rate during mode decision. In at least some embodiments, the motion vector prediction results may also be fed back from the mode decision 1620 component to motion estimation, for example for use in direct mode estimation and motion vector rate estimation.

Motion Compensation and Reconstruction

In at least some embodiments, motion compensation and reconstruction 1630 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 1630 may be subdivided into luma motion compensation and reconstruction and chroma motion compensation and reconstruction. In at least some embodiments, each of these sub-operations of motion compensation and reconstruction 1630 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 1620. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 1620, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component (or an FTQ block thereof). The coefficient data is sent to an ITQ technique implemented by the luma reconstruction component (or an ITQ block thereof), and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1610 as feedback for use as neighbor data when processing subsequent macroblocks. In at least some embodiments, reconstructed pixels may also be passed back to an intra prediction neighbor pixel memory at the stage for use as neighbor pixels when predicting subsequent blocks inside the current macroblock at the stage.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 1620 results. The chroma motion compensation component performs subpixel interpolation to generate a prediction block. Mode decision 1620 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 1610 so that reconstructed pixels can be used during the estimation process. In at least some embodiments, if the best mode is an intra mode, intra chroma estimation may be performed based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline, as shown in 1640 of FIG. 16. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory. Note that in other embodiments, an encode component of the pipeline may generate an output stream other than a CAVLC encoded bit stream, for example an output stream in a proprietary format or in a format defined by another compression standard, such as the HEVC standard.

In at least some embodiments, the deblocking filter component and the CAVLC encode component write neighbor data for the bottom row of a quadrow to a memory at quadrow boundaries. Referring again to FIG. 16, for the top row of a next quadrow, macroblock input 1602 may then read this neighbor data from the memory at quadrow boundaries and pass the neighbor data to at least one downstream stage of the pipeline.

Transcoder

In at least some embodiments, a transcoding operation may be performed by a transcoder 1650. The transcoder may be implemented as a functional component of the pipeline or as a functional component that is external to the pipeline. In at least some embodiments, the transcoder 1650 may perform a memory-to-memory conversion of a CAVLC (context-adaptive variable-length coding) encoded stream output by the pipeline to a CABAC (context-adaptive binary arithmetic coding) encoded stream. Note that in other embodiments, the transcoder 1650 may perform a memory-to-memory conversion of data in a format other than a CAVLC encoded bit stream (e.g., data in a proprietary format or in a format defined by another compression standard, such as the HEVC standard) to a CABAC encoded bit stream.

In at least some embodiments, the pipeline may encode in an order other than scan order, for example knight's order as previously described herein. However, ultimately, the H.264 video encoder's encoded bit stream should be transmitted in conventional macroblock scan order. In at least some embodiments, re-ordering the macroblock output from knight's order to scan order is accomplished by the CAVLC encode component writing encoded data to four different output buffers, each output buffer corresponding to a macroblock row. At the end of a quadrow, each row buffer will contain a scan order stream of encoded macroblocks for a respective row. Transcoder 1650 handles stitching the start and end of each row to generate a continuous stream at macroblock row boundaries. In at least some embodiments, the pipeline may embed metadata in the CAVLC output stream to facilitate stitching of the rows by the transcoder 1650.

Computing and Using Gradient Histograms to Detect Text

As previously noted, some embodiments of the video encoding pipelines described herein may compute gradient histograms for each macroblock to be processed in the pipeline, may use those histograms to determine the likelihood that a given macroblock represents a portion of a video frame that includes text, and, if it is determined that the given macroblock is likely to represent a portion of a video frame that includes text, may adjust various encoding parameter values to improve the quality of the encoding of the given macroblocks (e.g., using different parameter values when encoding the given macroblock than when encoding other macroblocks in the same video frame or other video frames that are not likely to contain text).

As noted above, in at least some embodiments, macroblock input 1602 may receive luma and chroma pixels from a memory, compute statistics on input pixels that are used by firmware in downstream stages of the pipeline, and buffer input macroblocks to enable firmware look ahead. The statistics collected on input macroblocks may include (e.g., for each 16×16 macroblock on luma, in systems that implement the H.264 standard, or for each Coding Tree Unit, Coding Unit, or Transform Unit on luma and/or chroma, in systems that implement the H.265 standard) horizontal and vertical gradients (Gx and Gy) on luma and/or chroma, and/or gradient histograms for Gx and Gy on luma and/or chroma, in different embodiments. In at least some embodiments, the macroblock input may also compute statistics reflecting the variance within macroblocks, which is, in general, a second order effect. The variance information may provide information that is useful in classifying macroblocks. For example, if a macroblock represents a portion of an image containing a patch of grass, it will exhibit a relatively high variance, which may indicate to the video encoding pipeline that it should be classified as a texture, and encoded in a manner that is appropriate for encoding high frequency areas. However, a macroblock containing text (even when the text is on a flat background) may also exhibit a relatively high variance. Therefore, the variance alone may not be useful for determining whether a macroblock contains text, a texture, or a collection of objects with sharp edges. In some embodiments, the systems and methods described herein may be used to determine the likelihood that a given macroblock represents a portion of a video frame that contains text (e.g., to distinguish between relatively flat areas that happen to include text and texture areas), based on one or more histograms of gradient information and/or statistics derived from those histograms. In such embodiments, if the given macroblock represents (or is determined to be likely to represent) a portion of a video frame that contains text, adjustments may be made to the encoding operations performed on the given macroblock to provide high quality encoding for that macroblock, to improve the experience for the viewer.

The human vision system can detect differences within flat areas of an image much more easily than within texture areas. For example, for two neighboring macroblocks (or portions thereof) in a flat region of a video frame (or in successive video frames), even small differences in the final images (e.g., after reconstruction, etc.) may be noticeable to the viewer (e.g., resulting in a bending effect, a halo effect, or other effects due to quantization errors, in some cases). However, with high texture areas, human vision systems have a way to mask differences. In other words, when there is a dominant signal, even if the images are slightly different from each other, the viewer is unlikely to see those differences. Human vision systems are also highly trained for viewing text, and may object to an encoding result in which any text in the video frame is not sharp or exhibits quantization errors (e.g., bending, ringing, or halo effects). For example, in wireless display encoding (in which the content of a computer desktop is compressed and transmitted to a wireless display), it may be objectionable for video frames (or portions thereof) that contain text to be encoded in a manner that results in the text not being sharp or in the image exhibiting such quantization artifacts.

Given limitations on computation budgets for performing macroblock encoding within a video encoding pipeline (which may be on the order of hundreds of cycles) and, in some cases, bandwidth for streaming the results over a network to a device on which it will be displayed, a traditional encoding approach may allocate more of the computation budget and/or bandwidth to flat areas. For example, a traditional encoder may increase a quantization parameter (e.g., for QP modulation during luma reconstruction) for textured (high frequency) areas of a video frame, encoding it with lower quality than that with which flat areas are encoded, because it will be less objectionable to the viewer. However, it may not be desirable to apply encoding parameters that are suitable for encoding high texture macroblocks (e.g., parameters that result in a lower quality result) when encoding macroblocks that include a mix of flat areas (e.g., a background) and text, because a higher quality result is more important to the viewer when the macroblock includes text. In some embodiments, the systems described herein may be able to distinguish between macroblocks that represent portions of a video frame containing text and those that represent portions of a video frame containing other objects that include sharp edges, and to adjust various encoding parameters accordingly.

In some embodiments, a macroblock input component of the video encoding pipelines described herein may be configured to determine that a given macroblock is likely to include text, and to make that information available to components in other stages of the video encoding pipeline as an input to their operations (e.g., as a hint to treat the macroblock differently than it might otherwise have). For example, if a viewer is scrolling quickly through a screen that includes text, they may not actually be focused on the text, and the quality of the encoding for those video frames (and the macroblocks thereof that contain text) may not be critical. However, once the viewer stops scrolling and begins to read an article, it may be desirable to present video frames in which the macroblocks containing text have been encoded at a higher quality. In some embodiments, by providing gradient information, histograms of gradient information, macroblock-level, slice-level, or frame-level statistics based on the gradient information, on the histograms or on the history of the frame-level statistics/gradient information from one or more previous frames, or encoding parameters that were computed based on such information, various components in different stages of the video encoding pipeline may recognize these situations (and other situations in which it may be desirable to encode a macroblock containing text differently than other macroblocks) and make appropriate adjustments.

As described in more detail below, in some embodiments, a macroblock input component for a block processing pipeline (e.g., a video encoding pipeline) may compute gradients in multiple directions and may accumulate the gradient information (in any of a variety of ways) to compute one or more histograms of the gradient information. In some embodiments, the computation of the gradients and the histograms may be performed by in hardware in the macroblock input component. Data representing the gradients and histograms may be stored in a data structure from which it may be accessed by software running on a CPU at the macroblock input stage. The software may analyze the data to determine whether the macroblock is likely to contain text (e.g., by determining whether there is a dominant gradient direction in the macroblock). If so, the software may take steps to make this information (and/or other information, such as various encoding parameters that are suitable for use in encoding the macroblock) available to other stages of the pipeline. For example, in some embodiments, the software running on the CPU at the macroblock input stage may compute various parameters for biasing or controlling quantization, mode decisions, or other operations, and may push this information (and/or the statistics used to compute them) to components in other stages. Subsequently, statistics and/or additional encoding parameters that are computed by these other stages may, in turn, be passed to stages even farther down the pipeline, in some embodiments. In other embodiments, statistics and/or encoding parameters that are computed at the macroblock input stage or at any subsequent stage of the video encoding pipeline may be stored in a shared data structure (e.g., a statistics buffer) from which they may be accessed by components at any of the stages of the video encoding pipeline, as appropriate.

Figure 17:
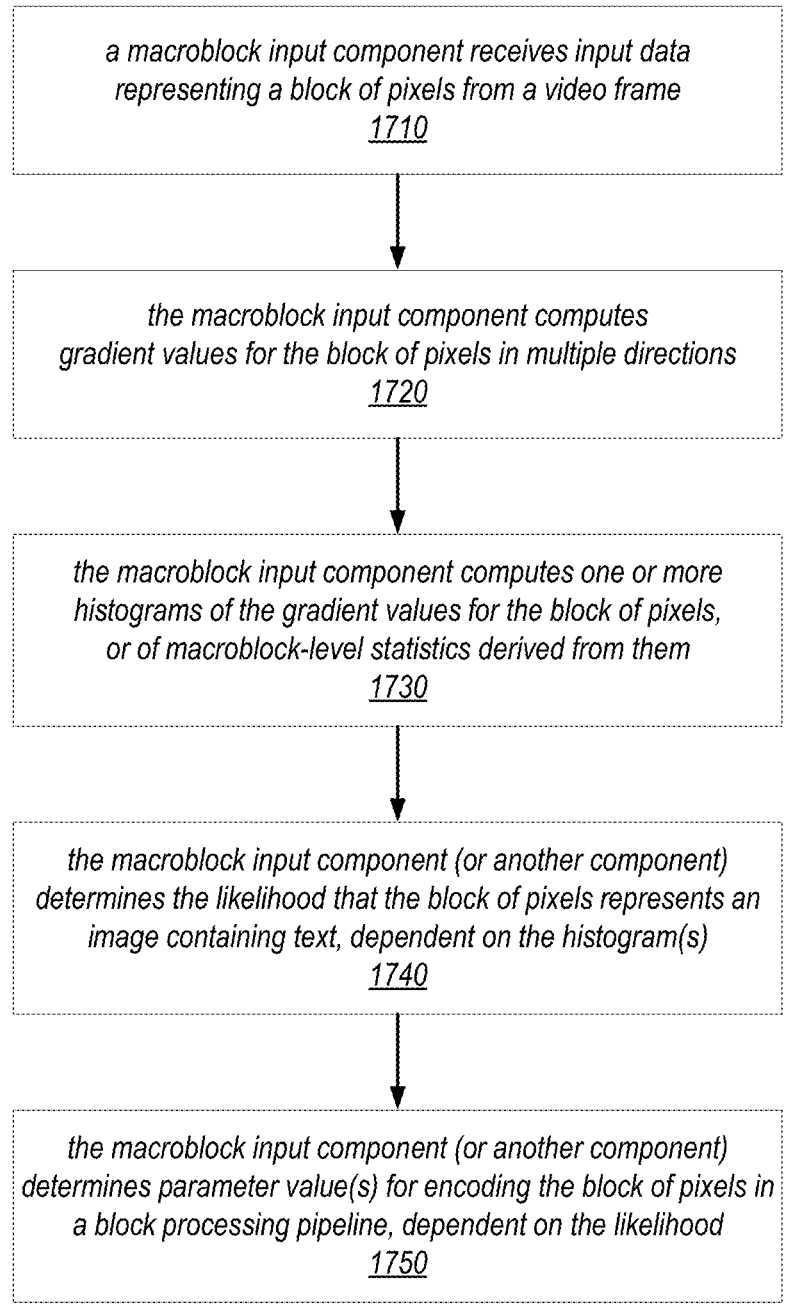
FIG. 17 is a flow diagram illustrating one embodiment of a method for performing an encoding operation on a macroblock dependent on one or more histograms of gradient values.

One embodiment of a method for performing an encoding operation on a macroblock, dependent on one or more histograms of gradient values, is illustrated by the flow diagram in FIG. 17. As illustrated at 1710, in this example, the method may include a macroblock input component for a block processing pipeline (e.g., an input component that receives macroblocks to be processed in a video encoding pipeline) receiving input data representing a block of pixels from a video frame. The method may include the macroblock input component computing gradient values for the block of pixels in multiple directions, as in 1720. For example, the macroblock input component may be configured to compute the gradient values in hardware (e.g., using circuitry) and/or using software or firmware executing on a CPU in the macroblock input component, in different embodiments. As described in more detail below, the gradients may be computed using any of a variety of filters, in different embodiments.

As illustrated in this example, the method may include the macroblock input component computing one or more histograms of the gradient values for the block of pixels (or of macroblock-level statistics derived from the gradient values), as in 1730. Again, the macroblock input component may be configured to compute the histograms in hardware (e.g., using circuitry) and/or using software or firmware executing on a CPU in the macroblock input component, in different embodiments. As described in more detail herein, the macroblock input component may compute the histograms based on a count of angles (in different ranges of angles) representing the gradient directions at each of multiple points within the macroblock, based on a count of gradient magnitudes (in different ranges of gradient magnitudes) at each of multiple points within the macroblock, or based on the binning of other statistics that can be derived using the gradient values (with or without other information).

As illustrated in FIG. 17, the method may also include the macroblock input component (or another hardware or software component of the block processing pipeline) determining the likelihood that the block of pixels represents an image containing text, dependent on the histogram(s), as in 1740. For example, in embodiments that implement a software pipeline and a hardware pipeline, this determination may be performed by a software pipeline component (such as one of the software pipeline components 322 described above) and may be passed to (or made available to) a hardware pipeline component (such as one of the hardware pipeline components 326 described above) in a subsequent pipeline stage. In other embodiments, this determination may be made in hardware (e.g., using circuitry) in the macroblock input component (or in another component of the block processing pipeline) and/or using software or firmware executing on a CPU in the macroblock input component. As illustrated in this example, the method may include the macroblock input component (or another component of the block processing pipeline) determining one or more parameter values for encoding the block of pixels in the block processing pipeline, dependent on the likelihood that the block of pixels represents an image containing text, as in 1750. In some embodiments, this determination may be performed by a software pipeline component (such as one of the software pipeline components 322 described above) and may be passed to (or made available to) a hardware pipeline component (such as one of the hardware pipeline components 326 described above) in a subsequent pipeline stage. In other embodiments, this determination may be made in hardware (e.g., using circuitry) in the macroblock input component (or in another component of the block processing pipeline) and/or using software or firmware executing on a CPU in the macroblock input component.

Figure 18A:
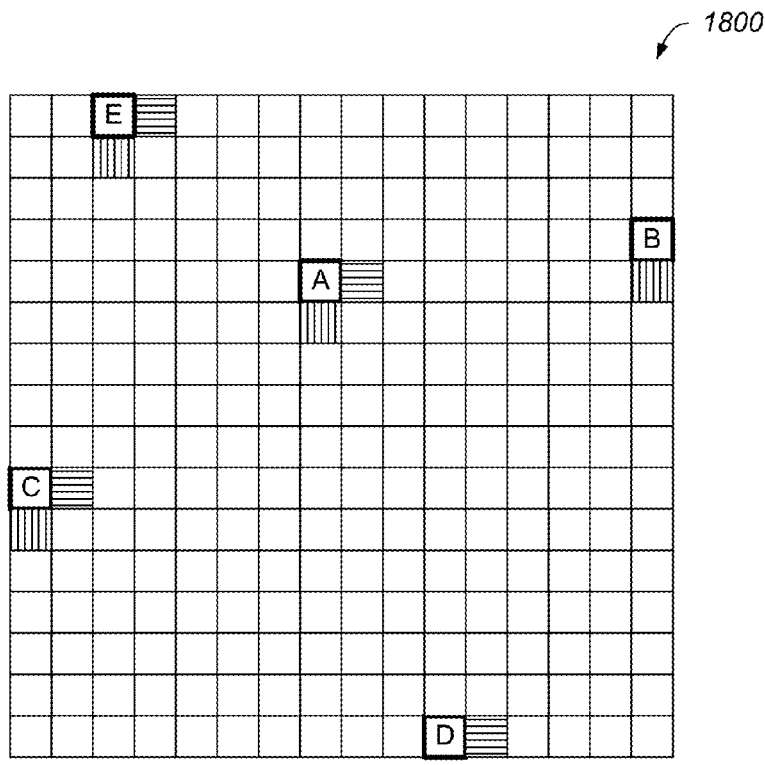
FIGS. 18A and 18B illustrate the application of different filters in computing gradient values for a macroblock, according to some embodiments.
Figure 18B:
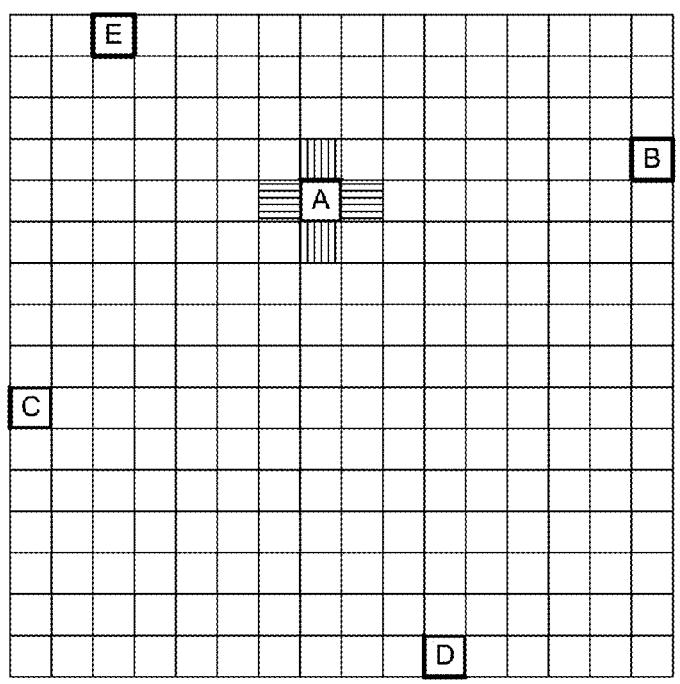

The macroblock input component may be configured to use any of a variety of filters to compute gradients for a macroblock based on the pixel information received for each macroblock (e.g., the luma and/or chroma pixels received for the macroblock). FIGS. 18A and 18B illustrate the application of different filters in computing gradient values for a 16×16 macroblock 1800, according to some embodiments. For example, FIG. 18A illustrates an embodiment in which a [−1 1] filter is applied to the pixel data (e.g., the luma pixel data or the chroma pixel data) for macroblock 1800. More specifically, FIG. 18A illustrates the neighbor pixels that are considered when computing horizontal and vertical gradients for five of the pixels of macroblock 1800 (i.e., the pixels labeled A, B, C, D, and E) using a [−1 1] filter. In this example, to compute a horizontal gradient for each pixel that has a neighbor to its immediate right (e.g., the pixels labeled A, C, D, and E), the filter is applied to the labeled pixel and to the neighbor to its immediate right (a pixel that is illustrated in FIG. 18A using horizontal hash marks). Similarly, to compute a vertical gradient for each pixel that has a neighbor immediately below it (e.g., the pixels labeled A, B, C, and E), the filter is applied to the labeled pixel and to the neighbor immediately below it (e.g., a pixel that is illustrated in FIG. 18A using vertical hash marks).

Note that, in some embodiments, an input macroblock component that is configured to compute horizontal and vertical gradients for macroblocks may only compute gradient values for pixels for which the data needed to compute both the horizontal and vertical gradients is available (e.g., pixels that have both a neighbor to their immediate right and a neighbor immediately below them, such as the pixels labeled A, C, and E). In other embodiments, the input macroblock component may be configured to compute a horizontal gradient only, a vertical gradient only, or both a horizontal gradient and a vertical gradient for various pixels in the macroblock, dependent on the available neighbor information. For example, in one such embodiment, the input macroblock component may be configured to compute a horizontal gradient only for the pixel labeled D, a vertical gradient only for the pixel labeled B, and both horizontal and vertical gradients for the pixels labeled A, C, and E.

FIG. 18B illustrates an embodiment in which a [−1 0 1] filter is applied to the pixel data for macroblock 1800. More specifically, FIG. 18B illustrates the neighbor pixels that are considered when computing horizontal and vertical gradients for the same five pixels of macroblock 1800 (i.e., the pixels labeled A, B, C, D, and E) using a [−1 0 1] filter. In this example, to compute a horizontal gradient for each pixel that has a neighbor to its immediate right and a neighbor to its immediate left (i.e., interior pixels, such as the pixel labeled A), the filter is applied to the labeled pixel and to the neighbors to its immediate right and left (i.e., pixels that are illustrated using horizontal hash marks). Similarly, to compute a vertical gradient for each pixel that has a neighbor immediately below it and a neighbor immediately above it (i.e., interior pixels, such as the pixels labeled A), the filter is applied to the labeled pixel and to the neighbors immediately below and above it (i.e., pixels that are illustrated using vertical hash marks).

Again note that, in some embodiments, an input macroblock component that is configured to compute horizontal and vertical gradients for macroblocks may only compute gradient values for pixels for which the data needed to compute both the horizontal and vertical gradients is available (e.g., pixels that have both neighbors to their immediate right and left, and neighbors immediately below and above them). In other embodiments, the input macroblock component may be configured to compute a horizontal gradient only, a vertical gradient only, or both a horizontal gradient and a vertical gradient for various pixels in the macroblock, dependent on the available neighbor information. For example, in one such embodiment, the input macroblock component may be configured to compute a horizontal gradient only for the pixels labeled D and E, a vertical gradient only for the pixels labeled B and C, and both horizontal and vertical gradients for the pixel labeled A. Also note that, in other embodiments, different weights may be applied to the pixels in the neighborhood of each pixel in the macroblock (e.g., using different filters) when computing the horizontal and vertical gradients at the pixel.

As previously noted, after computing horizontal and vertical gradients for a macroblock, the macroblock input component may be configured to compute histograms for the macroblock that are based on a count of angles (in different ranges of angles) representing the gradient directions that were computed at each of multiple points within the macroblock. In some embodiments, the gradient angle may represent the angle that the gradient forms with the horizontal axis of the macroblock (and the video frame of which it is a part), and the angles may be measured in a clock-wise direction, such that an angle of 0 degrees corresponds to a horizontal vector. The bins of the histogram may be spread evenly over 180 degrees (in embodiments in which they represent unsigned gradient angles) or over 360 degrees (in embodiments in which they represent signed gradient angles).

In some embodiments (and in the example histograms illustrated in FIGS. 19A, 19B, 20A, and 20B), the sum of the bin counts for all of the bins may be equal to the size of the macroblock (e.g., 256 for a 16×16 macroblock). In some embodiments, when one direction is dominant (which may be the case when the macroblock includes text), most of the bin counts (or many more of the bin counts than in other bins) would be in one (or a small number) of the bins. For example, for a macroblock that includes text (and thus includes many sharp vertical, or near-vertical edges), the bin counts may be much larger in one or more horizontal bins (e.g., in one or more bins representing horizontal or near-horizontal gradient directions) than in other bins. Note that, in various embodiments, the techniques described herein may be used to detect any dominant gradient direction (e.g., a horizontal, vertical, diagonal, any other dominant direction). In some such embodiments, the dominant direction may indicate a strong edge in the macroblock, but may not necessarily represent text (e.g., if the dominant gradient direction is something other than horizontal or near-horizontal).

Figure 19A:
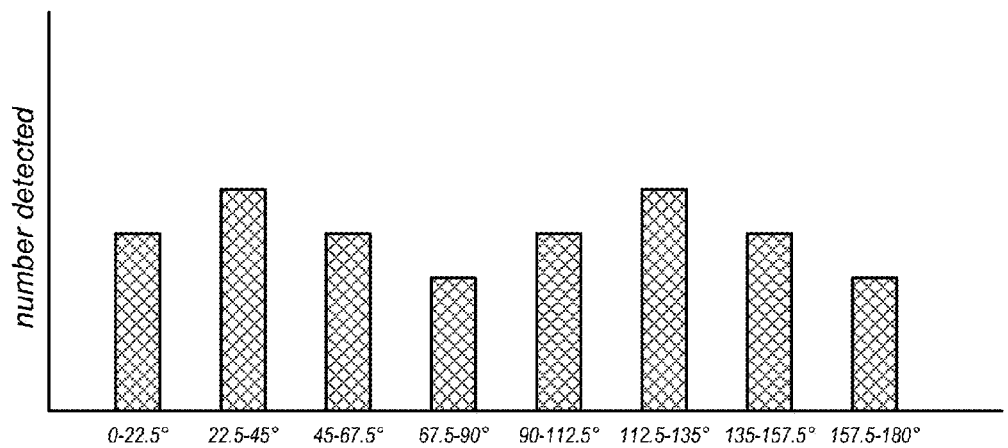
FIG. 19A and FIG. 19B illustrate example histograms of gradient direction values, according to some embodiments.
Figure 19B:
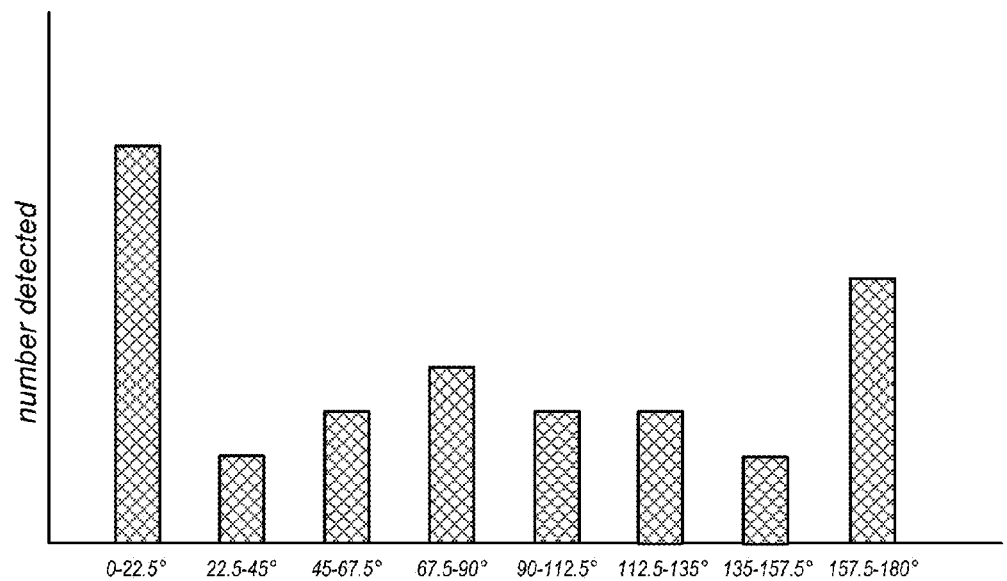

FIG. 19A and FIG. 19B illustrate example histograms of gradient direction values (or, more specifically, computed gradient orientation angles), according to some embodiments. For example, FIGS. 19A and 19B illustrate histograms in which each bin on the horizontal axis represents a range of angles corresponding to gradient directions computed at multiple points within a macroblock (e.g., at each pixel in the macroblock or at each pixel for which the neighbor data required to compute the gradient values was available). In each of these figures, the vertical axis represents the number (or relative number) of times that a gradient direction within a given range of gradient directions is detected in a 16×16 macroblock.

In some embodiments, to produce the histogram illustrated in FIG. 19A, a macroblock input component may be configured to compute horizontal and vertical gradient values at multiple points within the macroblock, and to derive from those gradient values, an angle representing the gradient direction at that point. For example, such an angle may be computed as follows:

$$\Theta = abs[a\tan(Gx/Gy)]$$

In this example, Gx represents the horizontal gradient value and Gy represents the vertical gradient value at a particular point in the macroblock (e.g., at the pixel labeled A in FIGS. 18A and 18B). In some embodiments (and in the examples illustrated in FIGS. 19A and 19B), the macroblock may be configured to compute an unsigned gradient direction angle (as above), while in other embodiments, the macroblock may be configured to compute a signed gradient direction angle, as follows:

$$\Theta = a\tan(Gx/Gy)$$

In either case, the macroblock input component may be configured to count the number of times that the computed angles fall into different ranges of angles, each of which corresponds to a respective bin of the histogram. The macroblock input component (or another component) may be configured to analyze the histogram data to determine whether there is a dominant gradient direction for the macroblock and/or to determine the likelihood that the macroblock represents a portion of a video frame that contains text.

In the example histogram illustrated in FIG. 19A, there is no dominant gradient direction for the macroblock. Therefore, the macroblock input component (or other component) may assume that the macroblock represents a portion of a video frame that does not contain text, and may be configured to compute one or more encoding parameter values suitable for non-text macroblocks. However, in the example histogram illustrated in FIG. 19B, there is a dominant gradient direction for the macroblock (i.e., the direction corresponding to angles in the range of 0-22.5° and in the range of 157.5-180°). In this example, because there is a dominant gradient direction for the macroblock (shown as a large number of bins counts in bins representing horizontal or near-horizontal angles in the histogram), and because the dominant direction indicates a large number of vertical or near-vertical edges in the macroblock image, the macroblock input component (or other component) may assume that the macroblock represents a portion of a video frame that contains text, and may be configured to compute one or more encoding parameter values suitable for such macroblocks.

As described above, a filter may be applied to a small number of pixels in the neighbor of each pixel within the macroblock to apply a weighting when computing the gradient values, in some embodiments. Similarly, in some embodiments, the computation of a histogram of gradients may include a weighting (rather than being dependent only on unweighted bin counts). In some embodiments, in order to compute a histogram of oriented gradients (sometimes referred to as a HOG descriptor), each pixel within the macroblock may vote for an orientation-based histogram bin based on the values found in the gradient computation. For example, the pixel may vote for the bin representing an angle (or range of angles that is closest to the gradient angle computed at the pixel. The weight of each vote (e.g., the weight of the contribution from each pixel) may be based on the gradient magnitude, or may be based on a function of the magnitude (e.g., the square root of the gradient magnitude, the square of the gradient magnitude, or a truncated version of the magnitude that includes a subset of the bits of the magnitude), in different embodiments. In such embodiments, the HOG descriptor comprises the combination of the bins in the histogram.

As noted above, in some embodiments, the macroblock input component may be configured to compute separate horizontal and vertical histograms, based on the horizontal and vertical gradient values computed at multiple points within the macroblock. In some such embodiments, the horizontal and vertical gradient values (which may include a value representing a direction and a magnitude value) may be calculated by hardware within the macroblock input component, and the histograms may be computed by program instructions executing on a CPU within the macroblock input component (or a component of another stage within the video encoding pipeline). In some embodiments, the magnitude value of each of the gradients may determine the bin index of the histogram in which the gradient will be represented by a count. In some embodiments (and in the example histograms illustrated in FIGS. 20A and 20B), each histogram includes eight bins, and the upper three bits of the scaled and unsigned gradient values (e.g., the upper three bits of Abs(Gx) or Abs (Gy)) may be used as the bin index for the histogram. In such embodiments, a given bin count may be incremented for each gradient value (i.e., gradient magnitude value) of the macroblock that falls within the range defined for the bin by its index (e.g., defined by particular values for the upper three bits of the gradient magnitude).

Figure 20A:
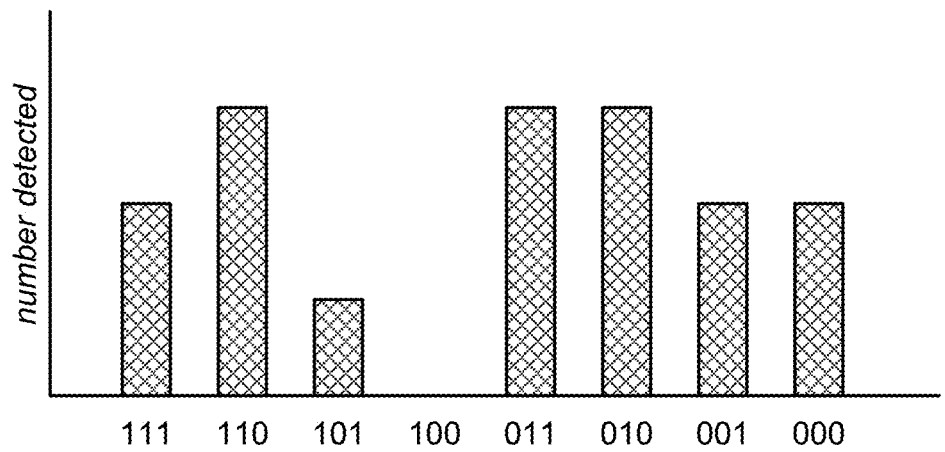
FIGS. 20A and 20B illustrate a histogram of horizontal gradients and a histogram of vertical gradients for a macroblock, respectively, according to some embodiments.
Figure 20B:
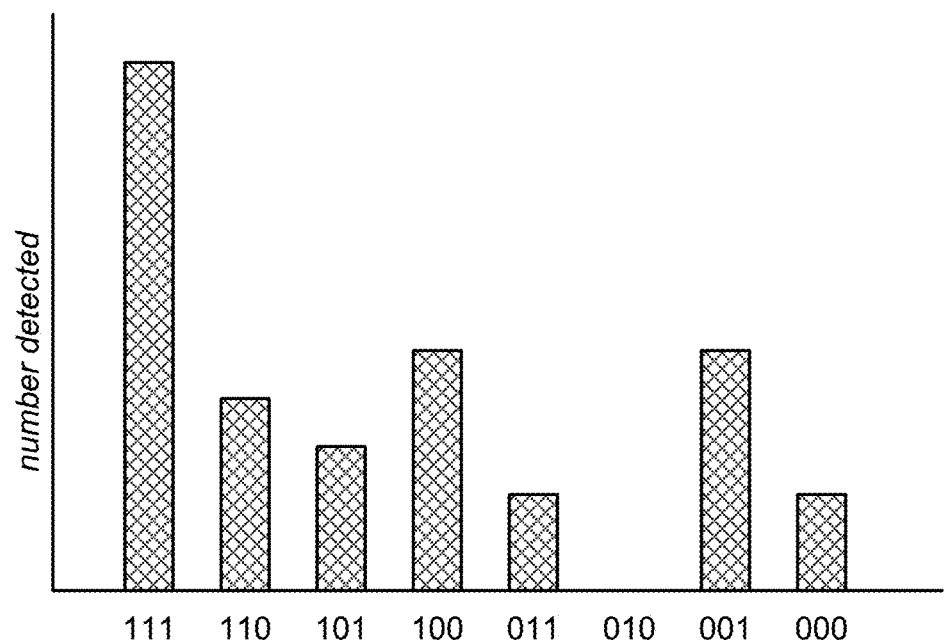

FIGS. 20A and 20B illustrate a histogram of horizontal gradients and a histogram of vertical gradients for a macroblock, respectively, according to some embodiments. In these histograms, the bin index for each bin is shown (on the x axis) as a binary representation of the upper three bits of an 8-bit gradient magnitude value for a gradient in that direction, and the height of each bin (shown on the y axis) indicates the number of times that a gradient magnitude value for a gradient in that direction was detected within each particular range of values (as determined by the upper three bits) in the macroblock.

More specifically, FIG. 20A illustrates histogram of vertical gradients for a macroblock in which none of the bins is dominant. In this example, the differences between the heights of the bins is relatively small, and there is no indication that there are a large number of horizontal edges. Taken alone, this may indicate the macroblock is unlikely to represent a portion of a video frame that contains text. However, FIG. 20B illustrates a histogram of horizontal gradients for the same macroblock in which one of the bins is dominant. In this example, the bin indexed as 111 (i.e., the bin corresponding to the largest gradient magnitude values) is much taller than any of the other bins, indicating that a large number of horizontal gradients have large magnitudes. Since this would be the case if the macroblock represents a portion of the video frame that includes many vertical edges, this may indicate that the macroblock is likely to represent a portion of a video frame that contains text.

As described above, in some embodiments, once a dominant gradient direction for a given macroblock has been determined and/or a likelihood that the given macroblock contains text has been determined, various hardware and software components in the video encoding pipeline may use this information to bias, control, or otherwise influence the operations performed by those components or by components in stages that follow them. For example, in response to determining that a given macroblock represents a portion of a video frame that contains text, various encoding parameters may be computed and/or modified in order to perform a higher quality encoding than might otherwise have been performed for that macroblock (e.g., based on the variance or other information about the macroblock). In various embodiments, this may include reducing the quantization parameter for the macroblock, biasing or controlling the selection of a prediction mode, or biasing or controlling the selection of an encoding mode for the macroblock.

In some embodiments, based on the statistics computed at the macroblock input stage (including the determination that a given macroblock is likely to represent a portion of a video frame that contains text), the quantization parameter value QP (i.e., the quantization step to be used in the encoder, which may also affect the quantization error) may be computed or modified such that it is lower than it would have otherwise been for the macroblock based on information other than the determination that the macroblock is likely to contain text. The selection of the quantization parameter value may change how the luma and/or chroma information is quantized in the pipeline. For example, it may affect the quantization step used in the luma reconstruction component when performing luma reconstruction and quantization. In some embodiments, it may also affect chroma reconstruction. Note that in some embodiments, the same quantizer may be used by both the luma and chroma reconstruction components. However, in other embodiments, there may be a delta between the quantization parameter used in the luma reconstruction component and the quantization parameter used in the chroma reconstruction, but the quantization parameter used in the luma reconstruction component may also affect, per macroblock, how the chroma quantization parameter value is changed.

As previously noted, in high texture areas, using a higher QP (i.e., a larger step size) may mean that less data is retained following quantization, which may increase distortion (when compared with quantization using a lower QP). However, since human vision systems may not notice small distortions, the higher QP may be suitable for texture areas and may allow other areas (those in which such distortions would be more noticeable, such as text areas) to be encoded using a lower QP (i.e., to retain more data following quantization) while still meeting network bandwidth constraints when streaming the results. Note that by selecting a lower QP only for those macroblocks that are likely to contain text (rather than selecting a lower frame-level QP) may prevent unnecessary peaks in the bandwidth required to stream the results of the encoding that are unlikely to improve the quality of the results, as perceived by the viewer. In other words, the techniques described herein may allow for fine-grained control over the encoding of macroblocks that are likely to contain text and those that are not likely to contain text, such that computation and network bandwidth constraints do not prevent the video encoding pipeline from improving the quality of the results in areas in which the quality will be most noticeable. The use of these techniques may, in some embodiments, result in better quality encoding, with fewer artifacts (or at least fewer noticeable artifacts), for video frames that include text (e.g., images of web pages and other text-based information on a computer screen).

Another stage of a video encoding pipeline that may make use of a determination that a given macroblock is likely to represent a portion of a video frame that contains text (or that there is a dominant gradient direction in the macroblock) is an intra-estimation stage, such as that described above. In some embodiments, an indication of the result of such a determination may be used as an input to bias the selection of a prediction mode in the intra-estimation stage (e.g., to bias certain directions based on the presence of a dominant gradient direction). As noted above, in intra-estimation, for each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may then pass best intra mode information to a mode decision stage (such as mode decision 1620 illustrated in FIG. 16).

In some embodiments, if it is known that there is dominant gradient direction (e.g., a specific diagonal direction that is dominant) in a given macroblock, then during intra-estimation, a prediction mode corresponding to that dominant direction may be given a bias that makes it more likely to be selected. For example, in some embodiments, the video encoding pipeline may employ a typical rate distortion optimization when computing the cost of each mode. In addition, the pipeline may support the use of programmable offsets per mode that can be added to the rate term to weight it during mode selection. In some embodiments, there may be different offsets for each mode, and they may be positive or negative. For example, an offset A may be added if the mode is horizontal, and an offset B may be added if the mode is vertical. In this example, if the dominant mode is horizontal, a negative offset may be added so that the cost of that mode would be lower when compared to the other modes. In some embodiments, choosing the dominant mode (i.e., the mode corresponding to the dominant gradient direction), such that the prediction is in the direction of the dominant edge, may result in fewer visual artifacts than if the prediction is done in another direction. In some cases, the intra-estimation may have chosen that direction naturally. However, in cases in which, for some reason (e.g., in terms of rate distortion, but without taking into account the determined dominant direction) the intra-estimation would have chosen a different direction (which could have potentially introduced more visual artifacts), having the information about the dominant direction may allow the video encoding pipeline to bias the mode to achieve better results.

In some embodiments, the gradient information (or the fact that there is a dominant gradient direction) may be used to modify, select, or bias the terms of a rate distortion optimization used in mode decision, intra-estimation, or motion estimation. In various embodiments, a rate distortion optimization used to minimize a cost function for a given mode may include a linear combination of a distortion metric that measures differences between two modes, and the rate cost of encoding the macroblock due to those difference times a parameter (lambda) that converts the units of rate into units of distortion. For example, in some embodiments, the cost function to be optimized in order to find the optimal motion vector may be as follows:

$$\text{cost}=\text{SATD}+\lambda(\text{mvd rate})$$

In this example, the cost function includes a linear combination of a distortion metric between the source frame and the reference frame (e.g., a sum of absolute differences, SAD, or a sum of absolute transform differences, SATD) and the rate cost of encoding the macroblock, which will include the rate cost of the motion vector difference (e.g., the mvd rate), where the motion vector difference is equal to the difference between the motion vector being evaluating and the motion vector predictor. In this example, lambda represents a motion regulation parameter that is used to convert the units of rate into units of distortion. In some embodiments, lambda may be dependent on the gradient information (or the fact that there is a dominant gradient direction).

As noted above, the mode decision 1620 component may receive the best intra mode from intra estimation, direct/skip mode cost from direct mode estimation, and motion vector candidates from the motion estimation engines, may compute additional costs for bi-directional modes, and may determine the best macroblock type, including macroblock partitions, sub-partitions, prediction direction and reference frame indices. In at least some embodiments, the mode decision 1620 component may also perform motion vector prediction, the results of which may be used when estimating motion vector rate during mode decision. In at least some embodiments, the motion vector prediction results may also be fed back from the mode decision 1620 component to motion estimation, for example for use in direct mode estimation and motion vector rate estimation. In some embodiments, the systems described herein may be used to bias or control the motion estimation.

As noted above, in the motion estimation stage, the processor may determine one or more candidates using predicted and co-located motion vectors and may input the candidates to the full pixel motion estimation components of the motion estimation engines. In some embodiments, the system may employ biases for choosing motion vectors, for partitioning, and/or for choosing the additional candidates that are being searched. For example, performing a low-resolution search may provide candidates for a subsequent full pixel motion estimation search. In some embodiments, software candidates may be provided in addition to the candidates provided by the low-resolution search results. For example, these software candidates may come from within the encoder (e.g., from a feedback loop of what the predicted vector is, which could become a candidate), or may be hard-coded as 0, 0 or as an external vector that is based on what the camera that originally captured the video frame measured as a global vector. In some embodiments, the gradient values, histograms of gradients, or statistics based on this information may be used to determine which, if any, of these additional vectors should be candidates in the motion estimation stage (and when). In other words, this information may be used to select better candidates. For example, if it is known that there is a lot of texture in a given macroblock (or that the macroblock contains text), it may be assumed that the predicted vector is not reliable. In such cases, a 0,0 vector (or some other vector that may be more reliable) may be chosen as a candidate, rather than the predicted vector.

Figure 21:
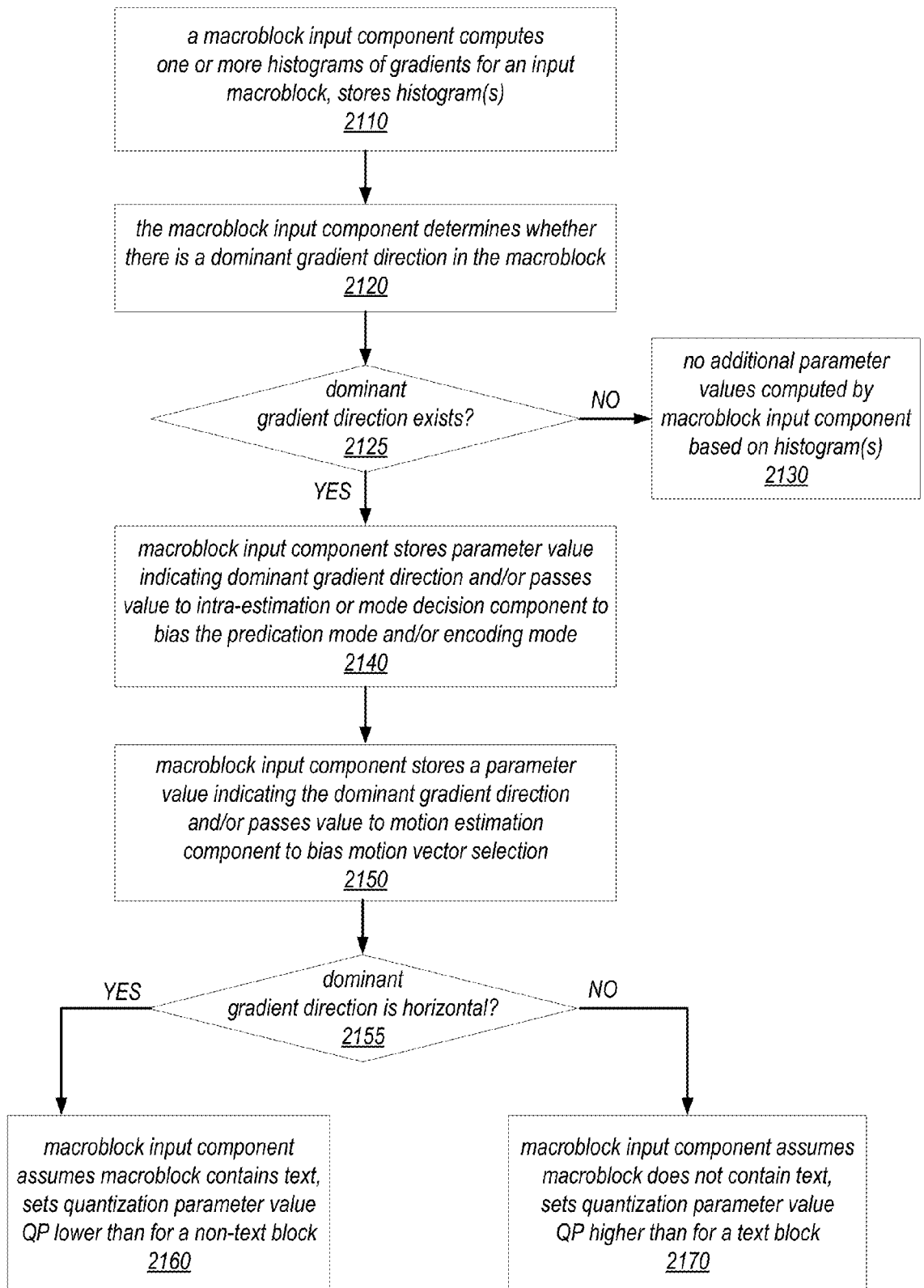
FIG. 21 is a flow diagram illustrating one embodiment of a method for passing encoding parameter values generated at a macroblock input component, dependent on one or more gradient histograms, to different stages of a video encoding pipeline.

One embodiment of a method for passing encoding parameter values generated at a macroblock input component, dependent on one or more gradient histograms, to different stages of a block processing pipeline (e.g., a video encoding pipeline) is illustrated by the flow diagram in FIG. 21. As illustrated at 2110, in this example, the method may include a macroblock input component computing one or more histograms of gradients for an input macroblock (e.g., using any of a variety of filtering and binning mechanisms, including those described herein), and storing the histogram(s), e.g., in a statistics buffer that is accessible to hardware and/or software components in multiple stages of the video encoding pipeline. The method may also include the macroblock input component determining whether there is a dominant gradient direction in the macroblock, as in 2120. If no dominant gradient direction exists in the macroblock (shown as the negative exit from 2125), no additional parameter values may be computed by the macroblock input component based on the histogram(s), as in 2130.

In some embodiments, an intra-estimation operation component and/or a mode decision component may be configured to take the dominant gradient direction (if one exists) into consideration when performing a portion of the overall video encoding operation. In some such embodiments, if a dominant gradient direction exists in the macroblock (shown as the positive exit from 2125), the method may include the macroblock input component storing a parameter value indicating the dominant gradient direction in the statistics buffer (from which the intra-estimation operation component and/or the mode decision component can retrieve it) and/or passing the parameter value indicating the dominant gradient direction to the intra-estimation component (e.g., to be used to bias or control the selection of a predication mode) and/or to the mode decision component (e.g., to bias or control the selection of an encoding mode), as in 2140. Similarly, in some embodiments, a motion estimation component may be configured to take a dominant gradient direction into consideration when performing a portion of the overall video encoding operation. In some such embodiments, if a dominant gradient direction exists in the macroblock, the method may include the macroblock input component storing a parameter value indicating the dominant gradient direction in the statistics buffer (if it has not already done so) and/or passing the parameter value indicating the dominant gradient direction to the motion estimation component to be used to bias or control the selection of a motion vector, as in 2150.

As illustrated in this example, if the dominant gradient direction is horizontal (shown as the positive exit from 2155), this may indicate a high likelihood that the macroblock represents a portion of a video frame containing text. In this case, the method may include the macroblock input component assuming that the macroblock contains text, and setting the quantization parameter value (QP) for this macroblock to a lower value than would otherwise have been computed for the macroblock if it did not contain text (e.g., if it were a non-text block), as in 2160. However, if the dominant gradient direction is not horizontal (shown as the negative exit from 2155), the method may include the macroblock input component assuming that the macroblock does not contain text, and setting a quantization parameter value (QP) for this macroblock to a value that is higher than would otherwise have been computed for the macroblock if it did contain text (e.g., if it were a text block), as in 2170.

Embodiments of block processing pipelines that include both a software pipeline and a hardware pipeline (such as the video encoding pipelines illustrated in FIGS. 3-7 and described herein) may be configured in a variety of ways in order to compute gradient values for a macroblock, gradient histograms, macroblock-level statistics and/or encoding parameters, slice-level statistics and/or encoding parameters, or frame-level statistics and/or encoding parameters using different combinations of software pipeline components and hardware pipeline components. For example, in some embodiments, one or more hardware pipeline components may be configured to compute and collect gradient values for macroblocks that are received for processing in the video encoding pipeline (e.g., at a macroblock input stage). Subsequently, a hardware or software pipeline component in the same stage or in another stage may be configured to analyze the gradient information and act on the results of the analysis. For example, in some embodiments a software pipeline component at the macroblock input stage may be configured to determine whether it is likely that a given macroblock represents a portion of a video frame containing text, and to use this information to select, modify, or bias the selection of various encoding parameters so that the macroblock will be encoded appropriately (e.g., at an appropriately high quality).

In some embodiments, software pipeline components in the macroblock input stage and/or in other stages (e.g., stages that succeed the macroblock input stage) may be configured to compute additional statistics or encoding parameters for use in the video encoding pipeline based on the gradient values that were computed by the hardware component at the macroblock input stage and/or on information derived from the gradient values by software pipeline components in various preceding pipeline stages. For example, rather than computing all of the statistics and/or encoding parameters needed to process a macroblock through all stages of the video encoding pipeline at the macroblock input stage, at least some of the computations may be performed in later stages of the pipeline. In some embodiments, as additional information is computed and analyzed for a macroblock, slice, or frame, the encoding parameters used in subsequent stages to encode the macroblock, slice, or frame (or used to encode subsequent macroblocks, slices, or frames) may be modified according to the particular circumstances. In this manner, the computational load (e.g., the set of calculations to perform in order to compute all of the statistics and/or encoding parameters needed to process a macroblock in the video encoding pipeline) may be distributed between the CPUs in multiple pipeline stages. In some such embodiments, the raw statistics generated at the macroblock input stage (e.g., the gradient values and/or gradient histogram information) may be passed to other stages that will perform respective ones of the calculations (e.g., stages that will use the results of the calculations they perform, or stages that will perform the calculations and pass the results to still other stages that will use them). In other embodiments, the raw statistics generated at the macroblock input stage (e.g., the gradient values and/or gradient histogram information) may be written to a statistics buffer, from which components at other stages of the pipeline may retrieve them in order to perform other ones of the calculations (after which the results of these other calculations may also be written to the statistics buffer).

In one example, if a software pipeline component in the intra-estimation stage has enough computational cycles to compute a quantization parameter value QP for a given macroblock (e.g., in response to receiving gradient values or gradient histogram information for the macroblock), it may compute the QP and pass it to a luma reconstruction stage to be used in a quantization operation for the macroblock. In another example, rather than determining whether a given macroblock should be classified as containing text at the macroblock input stage, in some embodiments, this decision may be made at the mode decision stage, based on gradient values or histogram information passed to the mode decision stage from the macroblock input stage. As described herein, in some embodiments, rather than passing the raw statistics generated at the macroblock input stage (e.g., the gradient values and/or gradient histogram information) or any statistical information or encoding parameters derived from the raw statistics directly to particular pipeline stages, this information may be stored in a data structure (e.g., a statistics buffer) by the hardware or software pipeline components that compute the information, and the software pipeline components in any or all of the other stages of the video encoding pipeline may access the data structure to obtain the information they need to compute additional statistics or encoding parameter values and/or to perform respective operations of the overall encoding process.

In one example, after determining that a macroblock is likely to include text, a quantization parameter value that is initially selected for use with the macroblock may be further modified depending on the size of the text or on other characteristics of the text that may be determined as a result of an analysis performed by a software pipeline component in a later stage of the pipeline. In this example, if a particular statistical signature is recognized in a portion of a macroblock, slice, or frame (e.g., a signature associated with a particular text size or with particular text characteristics), a software pipeline component may be configured to map a different set of encoding parameter values to this portion of the macroblock, slice, or frame and/or to the same portion of other macroblocks, slices, and frames in a sequence. In yet another example, a software pipeline component may be configured to apply different thresholds or other criteria to the available gradient values, gradient histogram information, or computed statistics for macroblocks that are received from different sources (e.g., from different applications or users), according to source-specific policies or preferences.

Figure 22:
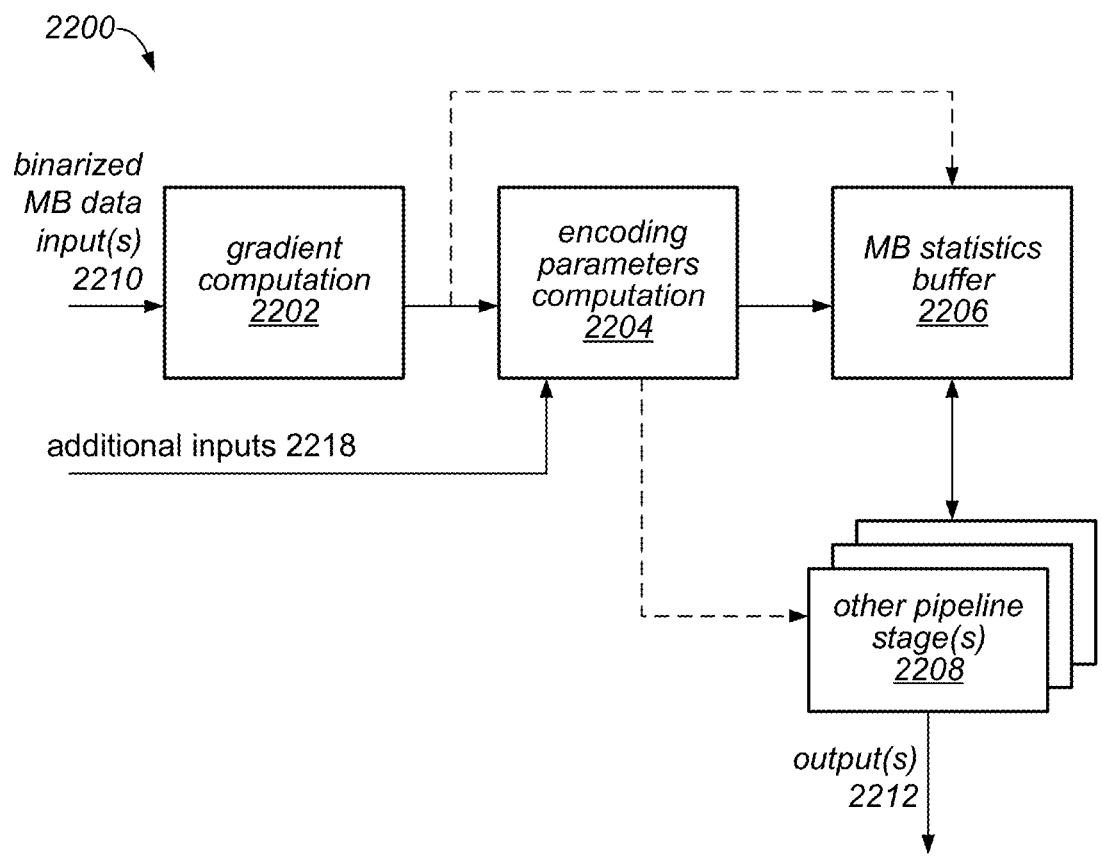
FIG. 22 is a block diagram illustrating a portion of a video encoding pipeline that computes gradient values for use in determining encoding parameters and macroblock statistics, according to one embodiment.

FIG. 22 is a block diagram illustrating a portion of a video encoding pipeline 2200 (including, e.g., a portion of a macroblock input component for the video encoding pipeline) that computes gradient values for use in determining encoding parameters and various macroblock-level statistics, according to one embodiment. As illustrated in this example, the macroblock input stage of the video encoding pipeline 2200 may include a gradient computation component 2202, that is configured to receive binarized macroblock data input(s) 2210 (e.g., binarized syntax elements representing a particular block of pixels from a video frame) and compute gradient values for the macroblock in two or more directions, based on those inputs. In various embodiments, gradient computation component 2202 may be implemented in hardware, firmware, or software, or using a mix of hardware, firmware, and/or software.

As illustrated in this example, the macroblock input stage of the video encoding pipeline 2200 may include an encoding parameters computation component 2204, which may receive the gradient information computed in gradient computation component 2202, along with one or more additional inputs 2218, and may compute macroblock-level statistics and/or various encoding parameters to be used in encoding the macroblock in the video encoding pipeline. In various embodiments, encoding parameters computation component 2204 may be implemented in hardware, firmware, or software, or using a mix of hardware, firmware, and/or software. As illustrated in FIG. 22, the macroblock input stage of the video encoding pipeline 2200 may also include a macroblock statistics buffer 2206 that is configured to store the computed gradient values and any macroblock-level statistics and/or various encoding parameters that are computed in gradient computation component 2202 and/or encoding parameters computation component 2204. In other embodiments, such information may be stored (along with slice-level or frame-level statistics or parameter values, and/or statistics or encoding parameters computed at other stages in the pipeline) in another type of shared data structure within the macroblock input stage or within another stage of the pipeline. In such embodiments, the stored information may be retrieved by various components in multiple stages of the pipeline, and may be used to modify, select, bias, control, or otherwise influence the operations performed by those components.

As illustrated in FIG. 22, the encoding parameters that are computed in encoding parameters computation component 2204 may be written to macroblock statistics buffer 2206 by encoding parameters computation component 2204. Similarly, the gradient values computed by gradient computation component 2202 may be written to macroblock statistics buffer 2206 by gradient computation component 2202 (e.g., as shown by the dashed line from the output of 2202 to 2206 in FIG. 22). As illustrated in this example, various components of one or more other pipeline stages 2208 may access macroblock statistics buffer 2206 to obtain various ones of the computed gradient values, macroblock-level statistics and/or encoding parameters stored therein to be used in performing a portion of the overall video encoding process, e.g., parameter values and/or other information that may affect the outputs 2212 of those pipeline stages 2208.

In some embodiments, various ones of the other pipeline stages 2208 may also write information (e.g., additional macroblock-level statistics and/or encoding parameters that are computed or determined by those other pipeline stages) to macroblock statistics buffer 2206, which may then be accessed by other ones of the pipeline stages 2208. This is illustrated in FIG. 22 by the bi-directional path between pipeline stages 2208 and macroblock statistics buffer 2206. In some embodiments, at least some of the encoding parameters that are computed in encoding parameters computation component 2204 may be provided directly to one or more components in various ones of the other pipeline stages 2208 (e.g., instead of or in addition to being stored in macroblock statistics buffer 2206). This is illustrated in FIG. 22 by the dashed line from encoding parameters computation component 2204 and other pipeline stages 2208. In some embodiments, at least some of the gradient information, histogram information, encoding parameters, or statistics computed by components 2202 or 2204 at the macroblock input stage may be written to a shared data structure in a different pipeline stage instead or, or in addition to, being written to a macroblock statistics buffer 2206 that is implemented at the macroblock input stage.

In many of the examples herein, macroblock-level statistics may be computed based on gradient values, gradient histogram information, and other information. In some embodiments, some or all of these macroblock-level statistics may be accumulated over an entire video frame or over a slice of the video frame. In such embodiments, these slice-level or frame-level statistics may be used to compute slice-level or frame-level encoding parameters or to otherwise affect encoding decisions made at the slice or frame level. In some embodiments, a software pipeline component may be configured to accumulate the histogram information for all of the macroblocks in a slice or frame in order to perform some region-based processing or frame-based processing. For example, in a typical video encoding pipeline, the strength of a deblocking filtering operation (e.g., a frame-level filtering operation for reducing blocking and ringing) may be determined by the macroblock type, such that the filtering is strongest for an intra-coded macroblock. However, if an analysis of the information in a slice-level or frame-level histogram indicates that there is a lot of text in an image (e.g., as evidenced by the presence of a dominant gradient direction), the software pipeline component may determine that it would be unsuitable to perform heavy filtering, which would reduce the quality of the text. In this example, the software pipeline component may be configured to turn off deblocking filtering for this video frame (and/or for subsequent frames in a sequence), to reduce the deblocking filtering strength (e.g., by programming various offsets of the filter at a slice or frame boundary) for the video frame (and/or for subsequent frames in a sequence), to pass to the deblocking filter component (e.g., in a subsequent pipeline stage) a frame-level parameter value indicating that deblocking filtering should be turned off or its strength reduced, or to indicate that inter-coding should be used rather than intra-coding for this video frame (and/or for subsequent frames in a sequence).

In various embodiments in which slice-level and/or frame-level statistics and/or encoding parameters are computed, they may be stored in the same data structure as the macroblock-level information, or in one or more other data structures. For example, the slice-level and/or frame-level statistics and/or encoding parameters may be written to a statistics buffer (e.g., accumulated in the statistics buffer) as they are computed. Note that in some embodiments, a history of these slice-level and frame-level statistics may be maintained in the buffer or in elsewhere memory and may be analyzed to determine trends or patterns in the received video frames. In addition, they may be mapped to the behaviors exhibited by video frames in different contexts (e.g., different camera exposures, different content types, etc.), which may facilitate better predictions of future behavior. In some embodiments, macroblock-level, slice-level, and/or frame-level statistics may be used to determine the appropriate frame-level rate control parameter for use when encoding particular sequences of macroblocks (e.g., adjusting the frame-level rate control in order to achieve better quality results for high-text slices or frames).

Figure 23:
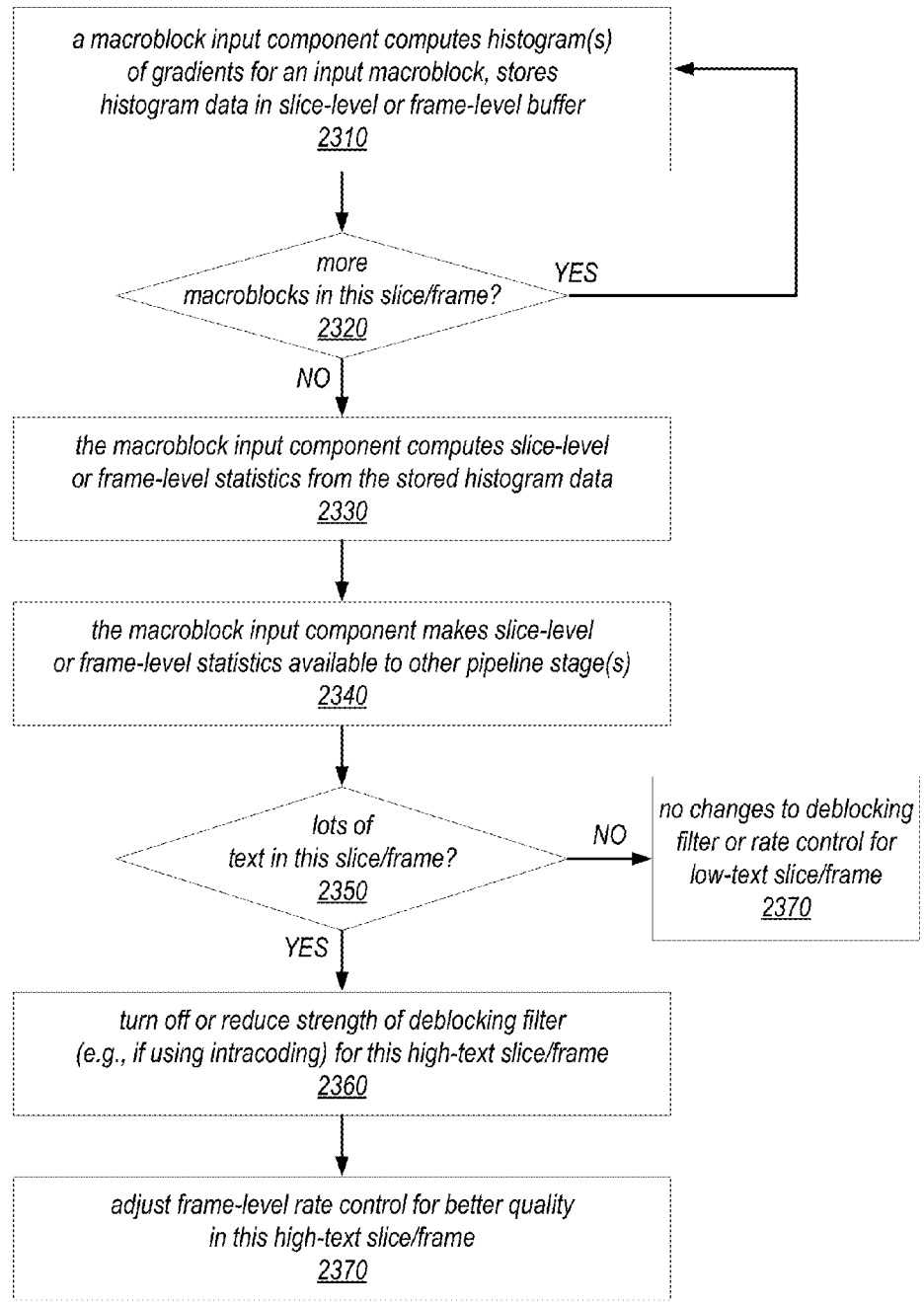
FIG. 23 is a flow diagram illustrating one embodiment of a method for computing slice-level or frame-level statistics and/or encoding parameters by accumulating histograms of gradients that were computed for multiple macroblocks of the slice or frame.

One embodiment of a method for computing slice-level or frame-level statistics and/or encoding parameters by accumulating histograms of gradients that were computed for multiple macroblocks of the slice or frame is illustrated by the flow diagram in FIG. 23. As illustrated at 2310, in this example, the method may include a macroblock input component of a block processing pipeline (e.g., a video encoding pipeline) computing one or more histograms of gradients for an input macroblock, and storing the histogram data in a slice-level or frame-level statistics buffer or other data structure configured to store such information. For example, the histogram data stored by the macroblock input component may include raw histogram data that was computed for each macroblock, a histogram descriptor that was generated for each macroblock (e.g., a HOG descriptor), cumulative histogram data that was computed for multiple macroblocks, macroblock-level statistics that were derived from raw gradient values or from the histograms, and/or other information about the macroblock, in different embodiments. While there are more macroblocks in the slice or frame being processes for which histograms of gradients should be computed (shown as the positive exit from 2320), the method may include repeating the operations illustrated in 2310 for all of the macroblocks in this slice or frame (shown as the feedback from the positive exit of 2320 to 2310).

As illustrated in this example, once there are no additional macroblocks in this slice or frame for which histograms of gradients should be computed (shown as the negative exit from 2320), the method may include the macroblock input component (or, in some embodiments, another component of the video encoding pipeline) computing slice-level and/or frame-level statistics from the stored histogram data, as in 2330. For example, slice-level or frame-level statistics may be computed to determine whether there is a lot of text in a given slice or frame (i.e., whether there are a large number of macroblocks within the frame that are likely to contain text), which may indicate that one or more slice-level or frame-level parameters should be adjusted when encoding this slice/frame, or a subsequent slide/frame. The method may also include the macroblock input component (or, in some embodiments, another component of the video encoding pipeline) making the slice-level or frame-level statistics available to one or more other pipeline stages, as in 2340. For example, the macroblock input component (or other component of the video encoding pipeline) may write the statistics out to a shared statistics buffer or other data structure configured to store such information (from which hardware or software components in other stages of the video encoding pipeline may access them) or may pass them directly to hardware or software components in other stages of the video encoding pipeline. As previously noted, such information may be passed from a hardware pipeline component or software pipeline component in one stage of the video encoding pipeline to a hardware or software pipeline component in another stage of the video encoding pipeline (e.g., a stage that succeeds the stage in which the information was generated) in order to affect the encoding of the block of pixels from which the information was generated, or it may be passed from a hardware or software pipeline component in one stage of the video encoding pipeline to a software or hardware pipeline component in a stage that precedes the stage in which the information was generated in order to affect the encoding of a block of pixels that was received subsequent to receiving the block of pixels from which the information was generated, in different embodiments.

As illustrated in this example, if the slice-level and/or frame-level statistics indicate that there is a lot of text in the slice or frame (shown as the positive exit from 2350), the method may include turning off or reducing the strength of a deblocking filter (e.g., if using intra-estimation) for this high-text slice/frame, as in 2360. In this case, the method may also include adjusting the frame-level rate control in order to achieve better quality results for this high-text slice/frame, as in 2370. On the other hand, if the slice-level statistics or frame-level statistics do not indicate that there is a lot of text in the slice or frame (shown as the negative exit from 2350), there may be no changes made to the deblocking filter or frame-level rate control for this low-text slice/frame, as in 2370.

In some embodiments, the systems described herein may use a training phase to determine how to configure the video encoding pipeline for detecting a dominant gradient direction in the macroblocks it receives and/or for determining the likelihood that the macroblocks represent portions of a video frame that include text. For example, in some embodiments, training data (e.g., macroblocks representing portions of video frames that are known to include text and macroblocks representing portions of video frames that are known not to include text) may be input to the video encoding pipeline, which may compute gradient values, gradient histograms, and/or various macroblock-level, slice-level, or frame-level statistics from the input macroblock data (e.g., luma and chroma information for the pixels of the macroblock). Subsequently, machine learning techniques or other classification techniques may be applied to the computed statistical information to identify certain statistical signatures, and use that to alter the behavior of the encoder (e.g., at the macroblock, slice, and/or frame level). In some embodiments, such a training exercise may be performed offline (e.g., by another system or while the system is not being used to process video frames).

In one example, the training may be performed using SVMs (support vector machines) that can encode the training data, take the computed statistical information, and feed this into classifier. The training exercise may produce a set of coefficients for use in relatively simple calculations for performing a binary classification for macroblocks (e.g., classifying them as being "text" or "non-text" macroblocks, with non-text macroblocks including both flat areas and texture areas) based on the computed statistical information. In some embodiments, a software or hardware pipeline component may be programmed or otherwise configured to perform this decision function. In some embodiments, by being able to distinguish between text and non-text macroblocks at the macroblock input stage (or at another early stage in the video encoding pipeline), when a text macroblock is detected, the video encoding pipeline may prepare other stages in the pipeline to apply appropriate encoding parameters to improve the quality of the result for that text area (only).

Note that while some embodiments implement only a binary classification for macroblocks (e.g., classifying them as being "text" or "non-text" macroblocks), in other embodiments, the training exercise (and resulting decision function) may be used to configure a software or hardware pipeline component to take various actions based on a determination of the likelihood that the macroblock represents a portion of a video frame that contains text. For example, it may be difficult to determine whether a given macroblock actually includes text, since in many cases the bin counts for all of bins of the gradient histograms may be very similar, and since a texture area may yield statistics that are similar to text areas. However, if there is a small number of bins for which the bin counts are very high, and other bins for which the bin counts are very low, the macroblock may be very likely to include text, since the histogram data indicates that there are a few dominant gradient directions (end corresponding edges) and other gradient directions that are rarely if ever, observed in the macroblock. In some embodiments, a software or hardware pipeline component may be configured to detect this statistical signature and to compute a particular encoding parameter value or other indictor of the likelihood that the macroblock contains text, and may provide that indicator to one or more other pipeline stages.

Figure 24:
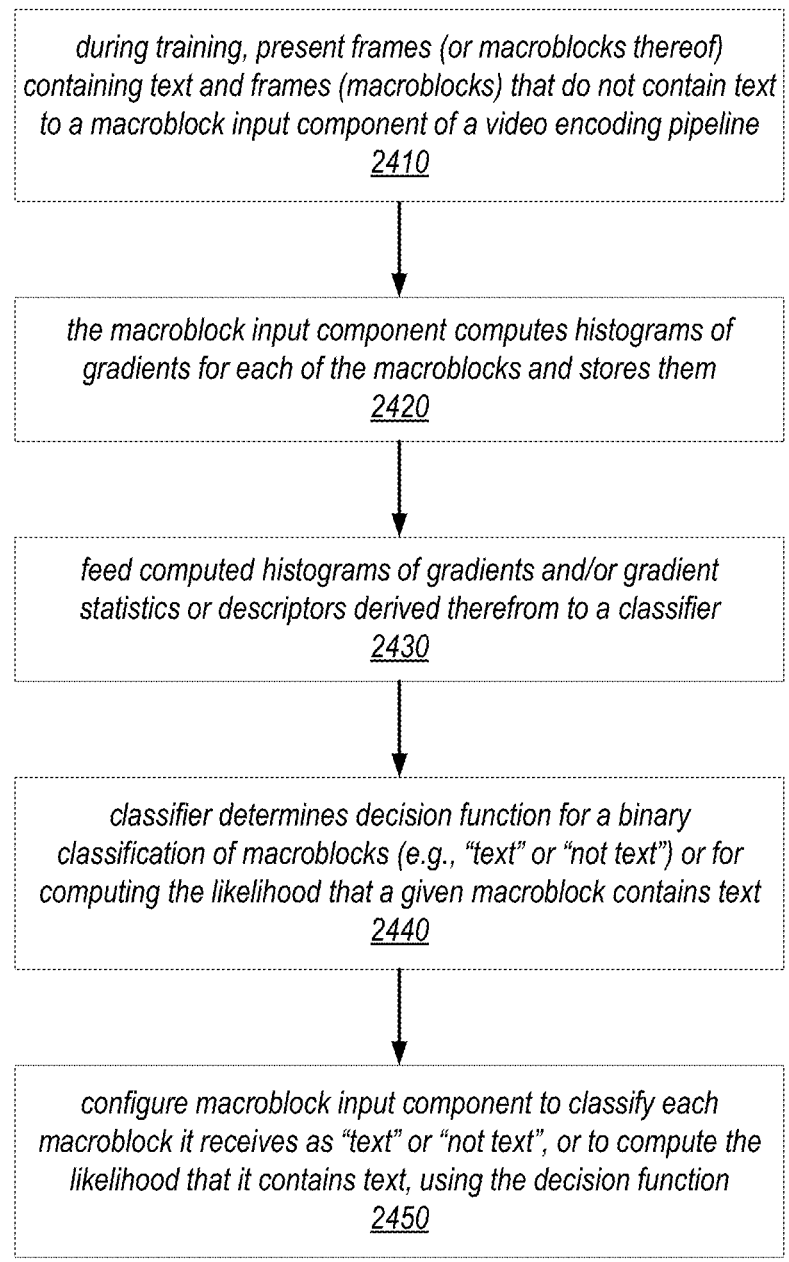
FIG. 24 is a flow diagram illustrating one embodiment of a method for training a macroblock classifier of a video encoding pipeline to classify macroblocks in terms of the likelihood that they represent portions of a video frame containing text.

One embodiment of a method for training a macroblock classifier of a video encoding pipeline to classify macroblocks in terms of the likelihood that they represent portions of a video frame containing text is illustrated by the flow diagram in FIG. 24. As illustrated at 2410, in this example, the method may include, during training, presenting multiple frames (or macroblocks thereof) that are known to represent images containing text and multiple frames (macroblocks) that are known to represent images that do not contain text to a macroblock input component of a block processing pipeline (e.g., a video encoding pipeline). The method may also include the macroblock input component computing one or more histograms of gradients for each of the macroblocks and storing them for subsequent analysis (e.g., in a statistics buffer or other data structure configured to store such information), as in 2420.

As illustrated in this example, the method may include feeding the computed histograms of gradients (and/or gradient statistics or descriptors derived therefrom) to a classifier (e.g., a support vector machine, or SVM, classifier, or a Bayesian classifier), as in 2430. The method may include the classifier determining a decision function for a binary classification of macroblocks (e.g., "text" or "non-text") or a decision function usable to compute the likelihood that a given macroblock contains text, as in 2440. In some embodiments, the decision function may be based, for example, on a threshold value for an individual histogram bin count, the detection of bin counts in multiple ranges of histogram bin counts (e.g., each corresponding to a respective likelihood that the macroblock contains text), a threshold ratio between various histogram bin counts or between various sums of histogram bin counts, or any computed statistical indicator(s) that are found to be well correlated with the presence or absence of text in the training macroblocks. The method may include configuring the macroblock input component of the video encoding pipeline (or the macroblock input component of another video encoding pipeline, e.g., one in a production setting rather than in a training setting) to classify each macroblock it receives as "text" or "non-text", or to compute the likelihood that it contains text, dependent on the determined decision function, as in 2450.

Note that in some embodiments, the classification of "text" or "non-text" may be adaptable by the classifier based on regional or language information and/or the content or viewing preferences of the user. For example, the classifier may operate in two stages. In the first stage, it may be configured to perform offline training (e.g. SVM or Bayesian training) based on each language or alphabet (e.g., Arabic and English will use different classifiers since the characters look very different). In the second stage, the classifier may be configured to carry out online adaptations based on the content and viewing preferences of the user. Examples of the viewing preferences of the user that may be taken into account by the classifier include: the display resolution, the text size, the scrolling speed, the color, transparency or brightness of the image background (e.g., on a browser, terminal, or other reading device), or other device or display configuration information that may be determined during operation.

As previously noted, the systems described herein may implement different filtering techniques for computing gradient values and may compute different types of gradient histograms from those gradient values, in different embodiments. In addition, the systems described herein may employ different numbers of bins in the histograms that they compute. These choices may affect the quality of the classification results, the quality of the final encoding, and the cost performance of various computations. For example, in some experiments, the performance was worse when computing a single gradient orientation histogram than when computing separate histograms for horizontal and vertical gradients, and the hardware required to compute a single gradient orientation histogram was more complex than the hardware required to compute separate histograms for horizontal and vertical gradients. In another example, if a software pipeline component must operate on a large number of statistical values (e.g., bin counts) for each macroblock, it may not be able to perform the necessary calculations within the allotted computational budget. Therefore, for a given system, a trade-off may be made between the number of bins used in each of the computed histograms, and the quality of the classification results (e.g., the rate at which text macroblocks are correctly detected).

Figure 25:
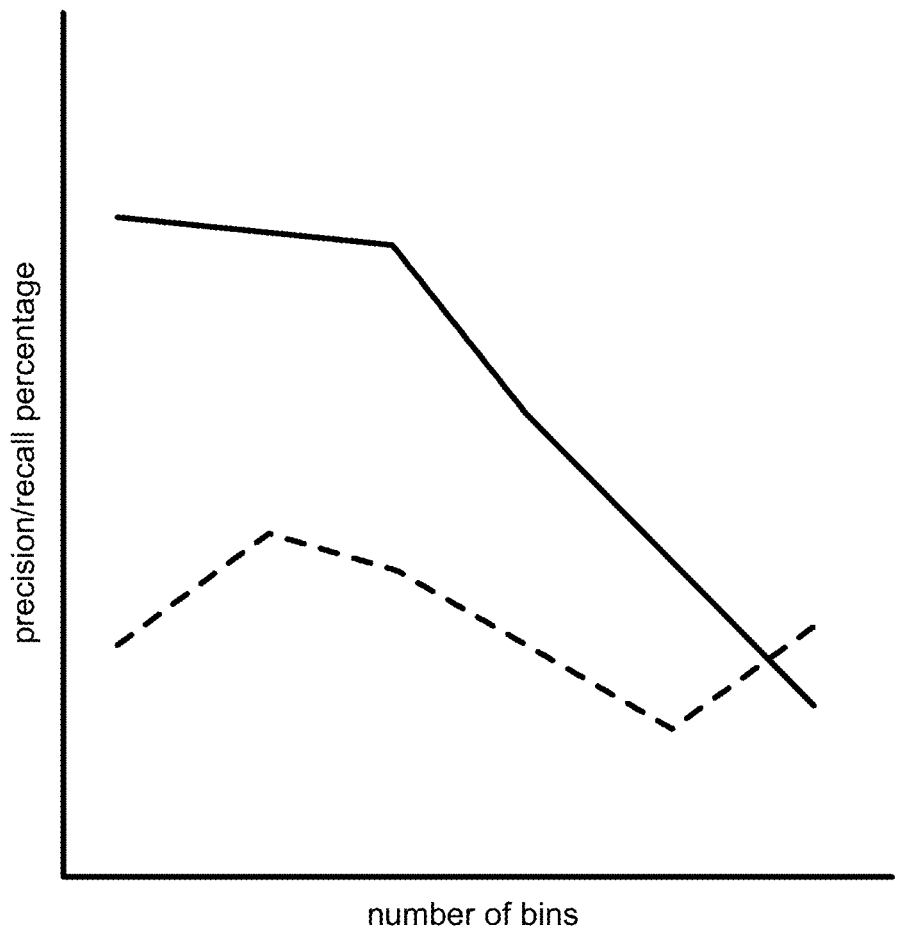
FIG. 25 illustrates a trade-off between the number of bins in a histogram of gradients and the precision and/or recall percentage of the histograms, according to different embodiments.

FIG. 25 illustrates an example analysis of the trade-off between the number of bins in a histogram of gradients and the precision and/or recall percentage of the histograms, according to different embodiments. These metrics may be used to make a tradeoff between the quality of the result of a macroblock encoding operation and its cost (e.g., in terms of memory usage, computation time, and/or other cost factors). In this example, the x axis represents the number of bins used for each histogram (e.g., the number of bins in a histogram of horizontal gradient magnitudes or gradient directions and/or the number of bins in a histogram of vertical gradient magnitudes or gradient directions), with the highest number of bins that was considered on the left and the lowest number of bins that was considered on the right. In this example, the y axis represents the precision and recall experienced in each case in terms of percentages. Here, the "recall" percentage (shown as the solid line in FIG. 25) may represent the ratio [true positives/(true positives+false negatives)]. In this example, the "precision" percentage (shown as the dashed line in FIG. 25) may represent the ratio [true positives/(true positives+false positives)]. As illustrated in this example, after a certain point (e.g., after the number of bins drops below a particular value), the precision and recall percentages may tend to fall off relatively quickly. In some embodiments, the "sweet spot" may be eight or sixteen bins per histogram.

Note that while many of the example embodiments described herein illustrate the use of gradient histograms in detecting text within a macroblock of a video frame (e.g., a macroblock of pixels as defined by the H.264 standard) and in coding those macroblocks in a manner that improves the results, the techniques described herein may also be applied in block processing pipelines that operate on blocks of pixels according to other formats and standards. For example, in embodiments in which the block processing pipeline operates according to the H.265 standard, the fundamental blocks on which the pipeline operates may be Coded Tree Units (CTUs) or Coding Units (CUs), rather than macroblock. In such embodiments, a respective quantization parameter (QP) may be transmitted per Transform Unit (TU), rather than per macroblock. In such embodiments, each Transform Unit may be 32×32, 16×16 or 8×8. This, the QP may be changed based on an 8×8, 16×16 or 32×32 histogram of gradients. In various embodiments, these histograms may be calculated directly for each block size, or they may be accumulated from smaller blocks sizes for the larger block sizes. Note also that in embodiments that operate in accordance with the H.265 standard, the quantization parameter for chroma and the quantization parameter for luma for a given CTU or CU may be different from each other and they may be generated based on different gradient histograms (e.g., a gradient histogram for chroma and a gradient histogram for luma, respectively). In some embodiments, a combination of these luma and chroma statistics (and/or the respective luma and chroma QPs generated from them) may be used to detect text in a block of pixels.

Example Video Encoder Apparatus

FIG. 26 is a block diagram of an example video encoder apparatus 2600, according to at least some embodiments. The video encoder apparatus 2600 may, for example, be implemented as an integrated circuit (IC) or as a subsystem on an IC such as a system-on-a-chip (SOC). In at least some embodiments, the video encoder apparatus 2600 may include a pipeline 2640 component, a processor 2610 component (e.g., a low-power multicore processor), a memory management unit (MMU) 2620, DMA 2630, and an interconnect 2650 such as a bus subsystem or fabric that interconnects the functional components of the apparatus. The processor 2610 component of the video encoder apparatus 2600 may, for example, perform frame-level control of the pipeline 2640 such as rate control, perform pipeline 2640 configuration including configuration of individual pipeline units within the pipeline 2640, and interface with application software via a driver, for example for video encoder 2600 configuration. The MMU 2620 may serve as an interface to external memory, for example for streaming video input and/or output. Pipeline 2640 component may access memory through MMU 2620 via DMA 2630. In some embodiments, the video encoder apparatus 2600 may include other functional components or units not shown in FIG. 26, or fewer functional components than those shown in FIG. 26. An example block processing method that may be implemented by pipeline 2640 component is shown in FIG. 16. An example a system-on-a-chip (SOC) that may include at least one video encoder apparatus 2600 is illustrated in FIG. 27.

Example System on a Chip (SOC)

Turning now to FIG. 27, a block diagram of one embodiment of a system-on-a-chip (SOC) 2700 that may include at least one instance of a video encoder apparatus including a block processing pipeline that may implement one or more of the block processing methods and apparatus as illustrated in the preceding figures. SOC 2700 is shown coupled to a memory 2750. As implied by the name, the components of the SOC 2700 may be integrated onto a single semiconductor substrate as an integrated circuit "chip." In some embodiments, the components may be implemented on two or more discrete chips in a system. However, the SOC 2700 will be used as an example herein. In the illustrated embodiment, the components of the SOC 2700 include a central processing unit (CPU) complex 2720, on-chip peripheral components 2740A-2740B (more briefly, "peripherals"), a memory controller (MC) 2730, a video encoder 2700 (which may itself be considered a peripheral component), and a communication fabric 2710. The components 2720, 2730, 2740A-2740B, and 2700 may all be coupled to the communication fabric 2710. The memory controller 2730 may be coupled to the memory 2750 during use, and the peripheral 2740B may be coupled to an external interface 2760 during use. In the illustrated embodiment, the CPU complex 2720 includes one or more processors (P) 2724 and a level two (L2) cache 2722. In some embodiments, the CPU complex may be configured to cache neighbor data, which may include source transform coefficients (e.g., DC transform coefficients), modified transform coefficients, previously computed quantization errors, and/or weighting coefficient values for one or more neighbor pixels, among other information used in the video encoding operations described herein.

The peripherals 2740A-2740B may be any set of additional hardware functionality included in the SOC 2700. For example, the peripherals 2740A-2740B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 2760 external to the SOC 2700 (e.g. the peripheral 2740B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 27, SOC 2700 may include at least one instance of a video encoder 2700 component, for example a video encoder 2700 as illustrated in FIG. 27 that includes a block processing pipeline 2740 component that implements a block processing method 1600 as illustrated in FIG. 16. Video encoder 2700 may be an H.264 video encoder apparatus that may be configured to convert input video frames from an input format into H.264/Advanced Video Coding (AVC) format as described in the H.264/AVC standard. The block processing pipeline 2740 may implement one or more of the block processing methods and apparatus as described herein in relation to FIGS. 3 through 16.

The CPU complex 2720 may include one or more CPU processors 2724 that serve as the CPU of the SOC 2700. The CPU of the system includes the processor(s) that execute the main control software of the system, such as an operating system. Generally, software executed by the CPU during use may control the other components of the system to realize the desired functionality of the system. The processors 2724 may also execute other software, such as application programs. The application programs may provide user functionality, and may rely on the operating system for lower level device control. Accordingly, the processors 2724 may also be referred to as application processors. The CPU complex 2720 may further include other hardware such as the L2 cache 2722 and/or and interface to the other components of the system (e.g. an interface to the communication fabric 2710). Generally, a processor may include any circuitry and/or microcode configured to execute instructions defined in an instruction set architecture implemented by the processor. The instructions and data operated on by the processors in response to executing the instructions may generally be stored in the memory 2750, although certain instructions may be defined for direct processor access to peripherals as well. In some embodiments, the data stored in memory 2750 may include weighting coefficient values to be applied for one or more neighbor pixels in a neighbor-data-based dithering operation. Processors may encompass processor cores implemented on an integrated circuit with other components as a system on a chip (SOC 2700) or other levels of integration. Processors may further encompass discrete microprocessors, processor cores and/or microprocessors integrated into multichip module implementations, processors implemented as multiple integrated circuits, etc.

The memory controller 2730 may generally include the circuitry for receiving memory operations from the other components of the SOC 2700 and for accessing the memory 2750 to complete the memory operations. The memory controller 2730 may be configured to access any type of memory 2750. For example, the memory 2750 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 2730 may include queues for memory operations, for ordering (and potentially reordering) the operations and presenting the operations to the memory 2750. The memory controller 2730 may further include data buffers to store write data awaiting write to memory and read data awaiting return to the source of the memory operation. In some embodiments, the memory controller 2730 may include a memory cache to store recently accessed memory data. In SOC implementations, for example, the memory cache may reduce power consumption in the SOC by avoiding reaccess of data from the memory 2750 if it is expected to be accessed again soon. In some cases, the memory cache may also be referred to as a system cache, as opposed to private caches such as the L2 cache 2722 or caches in the processors 2724, which serve only certain components. Additionally, in some embodiments, a system cache need not be located within the memory controller 2730.

In an embodiment, the memory 2750 may be packaged with the SOC 2700 in a chip-on-chip or package-on-package configuration. A multichip module configuration of the SOC 2700 and the memory 2750 may be used as well. Such configurations may be relatively more secure (in terms of data observability) than transmissions to other components in the system (e.g. to various endpoints). Accordingly, protected data may reside in the memory 2750 unencrypted, whereas the protected data may be encrypted for exchange between the SOC 2700 and external endpoints.

The communication fabric 2710 may be any communication interconnect and protocol for communicating among the components of the SOC 2700. The communication fabric 2710 may be bus-based, including shared bus configurations, cross bar configurations, and hierarchical buses with bridges. The communication fabric 2710 may also be packet-based, and may be hierarchical with bridges, cross bar, point-to-point, or other interconnects.

It is noted that the number of components of the SOC 2700 (and the number of subcomponents for those shown in FIG. 27, such as within the CPU complex 2720) may vary from embodiment to embodiment. There may be more or fewer of each component/subcomponent than the number shown in FIG. 27.

Example System

Figure 28:
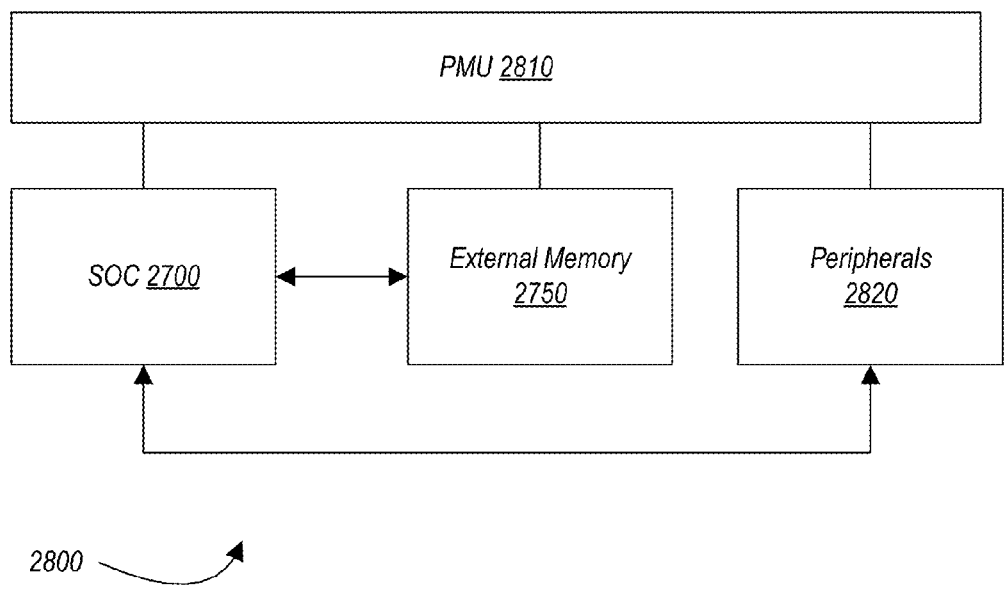
FIG. 28 is a block diagram illustrating one embodiment of a system that includes at least one instance of an SOC.

FIG. 28 a block diagram of one embodiment of a system 2800. In the illustrated embodiment, the system 2800 includes at least one instance of the SOC 2700 coupled to one or more external peripherals 2820 and the external memory 2750. A power management unit (PMU) 2810 is provided which supplies the supply voltages to the SOC 2700 as well as one or more supply voltages to the memory 2750 and/or the peripherals 2820. In some embodiments, more than one instance of the SOC 2700 may be included (and more than one memory 2750 may be included as well).

The peripherals 2820 may include any desired circuitry, depending on the type of system 2800. For example, in one embodiment, the system 2800 may be a mobile device (e.g. personal digital assistant (PDA), smart phone, etc.) and the peripherals 2820 may include devices for various types of wireless communication, such as wifi, Bluetooth, cellular, global positioning system, etc. The peripherals 2820 may also include additional storage, including RAM storage, solid state storage, or disk storage. The peripherals 2820 may include user interface devices such as a display screen, including touch display screens or multitouch display screens, keyboard or other input devices, microphones, speakers, etc. In other embodiments, the system 2800 may be any type of computing system (e.g. desktop personal computer, laptop, workstation, net top etc.).

The external memory 2750 may include any type of memory. For example, the external memory 2750 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 2750 may include one or more memory modules to which the memory devices are mounted, such as single inline memory modules (SIMMs), dual inline memory modules (DIMMs), etc. Alternatively, the external memory 2750 may include one or more memory devices that are mounted on the SOC 2700 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a block processing pipeline implemented in a video encoder circuit and configured to process blocks of pixels from video frames;
wherein the block processing pipeline comprises a block input component;
wherein, for each of a plurality of blocks of pixels from a video frame, the block input component is configured to:
receive input data representing the block of pixels;
compute gradient values for the block of pixels in two or more directions;
compute one or more histograms representing statistics derived from the gradient values for the block of pixels;
determine a likelihood that the block of pixels represents a portion of the video frame that contains text, wherein to determine the likelihood that the block of pixels represents a portion of the video frame that contains text, the block input component is configured to determine a presence or absence of a dominant gradient direction in the block of pixels, dependent on the one or more computed histograms; and
determine one or more parameter values for encoding the block of pixels, dependent on the likelihood that the block of pixels represents a portion of the video frame that contains text.

2. The apparatus of claim 1,
wherein the one or more parameter values comprise a quantization parameter value; and
wherein, in response to a determination that it is likely that the block of pixels represents a portion of the video frame that contains text, the block input component is configured to compute a quantization parameter value for encoding the block of pixels that is lower than a quantization parameter value used for encoding blocks of pixels that do not represent portions of the video frame that contains text.

3. The apparatus of claim 1, wherein the block input component is further configured to pass data representing the gradient values, the one or more histograms, the determined likelihood, or the one or more parameter values usable in encoding the block of pixels to one or more components in a subsequent stage of the block processing pipeline.

4. The apparatus of claim 3,
wherein the block processing pipeline further comprises an intra-estimation stage;
wherein the data comprises a parameter value indicating a dominant gradient direction in the block of pixels;
wherein to pass the data, the block input component is configured to pass the data to a component of the intra-estimation stage; and
wherein the component of the intra-estimation stage is configured to use the parameter value indicating the dominant gradient direction to bias selection of a prediction mode.

5. The apparatus of claim 4, wherein to use the parameter value indicating the dominant gradient direction to bias selection of a prediction mode, the component of the intra-estimation stage is configured to compute a cost for each of two or more candidate predication modes, wherein the computed cost for each of the two or more candidate predication modes is dependent on the parameter value indicating the dominant gradient direction.

6. The apparatus of claim 3,
wherein the block processing pipeline further comprises a mode decision stage that is configured to determine a mode in which the block of pixels is to be encoded dependent, at least in part, on a respective cost of encoding the block of pixels in each of two or more modes;
wherein to pass the data, the block input component is configured to pass the data to a component of the mode decision stage; and
wherein the component of the mode decision stage is configured to include the data as an input to bias or control the determination of the mode in which the block of pixels is to be encoded.

7. The apparatus of claim 3,
wherein the block processing pipeline further comprises a motion estimation stage that is configured to select a motion vector from among two or more candidate motion vectors;

wherein to pass the data, the block input component is configured to pass the data to a component of the motion estimation stage; and wherein the component of the mode decision stage is configured to include the data as an input to bias or control the selection of the motion vector from among the two or more candidate motion vectors.

8. A method, comprising:

inputting data representing a block of pixels from a video frame to a video encoding pipeline comprising a plurality of stages, each stage configured to perform at least one operation on blocks of pixels passing through the pipeline; and performing, by one or more stages of the pipeline:
   computing gradient values for the block of pixels in two or more directions;
   computing one or more histograms representing statistics derived from the gradient values for the block of pixels;
   determining that the block of pixels represents a portion of the video frame that is likely to contain text, wherein said determining comprises determining that there is a dominant gradient direction in the block of pixels, dependent on the one or more computed histograms;
   in response to said determining that the block of pixels represents a portion of the video frame that is likely to contain text, determining a quantization parameter value for use in encoding the block of pixels in the video encoding pipeline; and
   making the quantization parameter value available to one or more operations of the video encoding pipeline.

9. The method of claim 8, wherein said determining a quantization parameter value comprises computing a quantization parameter for use in a luma reconstruction operation of the video encoding pipeline that is lower than a quantization parameter used in a luma reconstruction operation performed on a block of pixels that represents a portion of the video frame that does not contain text.

10. The method of claim 8, wherein said determining a quantization parameter value comprises computing a quantization parameter for use in a chroma reconstruction operation of the video encoding pipeline.

11. The method of claim 8, further comprising:
determining one or more other parameter values for use in encoding the block of pixels in the video encoding pipeline, dependent on said determining that the block of pixels represents a portion of the video frame that is likely to contain text; and
making the one or more other parameter values available to one or more operations of the video encoding pipeline.

12. The method of claim 8,
wherein said computing the gradient values for the block of pixels in two or more directions comprises computing unsigned gradient values for the block of pixels in two or more directions; and
wherein said computing one or more histograms comprises computing statistics derived from the unsigned gradient values for the block of pixels in the two or more directions.

13. The method of claim 8,
wherein said computing gradient values for the block of pixels in two or more directions comprises computing horizontal gradient values and vertical gradient values for the block of pixels;

wherein said computing one or more histograms comprises computing a histogram of the horizontal gradient values and a histogram of the vertical gradient values; and wherein each bin of the histogram of the horizontal gradient values and each bin of the histogram of the vertical gradient values comprises a count of the computed gradient values having a magnitude in a respective range of gradient magnitude values.

14. The method of claim 8,
wherein said computing gradient values for the block of pixels in two or more directions comprises computing horizontal gradient values and vertical gradient values at multiple points within the block of pixels; and
wherein said computing one or more histograms comprises computing, dependent on the horizontal gradient values and vertical gradient values for the block of pixels, an angle representing a gradient direction at each of the multiple points within the block of pixels.

15. The method of claim 8,
wherein said computing one or more histograms further comprises computing a histogram of the angles representing the gradient directions at each of the multiple points within the block of pixels; and
wherein each bin of the histogram of the angles comprises a count of the computed angles that fall within in a respective range of angles.

16. The method of claim 8, further comprising:
determining one or more other parameter values for use in encoding the block of pixels;
for each of one or more other blocks of pixels in the video frame or in a slice of the video frame:
   computing gradient values for the other block of pixels in two or more directions;
   computing one or more other histograms representing statistics derived from the gradient values for the other block of pixels;
   determining a likelihood that the other block of pixels represents a portion of the video frame that contains text, dependent on the one or more other histograms; and
   determining one or more parameter values for use in encoding the other block of pixels in the video encoding pipeline, dependent on the determined likelihood;
accumulating statistics for the block of pixels and the one or more other blocks of pixels in the video frame or in the slice of the video frame, dependent on the computed gradient values, the computed histograms, the determined likelihood, or the determined parameter values for the block of pixels and the one or more other blocks of pixels; and
computing one or more slice-level or frame-level parameter values for use in encoding the video frame or a subsequent video frame, dependent on the accumulated statistics.

17. The method of claim 8,
wherein the method further comprises, prior to said receiving input data representing a block of pixels from a video frame:
   receiving input data representing a plurality of training blocks of pixels, each representing an image, wherein for each of the plurality of training blocks of pixels, the presence or absence of text in the image is known;
   for each of the plurality of training blocks of pixels:
      computing gradient values for the training block of pixels in two or more directions; and computing one or more histograms representing statistics derived from the gradient values for the training block of pixels; and determining a decision function usable to classify other blocks of pixels in terms of the likelihood that they represent portions of a video frame that contain text, dependent on the computed gradient values for the plurality of training blocks or on the computed histograms for the plurality of training blocks; and wherein said determining that there is a dominant gradient direction in the block of pixels, dependent on the one or more computed histograms, comprises applying the decision function to the one or more computed histograms.

18. The method of claim 8, where said determining that the block of pixels represents a portion of the video frame that is likely to contain text is further dependent on a measure of variance that was computed for the block of pixels.

19. A device, comprising:

a memory; and an apparatus configured to process video frames and to store the processed video frames as frame data to the memory;

wherein the apparatus is configured to:

receive input data representing a block of pixels from a video frame;

compute gradient values for the block of pixels in two or more directions;

compute one or more histograms representing statistics derived from the gradient values for the block of pixels;

store data representing the one or more histograms in a data structure in the memory;

determine a classification parameter value for the block of pixels, wherein the classification parameter value indicates a likelihood that the block of pixels represents a portion of the video frame that contains text, wherein to determine the classification parameter value, the apparatus is configured to determine a presence or absence of a dominant gradient direction in the block of pixels, dependent on the one or more computed histograms;

store the classification parameter value in the data structure in the memory; and perform an encoding operation for the block of pixels, dependent on the stored data representing the one or more histograms or the stored classification parameter.

20. The device of claim 19, wherein the apparatus comprises a block processing pipeline;

wherein the apparatus is further configured to:

determine one or more parameter values for encoding the block of pixels, dependent on the determined classification parameter value; and store the one or more parameter values in the data structure; and wherein to perform the encoding operation for the block of pixels, the apparatus is further configured to:

retrieve the stored data representing the one or more histograms, the stored classification parameter, or the one or more stored parameter values from the data structure in a stage of the block processing pipeline other than a stage of the block processing pipeline in which it was stored in the data structure.

\* \* \* \* \*